United States Patent
LeTourneau

(10) Patent No.: US 10,733,234 B2
(45) Date of Patent: Aug. 4, 2020

(54) METHOD AND/OR SYSTEM FOR SIMPLIFYING TREE EXPRESSIONS, SUCH AS FOR PATTERN MATCHING

(71) Applicant: Robert T. and Virginia T. Jenkins as Trustees of the Jenkins Family Trust Dated Feb. 8, 2002, Sacramento, CA (US)

(72) Inventor: Jack J. LeTourneau, Santa Barbara, CA (US)

(73) Assignee: Robert T. and Virginia T. Jenkins as Trustees of the Jenkins Family Trust Dated Feb. 8. 2002, Sacramento, CA (US)

( * ) Notice: Subject to any disclaimer, the term of this patent is extended or adjusted under 35 U.S.C. 154(b) by 1133 days.

(21) Appl. No.: 15/043,267

(22) Filed: Feb. 12, 2016

(65) Prior Publication Data
US 2017/0032053 A1   Feb. 2, 2017

Related U.S. Application Data

(63) Continuation of application No. 11/007,139, filed on Dec. 7, 2004, now Pat. No. 9,646,107.

(60) Provisional application No. 60/575,784, filed on May 28, 2004.

(51) Int. Cl.
*G06F 16/901* (2019.01)
*G06F 16/22* (2019.01)
*G06F 16/31* (2019.01)

(52) U.S. Cl.
CPC ...... *G06F 16/9027* (2019.01); *G06F 16/2246* (2019.01); *G06F 16/322* (2019.01)

(58) Field of Classification Search
CPC . G06F 16/322; G06F 16/2246; G06F 16/9027
See application file for complete search history.

(56) References Cited

U.S. PATENT DOCUMENTS

| | | |
|---|---|---|
| 3,201,701 A | 8/1965 | Maitra |
| 3,704,345 A | 11/1972 | Coker |
| 4,001,951 A | 1/1977 | Fasse |
| 4,134,218 A | 1/1979 | Adams et al. |
| 4,156,910 A | 5/1979 | Barton et al. |
| 4,439,162 A | 3/1984 | Blaine |
| 4,677,550 A | 6/1987 | Ferguson |
| 4,737,109 A | 4/1988 | Abramson |
| 4,745,561 A | 5/1988 | Hirosawa et al. |
| 4,751,684 A | 6/1988 | Holt |
| 4,831,525 A | 5/1989 | Saito et al. |
| 4,867,686 A | 9/1989 | Goldstein |
| 4,931,928 A | 6/1990 | Greenfeld |
| 4,949,388 A | 8/1990 | Bhaskaran |
| 4,989,132 A | 1/1991 | Mellender et al. |
| 4,991,087 A | 2/1991 | Burkowski et al. |

(Continued)

OTHER PUBLICATIONS

U.S. Appl. No. 11/007,139: RCE, Nov. 10, 2016, 3 pages.

(Continued)

*Primary Examiner* — James Trujillo
*Assistant Examiner* — Jessica N Le
(74) *Attorney, Agent, or Firm* — Berkeley Law & Technology Group, LLP

(57) ABSTRACT

Embodiments of methods, apparatuses, devices and/or systems for simplifying tree expressions, such as for pattern matching, are disclosed.

24 Claims, 13 Drawing Sheets

(56) References Cited

U.S. PATENT DOCUMENTS

| | | | |
|---|---|---|---|
| 5,021,943 A | 6/1991 | Grimes | |
| 5,021,992 A | 6/1991 | Kondo | |
| 5,050,071 A | 9/1991 | Harris et al. | |
| 5,191,522 A | 3/1993 | Bosco et al. | |
| 5,235,701 A | 8/1993 | Ohler et al. | |
| 5,265,245 A | 11/1993 | Nordstrom et al. | |
| 5,295,261 A | 3/1994 | Simonetti | |
| 5,325,531 A | 6/1994 | McKeeman | |
| 5,335,320 A | 8/1994 | Iwata | |
| 5,335,345 A | 8/1994 | Frieder et al. | |
| 5,355,496 A | 10/1994 | Fant et al. | |
| 5,463,777 A | 10/1995 | Bialkowski et al. | |
| 5,493,504 A | 2/1996 | Minato | |
| 5,493,678 A | 2/1996 | Arcuri | |
| 5,497,500 A | 3/1996 | Rogers et al. | |
| 5,509,088 A | 4/1996 | Robson | |
| 5,519,627 A | 5/1996 | Mahmood et al. | |
| 5,522,068 A | 5/1996 | Berkowitz | |
| 5,577,253 A | 11/1996 | Blickstein | |
| 5,598,350 A | 1/1997 | Kawanishi et al. | |
| 5,606,669 A | 2/1997 | Bertin et al. | |
| 5,636,155 A | 6/1997 | Kabuo | |
| 5,687,362 A | 11/1997 | Bhargava et al. | |
| 5,706,406 A | 1/1998 | Pollock | |
| 5,724,512 A | 3/1998 | Winterbottom | |
| 5,724,576 A | 3/1998 | Letourneau | |
| 5,742,806 A | 4/1998 | Reiner | |
| 5,748,975 A | 5/1998 | Van De Vanter | |
| 5,758,152 A | 5/1998 | LeTourneau | |
| 5,778,371 A | 7/1998 | Fujihara | |
| 5,781,906 A | 7/1998 | Aggarwal et al. | |
| 5,787,415 A | 7/1998 | Jacobson et al. | |
| 5,787,432 A | 7/1998 | Letourneau | |
| 5,796,356 A | 8/1998 | Okada et al. | |
| 5,802,370 A | 9/1998 | Sitbon et al. | |
| 5,822,593 A | 10/1998 | Lamping et al. | |
| 5,848,159 A | 12/1998 | Collins et al. | |
| 5,905,138 A | 5/1999 | Van Broekhoven | |
| 5,930,805 A | 7/1999 | Marquis | |
| 5,937,181 A | 8/1999 | Godefroid | |
| 5,970,490 A | 10/1999 | Morgenstern | |
| 5,978,790 A | 11/1999 | Buneman et al. | |
| 5,987,449 A | 11/1999 | Suciu | |
| 5,999,926 A | 12/1999 | Suciu | |
| 6,002,879 A | 12/1999 | Radigan et al. | |
| 6,003,033 A | 12/1999 | Amano et al. | |
| 6,022,879 A | 2/2000 | Crow et al. | |
| 6,028,987 A | 2/2000 | Hirairi | |
| 6,055,537 A * | 4/2000 | LeTourneau | G06F 9/44 |
| 6,076,087 A | 6/2000 | Suciu | |
| 6,088,691 A | 7/2000 | Bhargava et al. | |
| 6,141,655 A | 10/2000 | Johnson et al. | |
| 6,199,103 B1 | 3/2001 | Sakuguchi et al. | |
| 6,236,410 B1 | 5/2001 | Politis et al. | |
| 6,243,859 B1 | 6/2001 | Chen-Kuang | |
| 6,279,007 B1 | 8/2001 | Uppala | |
| 6,289,354 B1 | 9/2001 | Aggarwal et al. | |
| 6,292,938 B1 | 9/2001 | Sarkar et al. | |
| 6,314,559 B1 | 11/2001 | Sollich | |
| 6,336,812 B1 | 1/2002 | Cooper et al. | |
| 6,341,372 B1 | 1/2002 | Datig | |
| 6,377,953 B1 | 4/2002 | Gawlick | |
| 6,442,584 B1 | 8/2002 | Kolli et al. | |
| 6,446,256 B1 | 9/2002 | Hyman et al. | |
| 6,466,240 B1 | 10/2002 | Maslov | |
| 6,480,857 B1 | 11/2002 | Chandler | |
| 6,505,205 B1 | 1/2003 | Kothuri et al. | |
| 6,542,899 B1 | 4/2003 | Saulpaugh et al. | |
| 6,550,024 B1 | 4/2003 | Pagurek et al. | |
| 6,556,983 B1 | 4/2003 | Altschuler et al. | |
| 6,598,052 B1 | 7/2003 | Saulpaugh et al. | |
| 6,598,502 B1 | 7/2003 | Rosa | |
| 6,606,632 B1 | 8/2003 | Saulpaugh et al. | |
| 6,606,741 B2 | 8/2003 | Kojima et al. | |
| 6,609,130 B1 | 8/2003 | Saulpaugh et al. | |
| 6,610,106 B1 | 8/2003 | Jenks | |
| 6,611,844 B1 | 8/2003 | Saulpaugh et al. | |
| 6,658,649 B1 | 12/2003 | Bates et al. | |
| 6,691,301 B2 | 2/2004 | Bowen | |
| 6,714,939 B2 | 3/2004 | Saldanha et al. | |
| 6,728,953 B1 | 4/2004 | Walster | |
| 6,745,384 B1 | 6/2004 | Biggerstaff | |
| 6,748,378 B1 | 6/2004 | Lavender et al. | |
| 6,763,515 B1 | 7/2004 | Vazquez et al. | |
| 6,785,673 B1 | 8/2004 | Fernandez et al. | |
| 6,817,865 B2 | 11/2004 | Charbonneau | |
| 6,829,695 B1 | 12/2004 | Ross | |
| 6,847,979 B2 | 1/2005 | Allemang et al. | |
| 6,854,976 B1 | 2/2005 | Suhr | |
| 6,874,005 B2 | 3/2005 | Fortenberry et al. | |
| 6,880,148 B1 | 4/2005 | Raph | |
| 6,941,511 B1 | 9/2005 | Hind | |
| 6,965,990 B2 | 11/2005 | Barsness et al. | |
| 6,968,330 B2 | 11/2005 | Edwards et al. | |
| 6,978,271 B1 | 12/2005 | Hoffman | |
| 7,043,555 B1 | 5/2006 | McCain et al. | |
| 7,051,033 B2 | 5/2006 | Agarwal et al. | |
| 7,072,904 B2 | 7/2006 | Najork et al. | |
| 7,103,838 B1 | 9/2006 | Krishnamurthy et al. | |
| 7,107,265 B1 | 9/2006 | Calvignac et al. | |
| 7,111,016 B2 | 9/2006 | Gurevich | |
| 7,117,196 B2 | 10/2006 | Gaur et al. | |
| 7,117,479 B2 | 10/2006 | Van De Vanter | |
| 7,127,704 B2 | 10/2006 | Van De Vanter et al. | |
| 7,134,075 B2 | 11/2006 | Hind et al. | |
| 7,140,006 B2 | 11/2006 | Harrison et al. | |
| 7,162,485 B2 | 1/2007 | Gottlob et al. | |
| 7,190,376 B1 * | 3/2007 | Tonisson | G06T 11/60 |
| | | | 345/629 |
| 7,191,182 B2 | 3/2007 | Anonsen et al. | |
| 7,203,680 B2 | 4/2007 | Parida | |
| 7,203,774 B1 | 4/2007 | Zhou et al. | |
| 7,287,026 B2 | 10/2007 | Oommen | |
| 7,313,563 B2 | 12/2007 | Bordawekar et al. | |
| 7,318,215 B1 | 1/2008 | Krishnan et al. | |
| 7,356,802 B2 | 4/2008 | de Sutter et al. | |
| 7,360,202 B1 | 4/2008 | Seshadri et al. | |
| 7,409,673 B2 | 8/2008 | Kuo et al. | |
| 7,419,376 B2 | 9/2008 | Sarvazyan et al. | |
| 7,421,648 B1 | 9/2008 | Davis | |
| 7,437,666 B2 | 10/2008 | Ramarao | |
| 7,475,070 B2 | 1/2009 | Fan et al. | |
| 7,496,892 B2 | 2/2009 | Nuss | |
| 7,512,932 B2 | 3/2009 | Davidov et al. | |
| 7,536,675 B2 | 5/2009 | Gallagher | |
| 7,536,676 B2 | 5/2009 | Baker | |
| 7,544,062 B1 | 6/2009 | Hauschild et al. | |
| 7,561,927 B1 | 7/2009 | Oyama et al. | |
| 7,571,156 B1 | 8/2009 | Gupta et al. | |
| 7,571,169 B2 | 8/2009 | Jones et al. | |
| 7,574,692 B2 | 8/2009 | Herscu | |
| 7,575,434 B2 | 8/2009 | Palakodeti | |
| 7,620,632 B2 | 11/2009 | Andrews | |
| 7,627,591 B2 | 12/2009 | LeTourneau | |
| 7,630,995 B2 | 12/2009 | LeTourneau | |
| 7,636,727 B2 | 12/2009 | Schiffmann et al. | |
| 7,650,592 B2 | 1/2010 | Eckels et al. | |
| 7,669,183 B2 | 2/2010 | Bowman et al. | |
| 7,681,177 B2 | 3/2010 | LeTourneau | |
| 7,761,847 B2 | 7/2010 | Kornerup et al. | |
| 7,761,858 B2 | 7/2010 | Chang et al. | |
| 7,765,183 B2 | 7/2010 | Williams, Jr. | |
| 7,779,396 B2 | 8/2010 | Meijer et al. | |
| 7,801,923 B2 | 9/2010 | LeTourneau | |
| 7,861,304 B1 | 12/2010 | Nachenberg | |
| 7,882,147 B2 | 2/2011 | LeTourneau | |
| 7,890,928 B2 | 2/2011 | Patrudu | |
| 7,899,821 B1 | 3/2011 | Schiffmann | |
| 8,020,145 B2 | 9/2011 | Fant | |
| 8,032,860 B2 | 10/2011 | Piehler et al. | |
| 8,037,102 B2 | 10/2011 | LeTourneau | |
| 8,060,868 B2 | 11/2011 | Meijer et al. | |
| 8,086,998 B2 | 12/2011 | Bansal | |
| 8,112,740 B2 | 2/2012 | Meijer et al. | |

(56) References Cited

U.S. PATENT DOCUMENTS

| | | |
|---|---|---|
| 8,151,276 B2 | 4/2012 | Grechanik |
| 8,181,155 B2 | 5/2012 | Pinto et al. |
| 8,230,526 B2 | 7/2012 | Holland et al. |
| 8,250,526 B2 | 8/2012 | Anderson et al. |
| 8,316,059 B1 | 11/2012 | Schiffmann |
| 8,356,040 B2 | 1/2013 | LeTourneau |
| 8,365,137 B2 | 1/2013 | Fant |
| 8,438,534 B2 | 5/2013 | Thomson |
| 8,443,339 B2 | 5/2013 | LeTourneau |
| 8,484,236 B1 | 7/2013 | Andrews |
| 8,626,777 B2 | 1/2014 | LeTourneau |
| 8,650,201 B2 | 2/2014 | LeTourneau |
| 8,683,431 B2 | 3/2014 | Thomson et al. |
| 8,762,942 B2 | 6/2014 | Langworthy et al. |
| 8,869,106 B2 | 10/2014 | Jazdzewski |
| 8,990,769 B2 | 3/2015 | LeTourneau |
| 9,002,862 B2 | 4/2015 | Schiffmann |
| 9,020,961 B2 | 4/2015 | LeTourneau |
| 9,043,347 B2 | 5/2015 | LeTourneau |
| 9,077,515 B2 | 7/2015 | LeTourneau |
| 9,330,128 B2 | 5/2016 | Schiffmann |
| 9,411,841 B2 | 8/2016 | Schiffmann |
| 9,425,951 B2 | 8/2016 | LeTourneau |
| 9,563,653 B2 | 2/2017 | LeTourneau |
| 9,646,107 B2 | 5/2017 | LeTourneau |
| 10,255,311 B2 | 4/2019 | LeTourneau |
| 10,275,489 B1 | 4/2019 | Muniswamy Reddy |
| 10,325,031 B2 | 6/2019 | LeTourneau |
| 10,380,089 B2 | 8/2019 | LeTourneau |
| 10,394,785 B2 | 8/2019 | LeTourneau |
| 10,411,878 B2 | 9/2019 | LeTourneau |
| 10,437,886 B2 | 10/2019 | Andrews |
| 2001/0003211 A1 | 6/2001 | Bera |
| 2001/0037496 A1 | 11/2001 | Simonyi |
| 2002/0062259 A1 | 2/2002 | Katz et al. |
| 2002/0040292 A1 | 4/2002 | Marcu |
| 2002/0059281 A1 | 5/2002 | Watanabe et al. |
| 2002/0091676 A1 | 7/2002 | Agrawal |
| 2002/0107860 A1 | 8/2002 | Gobeille et al. |
| 2002/0129129 A1 | 9/2002 | Bloch et al. |
| 2002/0130796 A1 | 9/2002 | Tsuchido et al. |
| 2002/0130907 A1 | 9/2002 | Chi |
| 2002/0133347 A1 | 9/2002 | Schoneburg |
| 2002/0133497 A1 | 9/2002 | Draper et al. |
| 2002/0149604 A1 | 10/2002 | Wilkinson |
| 2002/0169563 A1 | 11/2002 | de Carvalho Ferreira |
| 2002/0194163 A1 | 12/2002 | Hopeman |
| 2003/0041088 A1 | 2/2003 | Wilson et al. |
| 2003/0065659 A1 | 4/2003 | Agarwal et al. |
| 2003/0074436 A1 | 4/2003 | Gieseke |
| 2003/0115559 A1 | 6/2003 | Sawada |
| 2003/0130977 A1 | 7/2003 | Oommen |
| 2003/0167445 A1 | 9/2003 | Su et al. |
| 2003/0195885 A1 | 10/2003 | Emmick et al. |
| 2003/0195890 A1 | 10/2003 | Oommen |
| 2003/0236794 A1 | 12/2003 | Hostetter et al. |
| 2004/0010752 A1* | 1/2004 | Chan .................. G06F 16/80 715/234 |
| 2004/0019599 A1 | 1/2004 | Trappen |
| 2004/0024724 A1 | 2/2004 | Rubin |
| 2004/0024790 A1 | 2/2004 | Everett |
| 2004/0044659 A1 | 3/2004 | Judd et al. |
| 2004/0054692 A1 | 3/2004 | Seyrat et al. |
| 2004/0060007 A1 | 3/2004 | Gottlob et al. |
| 2004/0068498 A1 | 4/2004 | Patchet et al. |
| 2004/0075677 A1 | 4/2004 | Loyall |
| 2004/0103105 A1 | 5/2004 | Lindblad et al. |
| 2004/0122844 A1 | 6/2004 | Malloy |
| 2004/0125124 A1 | 7/2004 | Kim |
| 2004/0160464 A1 | 8/2004 | Reyna |
| 2004/0205047 A1 | 10/2004 | Carpenter |
| 2004/0215642 A1 | 10/2004 | Cameron et al. |
| 2004/0239674 A1 | 12/2004 | Ewald et al. |
| 2004/0254909 A1* | 12/2004 | Testa .................. H04L 45/00 |
| 2004/0260683 A1 | 12/2004 | Chan et al. |
| 2004/0260684 A1 | 12/2004 | Agrawal et al. |
| 2004/0267958 A1 | 12/2004 | Reed |
| 2004/0268236 A1 | 12/2004 | Childlovskii et al. |
| 2005/0021548 A1 | 1/2005 | Bohannon et al. |
| 2005/0023524 A1 | 2/2005 | Beatty |
| 2005/0027743 A1 | 2/2005 | O'Neil et al. |
| 2005/0028091 A1 | 2/2005 | Bordawekar |
| 2005/0050016 A1 | 3/2005 | Stanoi et al. |
| 2005/0050066 A1 | 3/2005 | Hughes |
| 2005/0058976 A1 | 3/2005 | Vernon |
| 2005/0060332 A1 | 3/2005 | Bernstein et al. |
| 2005/0065964 A1 | 3/2005 | Ziemann et al. |
| 2005/0097084 A1* | 5/2005 | Balmin ............. G06F 16/24539 |
| 2005/0125432 A1 | 6/2005 | Lin et al. |
| 2005/0138073 A1 | 6/2005 | Zhou et al. |
| 2005/0149471 A1 | 7/2005 | Lassalle |
| 2005/0154265 A1 | 7/2005 | Miro et al. |
| 2005/0154979 A1 | 7/2005 | Chidlovskii et al. |
| 2005/0156761 A1 | 7/2005 | Oh |
| 2005/0165732 A1 | 7/2005 | Burges |
| 2005/0171962 A1 | 8/2005 | Martin |
| 2005/0187900 A1 | 8/2005 | LeTourneau |
| 2005/0210014 A1 | 9/2005 | Asano |
| 2005/0214727 A1 | 9/2005 | Stoianovici et al. |
| 2005/0216445 A1 | 9/2005 | Rao |
| 2005/0267908 A1 | 12/2005 | LeTourneau |
| 2005/0286788 A1 | 12/2005 | Orr |
| 2006/0004817 A1 | 1/2006 | Andrews |
| 2006/0005122 A1 | 1/2006 | Lemoine |
| 2006/0015538 A1 | 1/2006 | LeTourneau |
| 2006/0053122 A1 | 3/2006 | Korn et al. |
| 2006/0074838 A1 | 4/2006 | Srivastava |
| 2006/0095442 A1 | 5/2006 | LeTourneau |
| 2006/0095455 A1 | 5/2006 | LeTourneau |
| 2006/0123029 A1 | 6/2006 | LeTourneau |
| 2006/0129582 A1 | 6/2006 | Schiffmann et al. |
| 2006/0209351 A1 | 9/2006 | Saito |
| 2006/0259533 A1 | 11/2006 | LeTourneau |
| 2006/0271573 A1 | 11/2006 | LeTourneau |
| 2007/0003917 A1 | 1/2007 | Kitching et al. |
| 2007/0198538 A1 | 8/2007 | Palacios |
| 2010/0094885 A1 | 4/2010 | LeTourneau |
| 2010/0094908 A1 | 4/2010 | LeTourneau |
| 2010/0114969 A1 | 5/2010 | LeTourneau |
| 2010/0191775 A1 | 7/2010 | Schiffmann et al. |
| 2010/0205581 A1 | 8/2010 | LeTourneau |
| 2012/0144388 A1 | 6/2012 | Schiffmann |
| 2014/0184430 A1 | 7/2014 | Jiang |
| 2016/0162528 A1 | 6/2016 | LeTourneau |
| 2019/0171628 A1 | 6/2019 | LeTourneau |
| 2019/0236078 A1 | 8/2019 | LeTourneau |
| 2019/0356465 A1 | 11/2019 | LeTourneau |
| 2019/0377718 A1 | 12/2019 | LeTourneau |
| 2019/0384753 A1 | 12/2019 | LeTourneau |
| 2019/0384792 A1 | 12/2019 | LeTourneau |

OTHER PUBLICATIONS

U.S. Appl. No. 11/007,139: Notice of Allowance and Fees, dated Dec. 29, 2016, 8 pages.

U.S. Appl. No. 11/007,139: Issue Notification, dated Apr. 19, 2017, 1 page.

U.S. Appl. No. 12/573,829: Non-Final Rejection, dated Dec. 16, 2016, 10 pages.

U.S. Appl. No. 12/573,829: Amendment/Req. Reconsideration—After Non-Final Reject, dated Mar. 16, 2017, 18 pages.

U.S. Appl. No. 12/573,829: Final Rejection, dated May 2, 2017, 20 pages.

U.S. Appl. No. 12/573,829: After Final Consideration Program Request, Jul. 5, 2017, 13 pages.

U.S. Appl. No. 15/250,118: Applicant Response to Pre-Exam Formalities Notice, dated Nov. 8, 2016, 21 pages.

U.S. Appl. No. 15/250,118: Filing Receipt, Nov. 15, 2016, 3 pages.

U.S. Appl. No. 15/250,118: Notice of Publication, dated Feb. 23, 2017, 1 page.

U.S. Appl. No. 15/250,118: Non-Final Rejection, dated Jun. 15, 2017, 22 pages.

(56) References Cited

OTHER PUBLICATIONS

U.S. Appl. No. 15/214,168: Notice of Publication, dated Nov. 10, 2016, 1 page.
U.S. Appl. No. 15/214,168: Non-Final Rejection, dated Mar. 2, 2017, 20 pages.
U.S. Appl. No. 15/214,168: Amendment/Req. Reconsideration—After Non-Final Reject, dated Jun. 2, 2017, 39 pages.
U.S. Appl. No. 12/830,236: Final Rejection, dated Dec. 14, 2016, 22 pages.
U.S. Appl. No. 12/830,236: Response After Final Action, dated Feb. 13, 2017, 14 pages.
U.S. Appl. No. 12/830,236: Advisory Action, dated Mar. 3, 2017, 2 pages.
U.S. Appl. No. 12/830,236: RCE and Amendments, dated Apr. 14, 2017, 17 pages.
U.S. Appl. No. 12/830,236: Non-Final Rejection, dated Jun. 21, 2017, 30 pages.
U.S. Appl. No. 15/081,612: RCE, Jan. 30, 2017, 2 pages.
U.S. Appl. No. 15/081,612: Issue Fee Payment, Jan. 30, 2017, 1 page.
U.S. Appl. No. 15/081,612: Notice of Allowance and Fees Due, dated Jan. 30, 2017, 2 pages.
U.S. Appl. No. 15/081,612: Notice of Allowance and Fees Due, dated Feb. 13, 2017, 7 pages.
U.S. Appl. No. 15/081,612: Amendment After Notice of Allowance, dated Mar. 20, 2017, 4 pages.
U.S. Appl. No. 15/081,612: Issue Fee Payment, Mar. 20, 2017, 1 page.
U.S. Appl. No. 15/240,964: Notice of Publication, dated Dec. 8, 2016.
U.S. Appl. No. 15/240,964: Non-Final Rejection, dated Mar. 14, 2017, 23 pages.
U.S. Pat. No. 5/240,964: Amendment/Req. Reconsideration—After Non-Final Reject, dated Jun. 14, 2017, 27 pages.
U.S. Appl. No. 14/614,292: Issue Notification, dated Jan. 18, 2017, 1 page.
U.S. Appl. No. 15/411,823, filed Jan. 20, 2017, 77 pages.
U.S. Appl. No. 15/411,823: Preliminary Amendment, dated Jan. 20, 2017, 25 pages.
U.S. Appl. No. 15/411,823: Filing Receipt, Jan. 31, 2017, 3 pages.
U.S. Appl. No. 15/411,823: Notice of Publication, dated May 11, 2017, 1 page.
U.S. Appl. No. 14/968,429: Non-Final Rejection, dated May 15, 2017, 8 pages.
Borodin et al., "A Tradeoff Between Search and Update Time for the Implicit Dictionary Problem", Theoretical Computer Science vol. 1 No. 4 (1990), 425-447.
Katajainen et al., "Tree Compression and Optimization with Applications", International Journal of Foundations of Computer Science, vol. 1 No. 4 (1990), 425-447.
U.S. Appl. No. 14/870,744: Non-Final Rejection, dated Aug. 24, 2017, 11 pages.
U.S. Appl. No. 12/573,829: Advisory Action/After Final Consideration Program Decision, dated Aug. 29, 2017, 5 pages.
U.S. Appl. No. 12/573,829: RCE and Amendments, dated Sep. 5, 2017, 24 pages.
U.S. Appl. No. 12/830,236: Amendment/Req. Reconsideration—After Non-Final Reject, dated Oct. 23, 2017, 18 pages.
U.S. Appl. No. 15/214,168: Terminal Disclaimer, Jul. 17, 2017, 4 pages.
U.S. Appl. No. 15/214,168: Notice of Allowance and Fees Due, dated Aug. 1, 2017, 26 pages.
U.S. Appl. No. 15/802,348: Application as filed with Preliminary Amendment, dated Nov. 2, 2017, 126 pages.
U.S. Appl. No. 15/802,348: Filing Receipt, Nov. 30, 2017, 4 pages.
U.S. Appl. No. 15/802,348: Notice to File Corrected Application Papers, Nov. 30, 2017, 2 pages.
U.S. Appl. No. 14/641,735: Non-Final Rejection, dated Jul. 14, 2017, 14 pages.
U.S. Appl. No. 14/641,735: Letter Restarting Period for Response, Aug. 24, 2017, 22 pages.
U.S. Appl. No. 14/641,735: Amendment/Req. Reconsideration—After Non-Final Reject, dated Nov. 24, 2017, 28 pages.
U.S. Appl. No. 15/240,964: Final Rejection, dated Aug. 9, 2017, 25 pages.
U.S. Appl. No. 15/240,964: After Final Consideration Program Request, Oct. 10, 2017, 30 pages.
U.S. Appl. No. 15/240,964: Advisory Action, dated Oct. 30, 2017, 3 pages.
U.S. Appl. No. 15/240,964: RCE and Amendments, dated Nov. 9, 2017, 31 pages.
U.S. Appl. No. 14/596,154: Non-Final Rejection, dated Sep. 21, 2017, 19 pages.
U.S. Appl. No. 14/968,429: Amendment/Req. Reconsideration—After Non-Final Reject, dated Aug. 9, 2017, 19 pages.
U.S. Appl. No. 14/968,429: Final Rejection, dated Oct. 24, 2017, 10 pages.
Boppana et al., "Full Fault Dictionary Storage Based on Labeled Tree Encoding", Proceedings of $14^{th}$ VLSI Test Symposium, 1996, pp. 174-179.
Caviness et al, "Simplification of Radical Expressions", ACM, pp. 329-338, 1976.
Hirschberg, "Algorithm for Computing Maximal Common Sebsequences", Communicatoin of the ACM, vol. 18, No. 6, pp. 341-343, 1975.
Siegel, "All Searches Are Divided into Three Parts String Searches Using Ternary Trees", ACM, pp. 57-68, 1988.
U.S. Appl. No. 14/870,744: Final Rejection, dated Mar. 30, 2018, 20 pages.
U.S. Appl. No. 12/573,829: Amendment/Req. Reconsideration—After Non-Final Reject, dated Mar. 27, 2018, 22 pages.
U.S. Appl. No. 15/250,118: RCE and Amendments, dated Apr. 16, 2018, 44 pages.
U.S. Appl. No. 15/802,348: Notice of Publication, dated Apr. 19, 2018, 1 page.
U.S. Appl. No. 12/830,236: Non-Final Rejection, dated Feb. 6, 2018, 28 pages.
U.S. Appl. No. 12/830,236: Amendment/Req. Reconsideration—After Non-Final Reject, dated May 4, 2018, 26 pages.
U.S. Appl. No. 14/641,735: Final Rejection, dated Mar. 15, 2018, 25 pages.
U.S. Appl. No. 14/641,735: Response After Final Action, dated May 15, 2018, 28 pages.
U.S. Appl. No. 14/596,154: Notice of Allowance and Fees Due, dated May 2, 2018, 8 pages.
U.S. Appl. No. 15/411,823: Amendment/Req. Reconsideration—After Non-Final Rejection, dated Apr. 24, 2018, 18 pages.
U.S. Appl. No. 15/411,823: Terminal Disclaimer-Filed and Approved, Apr. 24, 2018, 3 pages.
U.S. Appl. No. 14/968,429: Terminal Disclaimer-Filed and Approved, Feb. 7, 2018, 3 pages.
U.S. Appl. No. 14/968,429: Response After Final Action, dated Feb. 7, 2018, 13 pages.
U.S. Appl. No. 14/968,429: Notice of Allowance and Fees Due, dated Feb. 26, 2018, 8 pages.
U.S. Appl. No. 14/968,429: Notice of Allowance and Fees Due, dated Mar. 19, 2018, 6 pages.
U.S. Appl. No. 12/573,829: Advisory Action, dated Sep. 24, 2018, 4 pages.
U.S. Appl. No. 12/573,829: RCE and Amendments, dated Oct. 9, 2018, 20 pages.
U.S. Appl. No. 15/250,118: Terminal Disclaimer, Dec. 11, 2018, 4 pages.
U.S. Appl. No. 15/802,348: Preliminary Amendment, dated Oct. 26, 2018, 24 pages.
U.S. Appl. No. 12/830,236: After Final Consideration Program Request, Nov. 5, 2018, 24 pages.
U.S. Appl. No. 12/830,236: After Final Consideration Program Decision, Nov. 18, 2018, 4 pages.
U.S. Appl. No. 14/641,735: Preliminary Amendment, dated Oct. 26, 2018, 10 pages.

(56) References Cited

OTHER PUBLICATIONS

U.S. Appl. No. 14/641,735: Non-Final Rejection, dated Nov. 2, 2018, 28 pages.
U.S. Appl. No. 15/240,964: Amendment/Req. Reconsideration—After Non-Final Reject, dated Oct. 30, 2018, 43 pages.
U.S. Appl. No. 16/048,113: Applicant Response to Pre-Exam Formalities Notice and Amendment, dated Oct. 22, 2018, 38 pages.
U.S. Appl. No. 16/048,113: Filing Receipt, Oct. 24, 2018, 3 pages.
U.S. Appl. No. 15/411,823: Issue Notification, dated Nov. 7, 2018, 1 page.
U.S. Appl. No. 16/164,430, filed Oct. 18, 2018, 79 pages.
U.S. Appl. No. 16/164,430: Notice to File Missing Parts, dated Nov. 6, 2018, 2 pages.
U.S. Appl. No. 16/164,430: Filing Receipt, Nov. 6, 2018, 4 pages.
U.S. Appl. No. 16/048,061: Applicant Response to Pre-Exam Formalities Notice, dated Oct. 12, 2018, 13 pages.
U.S. Appl. No. 16/048,061: Filing Receipt, Oct. 16, 2018, 4 pages.
U.S. Appl. No. 16/048,061: Request for Corrected Filing Receipt, Oct. 31, 2018, 6 pages.
U.S. Appl. No. 16/048,061: Filing Receipt, Nov. 5, 2018, 4 pages.
U.S. Appl. No. 14/870,744: Response After Final Action, dated May 30, 2018, 33 pages.
U.S. Appl. No. 14/870,744: Advisory Action, dated Jul. 3, 2018, 5 pages.
U.S. Appl. No. 14/641,735: RCE and Amendments, dated Jul. 16, 2018, 34 pages.
U.S. Appl. No. 14/870,744: Notice of Allowance and Fees Due, dated Sep. 6, 2018, 11 pages.
U.S. Appl. No. 12/573,829: Final Rejection, dated Jul. 11, 2018, 15 pages.
U.S. Appl. No. 12/573,829: After Final Consideration Program Request, Sep. 7, /2018, 23 pages.
U.S. Appl. No. 12/830,236: Final Rejection, dated Sep. 5, 2018, 30 pages.
U.S. Appl. No. 14/641,735: Advisory Action, dated Jun. 8, 2018, 4 pages.
U.S. Appl. No. 14/641,735: Internet Communications Authorized, Jun. 23, 2018, 2 pages.
U.S. Appl. No. 15/240,964: Non-Final Rejection, dated Jul. 30, 2018, 32 pages.
U.S. Appl. No. 14/596,154: Issue Notification, dated Aug. 21, 2018, 1 page.
U.S. Appl. No. 16/048,119, filed Jul. 27, 2018, 81 pages.
U.S. Appl. No. 16/048,119: Filing Receipt, Aug. 24, 2018, 3 pages.
U.S. Appl. No. 16/048,119: Notice to File Missing Parts, dated Aug. 24, 2018, 2 pages.
U.S. Appl. No. 15/411,823: Notice of Allowance and Fees Due, dated Jul. 13, 2018, 8 pages.
U.S. Appl. No. 14/968,429: Amendment after Notice of Allowance, dated May 31, 2018, 12 pages.
U.S. Appl. No. 14/968,429: Amendment after Notice of Allowance, dated Jun. 13, 2018, 12 pages.
U.S. Appl. No. 14/968,429: Response to Amendment under Rule 312, dated Jul. 10, 2018, 2 pages.
U.S. Appl. No. 14/968,429: Response to Amendment under Rule 312, dated Jul. 23, 2018, 2 pages.
U.S. Appl. No. 14/968,429: Issue Notification, dated Aug. 1, 2018, 1 page.
U.S. Appl. No. 16/048,061, filed Jul. 27, 2018, 101 pages.
U.S. Appl. No. 16/048,061: Notice to File Missing Parts, dated Aug. 13, 2018, 2 pages.
U.S. Appl. No. 16/048,061: Filing Receipt, Aug. 13, 2018, 4 pages.
Ferragina et al., "The String B-Tree: A New Data Structure for String Search in External Memory and Its Applications", Journal of the ACM, vol. 46, No. 2, pp. 236-280, 1999.
Prasad et al., "Efficient Bit-Parallel Multi-Patterns String Matching Algorithms for Limited Expression", ACM, pp. 1-6, 2010.
Schmidt et al., "Comparision of Tree and Graph Encodings as Function of Problem Complexity", ACM, pp. 1674-1679, 2007.
Sinha et al, "Efficient Trie Based Sorting of Large Sets of Strings," ACM, pp. 1-8, 2003.
Spinells "Declarative Peephole Optimization Using String Pattern Matching", ACM, pp. 47-51, 1999.
Thiemann, "Grammar-Based Analysis of String Expressions", ACM, pp. 59-70, 2005.
Wagner et al., "The String-to-String Correction Problem", Journal of the Association for Computing Machinery, vol. 21, No. 1, pp. 168-173, 1974.
Xie et al., "S-Looper: Automatice Summarization for Multipath String Loops", ACM, pp. 188-198, 2015.
Yates et al, "A New Approach to Text Searchin", Communications of the ACM, vol. 35, No. 10, pp. 74-82, 1992.
U.S. Appl. No. 14/870,744: Applicant Response to Pre-Exam Formalities Notice, dated Feb. 19, 2016, 2 pages.
U.S. Appl. No. 15/250,118: Filing Receipt, Sep. 9, 2016, 3 pages.
U.S. Appl. No. 14/625,473: Notice of Allowance, dated Mar. 28, 2016, 19 pages.
U.S. Appl. No. 12/573,829: Non-Final Rejection, dated Jun. 13, 2016, 18 pages.
U.S. Appl. No. 12/573,829: Amendment/Req. Reconsideration—After Non-Final Reject, dated Sep. 13, 2016, 24 pages.
U.S. Appl. No. 12/573,829: Filing Receipt, Sep. 15, 2016, 3 pages.
U.S. Appl. No. 14/635,836: Notice of Allowance and Fees Due, dated Apr. 18, 2016, 25 pages.
U.S. Appl. No. 15/250,118, filed Aug. 29, 2016, 71 pages.
U.S. Appl. No. 15/250,118: Preliminary Amendment, dated Aug. 29, 2016, 20 pages.
U.S. Appl. No. 14/625,473: Issue Fee Payment and Amendments after Notice of Allowance, dated Jun. 28, 2016, 24 pages.
U.S. Appl. No. 14/625,473: Response to Amendment under Rule 312, dated Jun. 30, 2016, 1 page.
U.S. Appl. No. 14/625,473: Issue Notification, dated Jul. 20, 2016, 1 page.
U.S. Appl. No. 15/214,168: Application as filed with preliminary amendments, dated Jul. 19, 2016, 116 pages.
U.S. Appl. No. 15/214,168: Filing Receipt, Aug. 3, 2016, 4 pages.
U.S. Appl. No. 15/214,168: Corrected Filing Receipt, Oct. 12, 2016, 4 pages.
U.S. Appl. No. 12/830,236: Patent Board Decision, Mar. 9, 2016, 6 pages.
U.S. Appl. No. 12/830,236: RCE and Amendments, dated Apr. 27, 2016, 15 pages.
U.S. Appl. No. 12/830,236: Non-Final Rejection and Examiner Search, dated Jun. 29, 2016, 75 pages.
U.S. Appl. No. 12/830,236: Amendment/Req. Reconsideration-After Non-Final Reject, dated Sep. 6, 2016, 12 pages.
U.S. Appl. No. 13/632,581: Filing Receipt, Jan. 22, 2016, 4 pages.
U.S. Appl. No. 13/632,581: Electronic Terminal Disclaimer, Mar. 7, 2016, 3 pages.
U.S. Appl. No. 13/632,581: Issue Fee Payment, Mar. 16, 2016, 1 page.
U.S. Appl. No. 13/632,581: Amendment after Notice of Allowance, dated Mar. 16, 2016 19 pages.
U.S. Appl. No. 13/632,581: Response to Amendment under Rule 312, dated Mar. 22, 2016, 2 pages.
U.S. Appl. No. 13/632,581: Issue Notification, dated Apr. 13, 2016, 1 page.
U.S. Appl. No. 15/081,612, filed Mar. 25, 2016, 87 Pages.
U.S. Appl. No. 15/081,612: Notice to File Missing Parts and Filing Receipt, dated Apr. 11, 2016, 4 Pages.
U.S. Appl. No. 15/081,612: Filing Receipt, Apr. 11, 2016, 3 Pages.
U.S. Appl. No. 15/081,612: Applicant Response to Pre-Exam Formalities Notice and Preliminary Amendments, dated Jun. 13, 2016, 34 pages.
U.S. Appl. No. 15/081,612: Preliminary Amendment, dated Jun. 14, 2016, 4 pages
U.S. Appl. No. 15/081,612: Filing Receipt, Jun. 21, 2016, 3 pages
U.S. Appl. No. 15/081,612: Non-Final Rejection, dated Jul. 27, 2016, 9 pages
U.S. Appl. No. 15/081,612: Electronic Terminal Disclaimer, Sep. 23, 2016, 3 pages.

(56) References Cited

OTHER PUBLICATIONS

U.S. Appl. No. 15/081,612: Notice of Publication, dated Sep. 29, 2016, 1 page.
U.S. Appl. No. 15/081,612: Amendment/Req. Reconsideration—dated After Non-Final Reject, dated Oct. 17, 2016, 10 pages.
U.S. Appl. No. 15/081,612: Notice of Allowance and Fees, dated Oct. 27, 2016, 5 pages.
U.S. Appl. No. 14/726,192: Issue Fee Payment and Amendment after Notice of Allowance, dated Jul. 18, 2016, 13 pages.
U.S. Appl. No. 14/726,192: Response to Amendment under Rule 312, dated Jul. 21, 2016, 1 page.
U.S. Appl. No. 14/726,192: Response to Amendment under Rule 312, dated Jul. 22, 2016, 2 pages.
U.S. Appl. No. 14/726,192: Issue Notification, dated Aug. 3, 2016, 1 page.
U.S. Appl. No. 15/240.964: Application and Preliminary Amendments as filed Aug. 18, 2016, 70 pages.
U.S. Appl. No. 15/240,964: Filing Receipt, Aug. 31, 2016, 3 pages.
U.S. Appl. No. 14/614,292: Non-Final Rejection, dated May 19, 2016, 10 pages.
U.S. Appl. No. 14/614,292: Amendment/Req. Reconsideration—After Non-Final Rejection, dated Aug. 18, 2016.
U.S. Appl. No. 14/614,292: Notice of Allowance and Fees, dated Sep. 21, 2016, 8 pages.
U.S. Appl. No. 14/968,429: Notice of Publication, dated Apr. 28, 2016, 1 page.
"Core Technology Benchmarks a White Paper", Jul. 2002, downloaded from the internet Mar. 2, 2004.
"Origin Data, Inc. White Paper", ©1999, pp. 1-13.
"The Associative Model of Data White Paper", Lazy Software, Ltd., 2000.
ACM Portal Search Results (Kleene and prime and enumeration and operation and natural and numerals and sequences and "enumeration operation") conducted by Examiner on Jul. 18, 2009, 6 pages.
ACM Portal Search Results (Kleene and prime and enumeration and operation and natural and numerals and sequences and enumeration and operation) conducted by Examiner on Jul. 18, 2009, 1 page.
Alderson et al., "Toward an Optimization Driven Framework for Designing and Generating Realistic Internet Topologies" ACM SIGCOMM Computer Communications Review 41, vol. 33, No. 1, pp. 41-46, 2003.
Apostol, "A Centennial History of the Prime Number Theorem", Engineering and Science, No. 4, 1996.
Benedikt et al., "Definable Relations and First-Order Query Languages over Strings" Journal of the ACM, vol. 50, No. 5, pp. 694-751, 2003.
Cano et al., "Lazy Evaluation in Penniless Propagation over Join Trees", Networks, vol. 39(4), 2002 Wiley Periodicals, Inc., 175-185, 2002.
Cole, Richard, Hariharan, Ramesh, and Indyk, Piotr. "Tree pattern matching and subset matching in deterministic O(n log 3 n)-time", Proceedings of the Tenth Annual ACM-SIAM Symposium on Discrete Algorithms, p. 1-10, Jan. 2, 1999, Baltimore, Maryland, United States.
Cooper et al., "*Oh! Pascal*!", 1982, W.W. Norton & Company, Inc., Chapter 12, Arrays for Random Access, pp. 295-327.
Coenen, Frans; Leng, Paul and Ahmed, Shakil; "T-Trees, Vertical Partitioning and Distributed Association Rule Mining", IEEE, 2003.
Dubiner, M., Galil, Z., and Magen, E. "Faster Tree Pattern Matching.", Journal of the Association for Computing Machinery, vol. 41, No. 2, Mar. 1994, pp. 205-213.
Durango Bill's Enumeration of Trees. http://web.archive.org/web/20021028184112/http://www.durangobill.com/Trees.html, 1998.
Er, M.C., "Enumerating Ordered Trees Lexicographically", The Computation Journal, vol. 28, Issue 5, pp. 538-542, 1985.
Google search (Kleene prime enumeration operation natural numerals sequences "Kleene prime") conducted by Examiner on Jul. 18, 2009, 2 pages.

Google Search (Kleene prime enumeration operation natural numerals sequences "enumeration operation") conducted by Examiner on Jul. 18, 2009, 2 pages.
Google Search (Kleene prime enumeration operation) conducted by Examiner on Jul. 18, 2009, 2 pages.
Hoffman et al., "Pattern Matching in Trees", Purdue University, Jan. 1982, Journal for the Association for Computing Machinery, vol. 29, Issue 1, pp. 68-95.
Iacob et al., "XPath Extension for Querying Concurrent XML Markup", Technical Report #TR 394-04, Department of Computer Science, University of Kentucky, Lexington, KY 40506, Mar. 6, 2004, 15 pages.
IEEE Explore Digital Library Search Result conducted by Examiner on Jul. 18, 2009, 1 pages.
Johnston et al. Advances in Dataflow Programming Languages, ACM Computing Surveys, vol. 36, No. 1, pp. 1-34, 2004.
Kharbutli et al., "Using Prime Nos. For Cache Indexing to Eliminate Conflict Misses", Dept. of Electrical and Computer Engineering, North Carolina State University, Feb. 2004, 24 pages.
Kilpelainen, "Tree Matching Problems with Applications to Structured Text Databases", Ph.D. Dissertation, Department of Computer Science, University of Helsinki, Report A-1992-6, Helsinki, Finland, pp. 1-109, Nov. 1992.
Knuth, "The Art of Computer Programming", vol. 1 Fundamental Algorithms, Second edition, Addison-Wesley Series in *Computer Science and Information Processing*, ISBN 0-201-03809-9, Reading, Massachusetts, Copyright 1973.
Leinonen et al., "Automation of Document Structure Transformations", Auditorium, Microteknia Building, University of Kuopio, Nov. 5, 2004, 68 pages.
Lerman et al., "Learning the Common Structure of Data", American Association for Artificial Intelligence, AAAI-00 Proceedings, www.aaai.org, Apr. 13, 2000, 6 pages.
LeTourneau, "The Elementary Theory of Object Oriented Arithmetic", pp. 1-9, Apr. 1990.
Malhotra et al, "A Methodology for Formal Expression of Hierarchy in Model Solution", IEEE, pp. 258-267, 1983.
Navarro, "A Guided Tour to Approximate String Matching", ACM Computing Surveys, vol. 33, No. 1, pp. 31-88, 2001.
Neven, Frank and Thomas Schwentick, "Expressive and efficient pattern languages for tree-structured data" Proceedings of the Nineteenth ACM SIGACT-SIGMOD-SIGART Symposium on Principles of Database Systems, May 2000.
Ramesh, R. and Ramakrishnan, I.V., "Nonlinear Pattern Matching in Trees." Journal of the Association for Computer Machinery, vol. 39, No. 2. Apr. 1992, pp. 295-316.
Reiss, "Semantics-Based Code Search", IEEE ICSE, pp. 243-253, 2009.
Sechrest et al., "Blending Hierarchical and Attribute-Based File Naming", Distributed Computing System, 1992, Proceedings of the 12$^{th}$ International Conference on Jun. 9-12, 1992, pp. 572-580.
Shanmugasundaram et al., "Querying SML Views of Relational Data", Proceedings of the 27$^{th}$ VLDB Conference, Roma, Italy, 2001, 9 pages.
Sitaraman, Krishna, Ranganathan, N., and Ejnioui, Abdel, "A VLSI Architecture for Object Recognition using Tree Matching" Proceedings of the IEEE International Conference on Application-Specific Systems, Architectures, and Processors (ASAP'02) Dec. 2001, pp. 1-71.
Smorynski, Craig, "Logical Number Theory I: An Introduction", Springer-Verlag Berlin Heidelberg, ©1991, Arithmetic Encoding, The Cantor Pairing Function, pp, 14-23, and 305.
Somani et al., "Phased-Mission System Analysis Using Boolean Algebraic Methods", May 1994, ACM Press, vol. 22, Issue 1.
Sproat et al., "Compilation of Weighted Finite-State Tranducers from Decision Trees" ACM, pp. 215-222, 1996.
Stanat, D.F., and McAllister, D.F., "Discrete Mathematics in Computer Science", Prentice-Hall, 1977, Binary Relations, Ch. 3, Sec. 3.2, Trees, p. 131-145.
Talukdar, "Learning to Create Data-Integrating Queries", ACM PVLDB, pp. 785-796, 2008.
Valiente, "Algorithms on Trees and Graphs", Tree Isomorphism, pp. 151-251, Springer 2002.

(56) References Cited

OTHER PUBLICATIONS

Valiente, Gabriel, "Tree Isomorphism," of Algorithms on Trees and Graphs, Chapter 4, published by Springer, 2002, 51 pages.
Wu, "A Prime Number Labeling Scheme for Dynamic Ordered XML Trees", IEEE, 2004, 13 pages.
Zaks, S., "Lexicographic Generation of Ordered Trees", Dept. of Computer Science, University of Illinois, The Journal of Theoretical Computer Science, vol. 10(1), pp. 63-82, Revised 1978.
U.S. Appl. No. 11/005,859, filed Dec. 6, 2004, 120 pages.
U.S. Appl. No. 11/005,859: Notice to File Missing parts dated Jan. 10, 2005, 2 pages.
U.S. Appl. No. 11/005,859: Response to Notice to File Missing parts dated Apr. 1, 2005, 9 pages.
U.S. Appl. No. 11/005,859: Preliminary Amendment filed Apr. 28, 2005, 193 pages.
U.S. Appl. No. 11/005,859: Office Action—Restriction Requirement dated Dec. 12, 2007, 7 pages.
U.S. Appl. No. 11/005,859: Response to Office Action—Restriction Requirement filed Jan. 14, 2008, 82 pages.
U.S. Appl. No. 11/005,859: Non-final Office Action dated Mar. 21, 2008, 10 pages.
U.S. Appl. No. 11/005,859: Amendment filed Jul. 21, 2008, 86 pages.
U.S. Appl. No. 11/005,859: Final Office Action dated Oct. 30, 2008, 14 pages.
U.S. Appl. No. 11/005,859: Amendment filed Dec. 30, 2008, 83 pages.
U.S. Appl. No. 11/005,859: Advisory Action dated Jan. 13, 2009, 4 pages.
U.S. Appl. No. 11/005,859: RCE with amendment filed Apr. 30, 2009, 86 pages.
U.S. Appl. No. 11/005,859: Final Office Action dated Jul. 8, 2009, 9 pages.
U.S. Appl. No. 11/005,859: Examiner Interview Summary received Oct. 27, 2009, 3 pages.
U.S. Appl. No. 11/005,859: Amendment filed Dec. 8, 2009, 83 pages.
U.S. Appl. No. 11/005,859: Advisory Action dated Sep. 14, 2010, 3 pages.
U.S. Appl. No. 11/005,859: RCE With Amendment filed Jan. 7, 2010, 85 pages.
U.S. Appl. No. 11/005,859: Non-Final Office Action dated Jan. 21, 2010, 8 pages.
U.S. Appl. No. 11/005,859: Response to Non-Final Office Action filed Feb. 25, 2010, 83 pages.
U.S. Appl. No. 11/005,859: Final Office Action dated Jun. 8, 2010, 9 pages.
U.S. Appl. No. 11/005,859: Office Action Response dated Sep. 1, 2010, 89 pages.
U.S. Appl. No. 11/005,859: Notice of Appeal dated Sep. 29, 2010, 1 page.
U.S. Appl. No. 11/005,859: Office Action dated Oct. 15, 2010, 5 pages.
U.S. Appl. No. 11/005,859: Office Action Response dated Jan. 18, 2011, 95 pages.
U.S. Appl. No. 11/005,859: Final Office Action dated Mar. 30, 2011, 7 pages.
U.S. Appl. No. 11/005,859: Notice of Allowance and Fees Due, dated Jun. 9, 2011, 11 pages.
U.S. Appl. No. 11/005,859: Amendment after Notice of Allowance and Issue Fee Payment, dated Sep. 9, 2011, 2 pages.
U.S. Appl. No. 11/005,859: Issue Notification, dated Sep. 21, 2011, 1 page.
U.S. Appl. No. 13/229,624, filed Sep. 9, 2011, 139 pages.
U.S. Appl. No. 13/229,624: Filing receipt, mailed Sep. 21, 2011, 4 pages.
U.S. Appl. No. 13/229,624: Non-Final Office Action, dated Nov. 23, 2011, 8 pages.
U.S. Appl. No. 13/229,624: Notice of Publication, dated Dec. 30, 2011, 1 page.
U.S. Appl. No. 13/229,624: Amendment, dated Feb. 23, 2012, 22 pages.
U.S. Appl. No. 13/229,624: Final Office Action, dated Mar. 20, 2012, 10 pages.
U.S. Appl. No. 13/229,624: Amendment after final, dated Jun. 13, 2012, 25 pages.
U.S. Appl. No. 13/229,624: Advisory Action, dated Jun. 20, 2012, 4 pages.
U.S. Appl. No. 13/229,624: RCE, mailed Jul. 20, 2012, 26 pages.
U.S. Appl. No. 13/229,624: Non-Final Rejection, dated Oct. 2, 2013, 9 pages.
U.S. Appl. No. 13/229,624: Response to non-final office action, dated Dec. 27, 2013, 11 pages.
U.S. Appl. No. 13/229,624: Non-Final Office Action, dated Apr. 4, 2014, 5 Pages.
U.S. Appl. No. 13/229,624: Non-Final Office Action Response, dated Apr. 1, 2014, 9 Pages.
U.S. Appl. No. 13/229,624: Final Rejection, dated Oct. 30, 2014, 6 pages.
U.S. Appl. No. 13/229,624: Response and Amendments after Final, filed Jan. 30, 2015, 11 pages.
U.S. Appl. No. 13/229,624: Advisory Action, dated Mar. 11, 2015, 3 pages.
U.S. Appl. No. 13/229,624: Applicant Initiated Interview Summary, dated Mar. 19, 2015, 3 pages.
U.S. Appl. No. 13/229,624: Response After Final Action and Interview Summary, filed Mar. 27, 2015, 20 pages.
U.S. Appl. No. 13/229,624: RCE and Amendments, filed Apr. 27, 2015, 17 pages.
U.S. Appl. No. 13/229,624: Notice of Allowance and Fees, dated Jul. 6, 2015, 21 pages.
U.S. Appl. No. 13/229,624: Issue Fee Payment, Sep. 28, 2015, 1 page.
U.S. Appl. No. 13/229,624: Issue Notification, dated Oct. 14, 2015, 1 page.
U.S. Appl. No. 14/870,744, filed Sep. 30, 2015, 127 pages.
U.S. Appl. No. 14/870,744: Preliminary Amendments, dated Oct. 6, 2015, 10 pages.
U.S. Appl. No. 14/870,744: Notice to File Missing Parts, dated Oct. 16, 2015, 2 pages.
U.S. Appl. No. 14/870,744: Filing Receipt, Oct. 16, 2015, 3 pages.
U.S. Appl. No. 11/007,139, filed Dec. 7, 2004, 90 pages.
U.S. Appl. No. 11/007,139: Notice to File Missing Parts dated Jan. 19, 2005, 2 pages.
U.S. Appl. No. 11/007,139: Response to Notice to File Missing Parts dated Apr. 1, 2005, 9 pages.
U.S. Appl. No. 11/007,139: Preliminary Amendment filed Apr. 28, 2005, 146 pages.
U.S. Appl. No. 11/007,139: Non-final Office Action dated May 14, 2007, 58 pages.
U.S. Appl. No. 11/007,139: Amendment filed Oct. 15, 2007, 32 pages.
U.S. Appl. No. 11/007,139: Supplemental Response filed Oct. 17, 2007, 7 pages.
U.S. Appl. No. 11/007,139: Non-final Office Action dated Jan. 2, 2008 with Examiner's search result, 21 pages.
U.S. Appl. No. 11/007,139: Amendment filed Apr. 2, 2008, 30 pages.
U.S. Appl. No. 11/007,139: Final Office Action dated Aug. 15, 2008, 30 pages.
U.S. Appl. No. 11/007,139: Amendment filed Oct. 15, 2008, 26 pages.
U.S. Appl. No. 11/007,139: Advisory Action dated Oct. 22, 2008, 26 pages.
U.S. Appl. No. 11/007,139: RCE With Amendment filed Nov. 14, 2008, 32 pages.
U.S. Appl. No. 11/007,139: Non-final Office Action dated Dec. 8, 2008, 24 pages.
U.S. Appl. No. 11/007,139: Amendment filed May 8, 2009, 31 pages.
U.S. Appl. No. 11/007,139: Final Office Action dated Aug. 4, 2009, 26 pages.

(56) References Cited

OTHER PUBLICATIONS

U.S. Appl. No. 11/007,139: Amendment filed Dec. 4, 2009, 28 pages.
U.S. Appl. No. 11/007,139: Advisory Action dated Dec. 14, 2009, 4 pages.
U.S. Appl. No. 11/007,139: RCE with amendment filed Jan. 4, 2010, 27 pages.
U.S. Appl. No. 11/007,139: Non-Final Office Action dated Jan. 27, 2010, 31 pages.
U.S. Appl. No. 11/007,139: Response to Non-Final Office Action filed Apr. 27, 2010, 30 pages.
U.S. Appl. No. 11/007,139: Office Action dated Jul. 20, 2010, 20 pages.
U.S. Appl. No. 11/007,139: Office Action response dated Oct. 20, 2010, 33 pages.
U.S. Appl. No. 11/007,139: Advisory Action dated Oct. 25, 2010, 2 pages.
U.S. Appl. No. 11/007,139: Office Action response dated Nov. 18, 2010, 24 pages.
U.S. Appl. No. 11/007,139: Advisory Action dated Dec. 1, 2010, 4 pages.
U.S. Appl. No. 11/007,139: Office Action response and Notice of Appeal dated Dec. 20, 2010, 29 pages.
U.S. Appl. No. 11/007,139: Office Action dated Jan. 3, 2011, 24 pages.
U.S. Appl. No. 11/007,139: Office Action response, dated May 3, 2011, 27 pages.
U.S. Appl. No. 11/007,139: Final Office Action, dated Jul. 18, 2011, 23 pages.
U.S. Appl. No. 11/007,139: Amendment after final dated Oct. 18, 2011, 30 pages.
U.S. Appl. No. 11/007,139: Advisory Action and rule 312 amendment, dated Nov. 4, 2011, 4 pages.
U.S. Appl. No. 11/007,139: Notice of Appeal filed Nov. 16, 2011, 1 page.
U.S. Appl. No. 11/007,139: Appeal Brief filed May 1, 2012, 93 pages.
U.S. Appl. No. 11/007,139: Notice of defective appeal brief, mailed May 7, 2012, 3 pages.
U.S. Appl. No. 11/007,139: Appeal Brief filed May 15, 2012, 9 pages.
U.S. Appl. No. 11/007,139: Examiner's answer to appeal brief, mailed Aug. 20, 2012, 35 pages.
U.S. Appl. No. 11/007,139: Reply Brief, mailed Oct. 22, 2012, 29 pages.
U.S. Appl. No. 11/007,139: Appeal Docketing Notice, mailed Nov. 6, 2012, 2 pages.
U.S. Appl. No. 11/007,139: Patent Board Decision, mailed Jul. 24, 2015, 8 pages.
U.S. Appl. No. 11/006,320, filed Dec. 6, 2004, 75 pages.
U.S. Appl. No. 11/006,320: Response to Missing Parts and Preliminary Amendment filed May 9, 2005, 135 pages.
U.S. Appl. No. 11/006,320: Office Action—Restriction Requirement dated Mar. 26, 2007, 7 pages.
U.S. Appl. No. 11/006,320: Response to Restriction Requirement filed Apr. 27, 2007, 34 pages.
U.S. Appl. No. 11/006,320: Notice of Non-Compliant Amendment dated Jul. 6, 2007, 3 pages.
U.S. Appl. No. 11/006,320: Response to Non-Compliant Amendment filed Jul. 25, 2007, 33 pages.
U.S. Appl. No. 11/006,320: Non-final Office Action dated Oct. 1, 2007, 24 pages.
U.S. Appl. No. 11/006,320: Amendment filed Jan. 29, 2008, 45 pages.
U.S. Appl. No. 11/006,320: Notice of Non-Compliant Amendment dated Apr. 8, 2008, 4 pages.
U.S. Appl. No. 11/006,320: Amendment filed May 5, 2008, 44 pages.
U.S. Appl. No. 11/006,320: Non-final Office Action dated Aug. 15, 2008, 33 pages.
U.S. Appl. No. 11/006,320: Amendment filed Nov. 14, 2008, 40 pages.
U.S. Appl. No. 11/006,320: Office Action—Shortened Statutory Period dated Jan. 27, 2009, 2 pages.
U.S. Appl. No. 11/006,320: Amendment filed Apr. 27, 2009, 44 pages.
U.S. Appl. No. 11/006,320: Final Office Action dated Jul. 29, 2009, 13 pages.
U.S. Appl. No. 11/006,320: Amendment filed Nov. 30, 2009, 10 pages.
U.S. Appl. No. 11/006,320: Non-final Office Action dated Dec. 4, 2009, 25 pages.
U.S. Appl. No. 11/006,320: Response to Non-Final Office Action filed Feb. 23, 2010, 11 pages.
U.S. Appl. No. 11/006,320: Final Office Action dated May 24, 2010, 11 pages.
U.S. Appl. No. 11/006,320: Office Action response dated Aug. 24, 2010, 15 pages.
U.S. Appl. No. 11/006,320: Notice of Allowance dated Sep. 17, 2010, 8 pages.
U.S. Appl. No. 11/006,320: Examiner Interview Summary and supplemental Notice of Allowance dated Dec. 17, 2010, 9 pages.
U.S. Appl. No. 11/006,320: Rule 312 Amendment and Issue Fee payment dated Dec. 17, 2010, 10 pages.
U.S. Appl. No. 11/006,320: Issue Notification dated Jan. 12, 2011, 1 page.
U.S. Appl. No. 12/972,326, filed Dec. 17, 2010, 74 pages.
U.S. Appl. No. 12/972,326: Filing receipt and Notice to File Missing Parts dated Jan. 6, 2011, 5 pages.
U.S. Appl. No. 12/972,326: Response to Notice to File Missing parts dated Jan. 26, 2011, 14 pages.
U.S. Appl. No. 12/972,326: Filing Receipt, dated Feb. 18, 2011, 3 pages.
U.S. Appl. No. 12/972,326: Preliminary amendment dated May 20, 2011, 15 pages.
U.S. Appl. No. 12/972,326: Notice of publication and non-compliant amendment dated Jun. 2, 2011, 3 pages.
U.S. Appl. No. 12/972,326: Preliminary amendment dated Jul. 5, 2011, 21 pages.
U.S. Appl. No. 12/972,326: Notice of additional fee due, dated Jul. 12, 2011, 2 pages.
U.S. Appl. No. 12/972,326: Preliminary Amendment dated Aug. 10, 2011, 7 pages.
U.S. Appl. No. 12/972,326: Non-Final Office Action, dated Feb. 23, 2012, 9 pages.
U.S. Appl. No. 12/972,326: Abandonment, mailed Sep. 18, 2012, 2 pages.
U.S. Appl. No. 13/014,677, filed Jan. 26, 2011, 90 pages.
U.S. Appl. No. 13/014,677: Notice to file missing parts and filing receipt, dated Mar. 23, 2011, 5 pages.
U.S. Appl. No. 13/014,677: Notice of Abandonment dated Nov. 29, 2011, 2 pages.
U.S. Appl. No. 11/006,848: Response to Notice to File Missing Parts dated May 3, 2005, 101 pages.
U.S. Appl. No. 11/006,848: Non-Final Office Action dated Apr. 4, 2007, 11 pages.
U.S. Appl. No. 11/006,848: Response to Non-Final Office Action dated Oct. 3, 2007, 20 pages.
U.S. Appl. No. 11/006,848: Supplemental Amendment dated Nov. 13, 2007, 4 pages.
U.S. Appl. No. 11/006,848: Non-Final Office Action dated Feb. 5, 2008, 16 pages.
U.S. Appl. No. 11/006,848: Response to Non-Final Office Action filed Aug. 4, 2008, 27 pages.
U.S. Appl. No. 11/006,848: Final Office Action dated Dec. 2, 2008, 30 pages.
U.S. Appl. No. 11/006,848: RCE filed May 4, 2009, 24 pages.
U.S. Appl. No. 11/006,848: Notice of Allowance dated Jun. 11, 2009, 8 pages.
U.S. Appl. No. 11/006,848: Issue fee dated Sep. 11, 2009, 10 pages.
U.S. Appl. No. 11/006,848: Issue Notification dated Oct. 28, 2009, 1 page.
U.S. Appl. No. 12/573,829, filed Oct. 5, 2009, 64 pages.

(56) References Cited

OTHER PUBLICATIONS

U.S. Appl. No. 12/573,829: Notice to File Missing Parts and Filing Receipt dated Oct. 20, 2009, 5 pages.
U.S. Appl. No. 12/573,829: Preliminary Amendment dated Dec. 21, 2009, 17 pages.
U.S. Appl. No. 12/573,829: Filing receipt dated Jan. 4, 2010, 5 pages.
U.S. Appl. No. 12/573,829: Notice of Publication dated Apr. 15, 2010, 1 page.
U.S. Appl. No. 12/573,829: Office Action dated Jun. 28, 2010, 35 pages.
U.S. Appl. No. 12/573,829: Office Action Response dated Sep. 28, 2010, 22 pages.
U.S. Appl. No. 12/573,829: Office Action dated Nov. 1, 2010, 29 pages.
U.S. Appl. No. 12/573,829: Office Action Response dated Jan. 3, 2011, 29 pages.
U.S. Appl. No. 12/573,829: Advisory Action dated Jan. 7, 2011, 3 pages.
U.S. Appl. No. 12/573,829: Notice of Appeal dated Jan. 11, 2011, 1 page.
U.S. Appl. No. 12/573,829: Examiner's Answer to Appeal Brief, mailed Jul. 21, 2011, 31 pages.
U.S. Appl. No. 12/573,829: Reply brief filed Sep. 21, 2011, 17 pages.
U.S. Appl. No. 12/573,829: Reply brief noted Oct. 5, 2011, 2 pages.
U.S. Appl. No. 12/573,829: Appeal Docketing notice Oct. 11, 2011, 2 pages.
U.S. Appl. No. 12/573,829: Appeal Board Decision, mailed May 9, 2014, 10 pages.
U.S. Appl. No. 12/573,829 Request for continued examination, mailed Jul. 9, 2014, 19 pages.
U.S. Appl. No. 12/573,829 Non-Final Rejection and Examiner's Search, dated Apr. 28, 2015, 22 pages.
U.S. Appl. No. 12/573,829 Amendment/Req. Reconsideration After Non-Final Rejection, filed Jul. 27, 2015, 21 pages.
U.S. Appl. No. 12/573,829 Final Rejection and Examiner search, dated Sep. 15, 2015, 17 pages.
U.S. Appl. No. 12/573,829 Response After Final Action, Nov. 16, 2015, 17 pages.
U.S. Appl. No. 12/573,829 Advisory Action, dated Dec. 2, 2015, 4 pages.
U.S. Appl. No. 12/573,829 Request for Continued Examination and Amendments, mailed Dec. 14, 2015, 17 pages.
U.S. Appl. No. 11/006,841, filed Dec. 7, 2004, 63 pages.
U.S. Appl. No. 11/006,841: Notice to file missing parts dated Jan. 10, 2005, 2 pages.
U.S. Appl. No. 11/006,841: Response to Notice to file missing parts and preliminary amendment dated Apr. 14, 2005, 105 pages.
U.S. Appl. No. 11/006,841: Non-Final OA dated Apr. 6, 2007, 16 pages.
U.S. Appl. No. 11/006,841: Response to Non-Final OA dated Sep. 6, 2007, 63 pages.
U.S. Appl. No. 11/006,841: Restriction Requirement dated Nov. 27, 2007, 5 pages.
U.S. Appl. No. 11/006,841: Restriction Requirement response dated Dec. 27, 2007, 36 pages.
U.S. Appl. No. 11/006,841: Restriction Requirement dated Mar. 17, 2008, 9 pages.
U.S. Appl. No. 11/006,841: Response to Restriction Requirement dated Jul. 17, 2008, 33 pages.
U.S. Appl. No. 11/006,841: Final Office Action dated Oct. 29, 2008, 54 pages.
U.S. Appl. No. 11/006,841: Response to Final Office Action dated Dec. 29, 2008, 45 pages.
U.S. Appl. No. 11/006,841: Advisory Action dated Jan. 6, 2009, 3 pages.
U.S. Appl. No. 11/006,841: RCE mailed Apr. 23, 2009, 48 pages.
U.S. Appl. No. 11/006,841: Supplemental Response dated Jun. 26, 2009, 34 pages.
U.S. Appl. No. 11/006,841: Notice of Allowance dated Jun. 29, 2009, 40 pages.
U.S. Appl. No. 11/006,841: Issue Fee dated Sep. 29, 2009, 4 pages.
U.S. Appl. No. 11/006,841: Issue Notification dated Nov. 11, 2009, 1 page.
U.S. Appl. No. 12/578,411: Continuation application filed Oct. 13, 2009, 75 pages.
U.S. Appl. No. 12/578,411: Notice of Missing Parts dated Oct. 28, 2009, 6 pages.
U.S. Appl. No. 12/578,411: Response to Missing Parts filed Dec. 28, 2009, 25 pages.
U.S. Appl. No. 12/578,411: Filing Receipt mailed Jan. 7, 2010, 3 pages.
U.S. Appl. No. 12/578,411: Notice of Publication dated Apr. 15, 2010, 1 page.
U.S. Appl. No. 12/578,411: Restriction requirement dated Jun. 8, 2011, 6 pages.
U.S. Appl. No. 12/578,411: Response to restriction requirement dated Jul. 6, 2011, 19 pages.
U.S. Appl. No. 12/578,411: Non-Final Office Action, dated Aug. 23, 2011, 19 pages.
U.S. Appl. No. 12/578,411: Non-Final Office Action response dated Dec. 22, 2011, 38 pages.
U.S. Appl. No. 12/578,411: Final Rejection dated Jan. 20, 2012, 16 pages.
U.S. Appl. No. 12/578,411: Amendment, dated May 21, 2012, 23 pages.
U.S. Appl. No. 12/578,411: Advisory Action, dated May 31, 2012, 4 pages.
U.S. Appl. No. 12/578,411: RCE, mailed Jun. 12, 2012, 38 pages.
U.S. Appl. No. 12/578,411: Notice of Allowance, dated Aug. 19, 2013, 19 pages.
U.S. Appl. No. 12/578,411: Issue fee payment and Rule 312 amendment, dated Nov. 14, 2013, 14 pages.
U.S. Appl. No. 12/578,411: Examiner response to rule 312 amendment, dated Nov. 19, 2013, 2 pages.
U.S. Appl. No. 12/578,411: Response to Amendment under rule 312, dated Dec. 3, 2013, 3 pages.
U.S. Appl. No. 12/578,411: Issue Notification, dated Dec. 18, 2013, 1 page.
U.S. Appl. No. 14/086,837, filed Nov. 21, 2013, 68 Pages.
U.S. Appl. No. 14/086,837: Notice to File Missing Parts, dated Dec. 12, 2013, 5 Pages.
U.S. Appl. No. 14/086,837: Applicant Response to Pre-Exam Formalities Notice, dated Jun. 11, 2014, 26 Pages.
U.S. Appl. No. 14/086,837: Notice of Publication, dated Sep. 25, 2014, 4 Pages.
U.S. Appl. No. 14/086,837: Terminal Disclaimer, Filed Nov. 14, 2014, 1 page.
U.S. Appl. No. 14/086,837: Examiner's search strategy and results, mailed Dec. 2, 2014, 9 pages.
U.S. Appl. No. 14/086,837: Notice of Allowance and Fees, dated Dec. 2, 2014, 17 pages.
U.S. Appl. No. 14/086,837: Amendment After Notice of Allowance, filed Feb. 27, 2015, 9 pages.
U.S. Appl. No. 14/086,837: Issue Fee Payment, filed Feb. 27, 2015, 1 page.
U.S. Appl. No. 14/086,837: Issue Notification, dated May 6, 2015, 1 page.
U.S. Appl. No. 14/635,836, filed Mar. 2, 2015, 70 pages.
U.S. Appl. No. 14/635,836: Filing Receipt, mailed Mar. 12, 2015, 3 pages.
U.S. Appl. No. 14/635,836: Notice to File Missing Parts, dated Mar. 12, 2015, 2 pages.
U.S. Appl. No. 14/635,836: Applicant Response to Pre-Exam Formalities Notice, filed May 12, 2015, 40 pages.
U.S. Appl. No. 14/635,836: Filing Receipt, mailed May 19, 2015, 3 pages.
U.S. Appl. No. 14/635,836: Notice of Publication, dated Aug. 27, 2015, 1 page.
U.S. Appl. No. 14/635,836: Electronic Terminal Disclaimer Approved and Filed, Nov. 13, 2015, 3 pages.
U.S. Appl. No. 11/006,440, filed Dec. 6, 2004, 85 pages.

(56) References Cited

OTHER PUBLICATIONS

U.S. Appl. No. 11/006,440: Notice to file missing parts Jan. 11, 2005, 2 pages.
U.S. Appl. No. 11/006,440: Response to Notice to file missing parts dated Mar. 15, 2005, 8 pages.
U.S. Appl. No. 11/006,440: Preliminary Amendment dated Apr. 28, 2005, 140 pages.
U.S. Appl. No. 11/006,440: Preliminary Amendment and Substitute Specification dated Oct. 10, 2006, 139 pages.
U.S. Appl. No. 11/006,440: Restriction Requirement dated Mar. 29, 2007, 5 pages.
U.S. Appl. No. 11/006,440: Response to Restriction Requirement dated Apr. 30, 2007, 42 pages.
U.S. Appl. No. 11/006,440: Non-Final Office Action dated Jun. 21, 2007, 15 pages.
U.S. Appl. No. 11/006,440: Response to Non-Final Office Action dated Nov. 20, 2007, 42 pages.
U.S. Appl. No. 11/006,440: Final Office Action dated Feb. 6, 2008, 13 pages.
U.S. Appl. No. 11/006,440: Response to Final Office Action dated Apr. 7, 2008, 34 pages.
U.S. Appl. No. 11/006,440: Advisory Action dated May 9, 2008, 3 pages.
U.S. Appl. No. 11/006,440: Notice of appeal mailed Aug. 4, 2008, 1 page.
U.S. Appl. No. 11/006,440: RCE mailed Nov. 4, 2008, 39 pages.
U.S. Appl. No. 11/006,440: Final Office Action dated Jan. 23, 2009, 22 pages.
U.S. Appl. No. 11/006,440: Amendment after Final dated Apr. 23, 2009, 34 pages.
U.S. Appl. No. 11/006,440: Supplemental Amendment dated Jul. 17, 2009, 29 pages.
U.S. Appl. No. 11/006,440: Notice of Allowance dated Jul. 31, 2009, 15 pages.
U.S. Appl. No. 11/006,440: Examiner's Amendment and Reasons for Allowance dated Sep. 3, 2009, 9 pages.
U.S. Appl. No. 11/006,440: Issue Fee mailed Nov. 2, 2009, 12 pages.
U.S. Appl. No. 11/006,440: Issue Notification dated Dec. 2, 2009, 1 page.
U.S. Appl. No. 12/627,816: Continuation application filed Nov. 30, 2009, 95 pages.
U.S. Appl. No. 12/627,816: Notice of Missing Parts dated Dec. 15, 2009, 2 pages.
U.S. Appl. No. 12/627,816: Response to Missing Parts filed Apr. 12, 2010, 21 pages.
U.S. Appl. No. 12/627,816: Filing Receipt mailed Apr. 20, 2010, 3 pages.
U.S. Appl. No. 12/627,816: Notice of Publication dated Jul. 29, 2010, 1 page.
U.S. Appl. No. 12/627,816: Non-Final OA, mailed May 5, 2011, 19 pages.
U.S. Appl. No. 12/627,816: Non-Final OA response, mailed Nov. 7, 2011, 12 pages.
U.S. Appl. No. 12/627,816: Final Rejection dated Nov. 17, 2011, 18 pages.
U.S. Appl. No. 12/627,816: RCE mailed Feb. 17, 2012, 20 pages.
U.S. Appl. No. 12/627,816: Terminal disclaimer review, mailed Mar. 7, 2012, 1 page.
U.S. Appl. No. 12/627,816: Notice of Allowance, dated Aug. 1, 2013, 16 pages.
U.S. Appl. No. 12/627,816: Issue fee payment and Rule 312 amendment, dated Nov. 1, 2013, 14 pages.
U.S. Appl. No. 12/627,816: Examiner response to rule 312 amendment, dated Nov. 13, 2013, 2 pages.
U.S. Appl. No. 12/627,816: Issue Notification, dated Nov. 26, 2013, 1 page.
U.S. Appl. No. 14/086,808, filed Nov. 21, 2013, 87 Pages.
U.S. Appl. No. 14/086,808: Notice to File Missing Parts and Filing Receipt, dated Dec. 11, 2013, 5 Pages.
U.S. Appl. No. 14/086,808: Applicant Response to Pre-Exam Formalities Notice, dated Jun. 11, 2014, 53 Pages.
U.S. Appl. No. 14/086,808: Filing receipt, Mailed Jun. 17, 2014, 3 Pages.
U.S. Appl. No. 14/086,808: Notice of Publication, dated Sep. 25, 2014, 1 Page.
U.S. Appl. No. 14/086,808: Terminal Disclaimer, Filed Oct. 24, 2014, 2 pages.
U.S. Appl. No. 14/086,808: Terminal Disclaimer Review Decision, Mailed Oct. 29, 2014, 1 pages.
U.S. Appl. No. 14/086,808: Terminal Disclaimer, Filed Nov. 4, 2014, 2 pages.
U.S. Appl. No. 14/086,808: Terminal Disclaimer Review Decision, Mailed Nov. 13, 2014, 1 page.
U.S. Appl. No. 14/086,808: Examiner's search strategy and results, mailed Nov. 17, 2014, 5 pages.
U.S. Appl. No. 14/086,808; Notice of Allowance and fees, dated Nov. 17, 2014, 16 pages.
U.S. Appl. No. 14/086,808: Issue Fee Payment and Rule 312 amendment, filed Feb. 17, 2015, 1 page.
U.S. Appl. No. 14/086,808: Amendment After Notice of Allowance, dated Feb. 17, 2015, 17 pages.
U.S. Appl. No. 14/086,808: Response to Amendment under Rule 312, dated Feb. 20, 2015, 2 pages.
U.S. Appl. No. 14/086,808: Response to Amendment under Rule 312, dated Feb. 25, 2015, 3 pages.
U.S. Appl. No. 14/086,808: Issue Notification, dated Mar. 18, 2015, 1 page.
U.S. Appl. No. 14/625,473, filed Feb. 18, 2015, 92 pages.
U.S. Appl. No. 14/625,473: Filing Receipt, mailed Mar. 18, 2015, 3 pages.
U.S. Appl. No. 14/625,473: Notice to File Missing Parts, dated Mar. 18, 2015.
U.S. Appl. No. 14/625,473: Response to Pre-Exam Formalities Notice and Preliminary Amendment, filed May 18, 2015, 28 pages.
U.S. Appl. No. 14/625,473: Filing Receipt, mailed May 20, 2015, 3 pages.
U.S. Appl. No. 14/625,473: Notice of Publication, dated Aug. 27, 2015, 1 page.
U.S. Appl. No. 14/625,473: Electronic Terminal Disclaimer Filed and Approved, Nov. 13, 2015, 3 pages.
U.S. Appl. No. 11/006,446, filed Dec. 6, 2004, 91 pages.
U.S. Appl. No. 11/006,446: Notice of Missing Parts dated Jan. 24, 2005, 3 pages.
U.S. Appl. No. 11/006,446: Response to Notice to File Missing Parts dated Mar. 29, 2005, 8 pages.
U.S. Appl. No. 11/006,446: Preliminary Amendment filed Apr. 28, 2005, 118 pages.
U.S. Appl. No. 11/006,446: Office Action—Restriction Requirement dated Apr. 4, 2007, 5 pages.
U.S. Appl. No. 11/006,446: Response to Office Action—Restriction Requirement filed May 3, 2007, 6 pages.
U.S. Appl. No. 11/006,446: Non-final Office Action dated Jul. 26, 2007, 45 pages.
U.S. Appl. No. 11/006,446: Amendment filed Nov. 26, 2007, 38 pages.
U.S. Appl. No. 11/006,446: Non-final Office Action dated Feb. 20, 2008, 67 pages.
U.S. Appl. No. 11/006,446: Amendment filed Jul. 21, 2008, 33 pages.
U.S. Appl. No. 11/006,446: Final Office Action dated Oct. 28, 2008, 49 pages.
U.S. Appl. No. 11/006,446: Amendment filed Dec. 29, 2008, 33 pages.
U.S. Appl. No. 11/006,446: Advisory Action dated Jan. 7, 2009, 4 pages.
U.S. Appl. No. 11/006,446: RCE With Amendment filed Apr. 28, 2009, 38 pages.
U.S. Appl. No. 11/006,446: Non-final Office Action dated Jul. 7, 2009, 41 pages.
U.S. Appl. No. 11/006,446: Examiner Interview Summary and Search Results dated Oct. 26, 2009, 6 pages.

(56) References Cited

OTHER PUBLICATIONS

U.S. Appl. No. 11/006,446: Amendment dated Dec. 7, 2009, 33 pages.
U.S. Appl. No. 11/006,446: Examiner Interview Summary dated Mar. 19, 2010, 4 pages.
U.S. Appl. No. 11/006,446: Notice of Allowance/Allowability dated Mar. 19, 2010, 29 pages.
U.S. Appl. No. 11/006,446: Issue Fee Payment and 312 Amendment filed Jun. 21, 2010, 23 pages.
U.S. Appl. No. 11/006,446: Rule 312 Amendment dated Aug. 19, 2010, 2 pages.
U.S. Appl. No. 11/006,446: Formal drawings mailed Aug. 25, 2010, 29 pages.
U.S. Appl. No. 11/006,446: Issue Notification dated Sep. 1, 2010, 1 page.
U.S. Appl. No. 12/830,236: Divisional Application filed Jul. 2, 2010, 103 pages.
U.S. Appl. No. 12/830,236: Notice to File Corrected Application Papers dated Jul. 16, 2010, 5 pages.
U.S. Appl. No. 12/830,236: Response to Notice to File Corrected Application Papers mailed Aug. 25, 2010, 32 pages.
U.S. Appl. No. 12/830,236: Filing receipt mailed Sep. 3, 2010, 3 pages.
U.S. Appl. No. 12/830,236: Notice of Publication dated Dec. 16, 2010, 1 page.
U.S. Appl. No. 12/830,236: Restriction requirement dated Mar. 18, 2011, 6 pages.
U.S. Appl. No. 12/830,236: Restriction requirement response, dated Apr. 18, 2011, 5 pages.
U.S. Appl. No. 12/830,236: Non-Final Office Action, dated May 11, 2011, 10 pages.
U.S. Appl. No. 12/830,236: Response to Non-Final Office Action dated Jul. 6, 2011, 18 pages.
U.S. Appl. No. 12/830,236: Final Office Action, dated Oct. 14, 2011, 18 pages.
U.S. Appl. No. 12/830,236: Amendment after final, filed Jan. 17, 2012, 26 pages.
U.S. Appl. No. 12/830,236: Advisory Action, dated Feb. 8, 2012, 6 pages.
U.S. Appl. No. 12/830,236: Notice of Appeal filed Mar. 8, 2012, 3 pages.
U.S. Appl. No. 12/830,236: RCE, filed Jun. 5, 2012, 23 pages.
U.S. Appl. No. 12/830,236: Non-Final Office Action, dated Jul. 31, 2012, 18 pages.
U.S. Appl. No. 12/830,236: Amendment, filed Nov. 1, 2012, 27 pages.
U.S. Appl. No. 12/830,236: Final Office Action, dated Feb. 27, 2013, 35 pages.
U.S. Appl. No. 12/830,236: Response after final, dated Jun. 27, 2013, 36 pages.
U.S. Appl. No. 12/830,236: Advisory action, dated Jul. 12, 2013, 4 pages.
U.S. Appl. No. 12/830,236: Notice of appeal, filed Jul. 19, 2013, 2 pages.
U.S. Appl. No. 12/830,236: Appeal brief, filed Sep. 18, 2013, 44 pages.
U.S. Appl. No. 12/830,236: Examiners answer to appeal brief, mailed Dec. 18, 2013, 35 pages.
U.S. Appl. No. 12/830,236: Reply Brief as Filed on Feb. 18, 2014, 16 Pages.
U.S. Appl. No. 12/830,236: Appeal Docketing Notice, Mailed Mar. 21, 2014, 2 Pages.
U.S. Appl. No. 11/385,257, filed Mar. 20, 2006, 118 pages.
U.S. Appl. No. 11/385,257: Notice of Missing Parts dated May 3, 2006, 2 pages.
U.S. Appl. No. 11/385,257: Response to Missing Parts filed Aug. 3, 2006, 46 pages.
U.S. Appl. No. 11/385,257: Notice of Publication dated Nov. 30, 2006, 1 page.
U.S. Appl. No. 11/385,257: Non-final Office Action dated Apr. 29, 2008, 44 pages.
U.S. Appl. No. 11/385,257: Amendment filed Jul. 29, 2008, 29 pages.
U.S. Appl. No. 11/385,257: Final Office Action dated Dec. 9, 2008, 47 pages.
U.S. Appl. No. 11/385,257: RCE with Amendment filed May 11, 2009, 38 pages.
U.S. Appl. No. 11/385,257: Supplemental Amendment filed May 26, 2009, 32 pages.
U.S. Appl. No. 11/385,257: Notice of Non-Compliant Amendment dated Jun. 1, 2009, 3 pages.
U.S. Appl. No. 11/385,257: Amendment filed Jun. 30, 2009, 34 pages.
U.S. Appl. No. 11/385,257: Non-final Office Action dated Sep. 14, 2009, 60 pages.
U.S. Appl. No. 11/385,257: Response to Non-Final Office Action filed Jan. 13, 2010, 34 pages.
U.S. Appl. No. 11/385,257: Final Office Action dated Apr. 12, 2010, 47 pages.
U.S. Appl. No. 11/385,257: RCE mailed Aug. 12, 2010, 35 pages.
U.S. Appl. No. 11/385,257U.S. Appl. No. Office Action dated Sep. 30, 2010, 39 pages.
U.S. Appl. No. 11/385,257: Office Action response, dated Mar. 29, 2011, 31 pages.
U.S. Appl. No. 11/385,257: Final Rejection dated Jun. 1, 2011, 40 pages.
U.S. Appl. No. 11/385,257: Request for continued Examination dated Nov. 1, 2011, 30 pages.
U.S. Appl. No. 11/385,257: Non-Final Office Action, dated Jan. 9, 2012, 40 pages.
U.S. Appl. No. 11/385,257: Amendment, dated Apr. 6, 2012, 30 pages.
U.S. Appl. No. 11/385,257: Notice of allowance and Examiner interview summary, dated Jun. 22, 2012, 36 pages.
U.S. Appl. No. 11/385,257: Office communication concerning previous IDS filing, dated Oct. 4, 2012, 4 pages.
U.S. Appl. No. 11/385,257: Miscellaneous Communication to Applicant, dated Oct. 15, 2012, 3 pages.
U.S. Appl. No. 11/385,257: Rule 312 Amendment, dated Dec. 12, 2012, 10 pages.
U.S. Appl. No. 11/385,257: Issue Notification, dated Dec. 22, 2012, 1 page.
U.S. Appl. No. 13/625,812, filed Sep. 24, 2012, 123 pages.
U.S. Appl. No. 13/625,812: Notice to file missing parts, dated Oct. 15, 2012, 6 pages.
U.S. Appl. No. 13/625,812: Response to Notice to file missing parts and preliminary amendment, dated Mar. 8, 2013, 47 pages.
U.S. Appl. No. 13/625,812: Notice of incomplete reply, dated Mar. 15, 2013, 3 pages.
U.S. Appl. No. 13/625,812: Response to incomplete reply notice, dated Apr. 2, 2013, 5 pages.
U.S. Appl. No. 13/625,812: Non-Final office action, dated Jul. 26, 2013, 29 pages.
U.S. Appl. No. 13/625,812: Publication notice, mailed Aug. 1, 2013, 1 page.
U.S. Appl. No. 13/625,812: Response to non-final office action, dated Oct. 9, 2013, 15 pages.
U.S. Appl. No. 13/625,812: Final rejection, dated Dec. 3, 2013, 28 pages.
U.S. Appl. No. 13/625,812: Advisory Action (PTOL-303), dated Apr. 9, 2014, 3 Pages.
U.S. Appl. No. 13/625,812: Notice of Appeal, filed May 5, 2014, 1 Page.
U.S. Appl. No. 13/625,812: Request for Continued Examination, dated Aug. 4, 2014, 18 Pages.
U.S. Appl. No. 13/625,812: Response After Final Action, dated Apr. 1, 2014, 1 Page.
U.S. Appl. No. 13/625,812: Request for Corrected Filing Receipt, dated Aug. 21, 2014, 6 Pages.
U.S. Appl. No. 13/625,812: Filing Receipt, Mailed Aug. 27, 2014, 3 Pages.

(56) References Cited

OTHER PUBLICATIONS

U.S. Appl. No. 13/625,812: Notice of Allowance and Fees, dated Dec. 9, 2014, 20 pages.
U.S. Appl. No. 13/625,812: Filing Receipt, mailed Feb. 2, 2015, 3 pages.
U.S. Appl. No. 13/625,812: Filing Receipt, mailed Feb. 6, 2015, 3 pages.
U.S. Appl. No. 13/625,812: Terminal Disclaimer Filed Mar. 2, 2015, 1 page.
U.S. Appl. No. 13/625,812: Post Allowance Arguments/Amendments, filed Mar. 6, 2015, 6 pages.
U.S. Appl. No. 13/625,812: Amendment After Notice of Allowance, filed Mar. 9, 2015, 3 pages.
U.S. Appl. No. 13/625,812: Issue Fee Payment, filed Mar. 9, 2015, 1 page.
U.S. Appl. No. 13/625,812: Terminal Disclaimer Review Decision, mailed Mar. 12, 2015.
U.S. Appl. No. 14/641,735, filed Mar. 9, 2015, 126 pages.
U.S. Appl. No. 14/641,735: Filing Receipt, mailed Mar. 20, 2015, 3 pages.
U.S. Appl. No. 14/641,735: Notice to File Missing Parts, dated Mar. 20, 2015, 2 pages.
U.S. Appl. No. 14/641,735: Notice of Incomplete Reply, dated Jun. 26, 2015, 2 pages.
U.S. Appl. No. 14/641,735: Applicant Response to Pre-Exam Formalities Notice and Amendments, filed Jul. 8, 2015, 32 pages.
U.S. Appl. No. 14/641,735: Electronic Terminal Disclaimer, filed Aug. 27, 2015, 3 pages.
U.S. Appl. No. 14/641,735: Notice of Publication, dated Oct. 29, 2015, 1 page.
U.S. Appl. No. 14/641,735: Preliminary Amendment, Jan. 14, 2016, 8 pages.
U.S. Appl. No. 11/319,758, filed Dec. 27, 2005, 79 pages.
U.S. Appl. No. 11/319,758: Notice of Missing Parts dated Feb. 1, 2006, 2 pages.
U.S. Appl. No. 11/319,758: Response to Missing Parts filed Jul. 3, 2006, 15 pages.
U.S. Appl. No. 11/319,758: Non-final Office Action dated Nov. 12, 2008, 46 pages.
U.S. Appl. No. 11/319,758: Amendment filed May 12, 2009, 40 pages.
U.S. Appl. No. 11/319,758: Final Office Action dated Aug. 3, 2009, 39 pages.
U.S. Appl. No. 11/319,758: RCE filed Jan. 4, 2010, 45 pages.
U.S. Appl. No. 11/319,758: Non-Final Office Action dated Mar. 30, 2010, 39 pages.
U.S. Appl. No. 11/319,758: Office Action response dated Jul. 29, 2010, 30 pages.
U.S. Appl. No. 11/319,758: Final Office Action dated Oct. 28, 2010, 31 pages.
U.S. Appl. No. 11/319,758: Request for Continued Examination, dated Mar. 28, 2011, 32 pages.
U.S. Appl. No. 11/319,758: Non-Final office action dated Jun. 3, 2011, 31 pages.
U.S. Appl. No. 11/319,758: Non-Final Office Action Response dated Nov. 3, 2011, 29 pages.
U.S. Appl. No. 11/319,758: Final Office Action, dated Jan. 17, 2012, 22 pages.
U.S. Appl. No. 11/319,758: Amendment after final, dated May 17, 2012, 34 pages.
U.S. Appl. No. 11/319,758: Advisory Action, dated Jun. 20, 2012, 3 pages.
U.S. Appl. No. 11/319,758: Amendment after final, dated Jun. 28, 2012, 29 pages.
U.S. Appl. No. 11/319,758: Notice of Allowance and examiner's interview summary, dated Jul. 17, 2012, 10 pages.
U.S. Appl. No. 11/319,758: Issue Fee payment, Rule 312 and Miscellaneous Communication, mailed Oct. 12, 2012, 12 pages.
U.S. Appl. No. 11/319,758: Issue Notification, dated Oct. 31, 2012, 1 page.

U.S. Appl. No. 13/632,581, filed Oct. 1, 2012, 88 Pages.
U.S. Appl. No. 13/632,581: Notice to File Missing Parts and Filing Receipt, dated Oct. 22, 2012, 27 Pages.
U.S. Appl. No. 13/632,581: Filing Receipt, Mailed Mar. 5, 2014, 3 Pages.
U.S. Appl. No. 13/632,581: Notice of Publication, dated Jun. 13, 2013, 1 Page.
U.S. Appl. No. 13/632,581: Non-final Office Action, dated Jul. 3, 2013, 22 Pages.
U.S. Appl. No. 13/632,581: Non-Final Office Action Response, dated Sep. 11, 2013, 23 Pages.
U.S. Appl. No. 13/632,581: Final Office Action, dated Dec. 18, 2013, 27 Pages.
U.S. Appl. No. 13/632,581: Response After Final Action, dated Mar. 18, 2014, 37 Pages.
U.S. Appl. No. 13/632,581: Advisory Action (PTOL-303), dated Apr. 3, 2014, 4 Pages.
U.S. Appl. No. 13/632,581: Notice of Appeal Filed Jul. 17, 2014, 2 Pages.
U.S. Appl. No. 13/632,581: Request for Continued Examination, dated Jul. 16, 2014, 23 Pages.
U.S. Appl. No. 13/632,581: Notice Non-Compliant Amendment, dated Oct. 20, 2014, 5 pages.
U.S. Appl. No. 13/632,581: Amendment/Req Reconsideration after Non-Final Reject, Filed Nov. 4, 2014, 16 pages.
U.S. Appl. No. 13/632,581: Non-Final Rejection, dated Jan. 27, 2015, 16 pages.
U.S. Appl. No. 13/632,581: Amendment/Req Reconsideration Non-Final Rejection and Amendments, filed Apr. 20, 2015, 24 pages.
U.S. Appl. No. 13/632,581: Final Rejection, dated Jul. 20, 2015, 21 pages.
U.S. Appl. No. 13/632,581: After Final Consideration Request and Response, Sep. 21, 2015, 28 pages.
U.S. Appl. No. 13/632,581: Advisory Action and After Final Decision, Oct. 2, 2015, 18 pages.
U.S. Appl. No. 13/632,581: RCE and Amendments, dated Nov. 30, 2015, 55 pages.
U.S. Appl. No. 13/632,581: Notice of Allowance and Fees, dated Dec. 17, 2015, 5 pages.
U.S. Appl. No. 11/006,842, filed Dec. 7, 2004, 58 pages.
U.S. Appl. No. 11/006,842: Notice to file missing parts Jan. 10, 2005, 2 pages.
U.S. Appl. No. 11/006,842: Response to Notice to file missing parts dated Apr. 1, 2005, 7 pages.
U.S. Appl. No. 11/006,842: Preliminary Amendment dated May 2, 2005, 93 pages.
U.S. Appl. No. 11/006,842: Restriction Requirement dated Jan. 23, 2008, 5 pages.
U.S. Appl. No. 11/006,842: Response to Restriction Requirement dated Feb. 25, 2008, 25 pages.
U.S. Appl. No. 11/006,842: Restriction Requirement dated May 13, 2008, 5 pages.
U.S. Appl. No. 11/006,842: Response to Restriction Requirement dated Aug. 13, 2008, 24 pages.
U.S. Appl. No. 11/006,842: Non-Final Office Action dated Nov. 3, 2008.
U.S. Appl. No. 11/006,842: Response to Non-Final Office Action dated May 4, 2009, 35 pages.
U.S. Appl. No. 11/006,842: Supplemental Response dated Jul. 17, 2009, 23 pages.
U.S. Appl. No. 11/006,842: Notice of Allowance dated Jul. 27, 2009, 13 pages.
U.S. Appl. No. 11/006,842: Issue Fee filed Oct. 27, 2009, 1 page.
U.S. Appl. No. 11/006,842: Issue notification dated Nov. 18, 2009, 1 page.
U.S. Appl. No. 12/613,450: Continuation application filed Nov. 5, 2009, 63 pages.
U.S. Appl. No. 12/613,450: Notice of Missing Parts dated Nov. 18, 2009, 2 pages.
U.S. Appl. No. 12/613,450: Preliminary Amendment and Response to Missing Parts filed Jan. 19, 2010, 16 pages.
U.S. Appl. No. 12/613,450: Filing receipt mailed Jan. 27, 2010, 3 pages.

(56) References Cited

OTHER PUBLICATIONS

U.S. Appl. No. 12/613,450: Notice of Publication dated May 6, 2010, 1 page.
U.S. Appl. No. 12/613,450: Restriction requirement dated Jun. 10, 2011, 5 pages.
U.S. Appl. No. 12/613,450: Response to restriction requirement dated Jul. 6, 2011, 17 pages.
U.S. Appl. No. 12/613,450: Non-Final Office Action, dated Aug. 25, 2011, 15 pages.
U.S. Appl. No. 12/613,450: Non-Final OA response dated Dec. 27, 2011, 28 pages.
U.S. Appl. No. 12/613,450: Final rejection, dated Feb. 14, 2012, 14 pages.
U.S. Appl. No. 12/613,450: Amendment after final, dated Jun. 8, 2012, 23 pages.
U.S. Appl. No. 12/613,450: Advisory Action, dated Jun. 20, 2012, 4 pages.
U.S. Appl. No. 12/613,450: RCE, mailed Jul. 12, 2012, 25 pages.
U.S. Appl. No. 12/613,450: Notice of Allowance, dated Oct. 7, 2013, 20 pages.
U.S. Appl. No. 12/613,450: Electronic Terminal Disclaimer filed and approved, Jan. 2, 2014, 2 pages.
U.S. Appl. No. 12/613,450: Amendment After Final or Under 37CFR 1.312, initialed by the Examiner, dated Jan. 14, 2014, 2 Pages.
U.S. Appl. No. 12/613,450: Issue Notification, dated Jan. 22, 2014, 1 Page.
U.S. Appl. No. 14/149,749, filed Jan. 7, 2014, 59 Pages.
U.S. Appl. No. 14/149,749: Notice to File Missing Parts and Filing Receipt, dated Jan. 23, 2014, 6 Pages.
U.S. Appl. No. 14/149,749: Applicant Response to Pre-exam Formalities Notice, dated May 23, 2014 12 Pages.
U.S. Appl. No. 14/149,749: Applicant Response to Pre-Exam Formalities Notice, dated Aug. 25, 2014, 103 Pages.
U.S. Appl. No. 14/149,749: Filing Receipt, dated Sep. 4, 2014, 3 Pages.
U.S. Appl. No. 14/149,749: Notice of Publication, dated Dec. 11, 2014, 1 page.
U.S. Appl. No. 14/149,749: Electronic Terminal Disclaimer Filed and Approved Feb. 23, 2015.
U.S. Appl. No. 14/149,749: Examiner Initiated Interview Summary, dated Feb. 24, 2015, 2 pages.
U.S. Appl. No. 14/149,749: Notice of Allowance and Fees and Examiner Search, dated Apr. 17, 2015, 30 pages.
U.S. Appl. No. 14/149,749: Amendment after Notice of Allowance, filed May 27, 2015, 10 pages.
U.S. Appl. No. 14/149,749: Issue Fee Payment, filed May 27, 2015, 1 page.
U.S. Appl. No. 14/149,749: Electronic Terminal Disclaimer Filed and Approved, May 27, 2015, 3 pages.
U.S. Appl. No. 14/149,749: Response to Amendment under Rule 312, May 29, 2015, 1 page.
U.S. Appl. No. 14/149,749: Response to Amendment under Rule 312, Jun. 1, 2015, 3 pages.
U.S. Appl. No. 14/149,749: Issue Notification, dated Jun. 17, 2015, 1 page.
U.S. Appl. No. 14/726,192, filed May 29, 2015, 39 pages.
U.S. Appl. No. 14/726,192: Filing Receipt, dated Jun. 9, 2015, 3 pages.
U.S. Appl. No. 14/726,192: Notice to File Missing Parts, dated Jun. 9, 2015, 2 pages.
U.S. Appl. No. 14/726,192: Applicant Response to Pre-Exam Formalities Notice and Amendments, filed Aug. 12, 2015, 114 pages.
U.S. Appl. No. 14/726,192: Filing Receipt, mailed Aug. 20, 2015, 3 pages.
U.S. Appl. No. 14/726,192: Electronic Terminal Disclaimer Filed and Approved, Nov. 20, 2015, 3 pages.
U.S. Appl. No. 14/726,192: Notice of Publication, dated Nov. 27, 2015, 1 page.
U.S. Appl. No. 11/320,538: Notice of Missing Parts dated Feb. 2, 2006, 2 pages.
U.S. Appl. No. 11/320,538: Response to Missing Parts filed Aug. 2, 2006, 36 pages.
U.S. Appl. No. 11/320,538: Non-final Office Action dated Apr. 1, 2009, 27 pages.
U.S. Appl. No. 11/320,538: Amendment filed Jul. 1, 2009, 54 pages.
U.S. Appl. No. 11/320,538: Final Office Action dated Nov. 2, 2009, 29 pages.
U.S. Appl. No. 11/320,538: Response to Final Office Action filed Jan. 4, 2010, 23 pages.
U.S. Appl. No. 11/320,538: Advisory Action dated Jan. 19, 2010, 3 pages.
U.S. Appl. No. 11/320,538: RCE and Amendment filed Apr. 2, 2010, 26 pages.
U.S. Appl. No. 11/320,538: Non-Final Office Action dated Jun. 9, 2010, 24 pages.
U.S. Appl. No. 11/320,538: Office action dated Dec. 22, 2010, 10 pages.
U.S. Appl. No. 11/320,538: Notice of Appeal, dated May 23, 2011, 6 pages.
U.S. Appl. No. 11/320,538: Pre-brief appeal conference decision dated Jun. 30, 2011, 2 pages.
U.S. Appl. No. 11/320,538: Request for Continued Examination mailed Dec. 23, 2011, 21 pages.
U.S. Appl. No. 11/320,538: Non-Final Office Action, dated Dec. 19, 2012, 12 pages.
U.S. Appl. No. 11/320,538: Response to Non-final office action, dated Apr. 17, 2013, 20 pages.
U.S. Appl. No. 11/320,538: Notice of allowance, dated Aug. 1, 2013, 25 pages.
U.S. Appl. No. 11/320,538: Issue fee payment, mailed Nov. 1, 2013, 7 pages.
U.S. Appl. No. 11/320,538: Rule 312 amendment, dated Nov. 19, 2013, 20 pages.
U.S. Appl. No. 11/320,538: Issue Notification, dated Dec. 4, 2013, 1 page.
U.S. Appl. No. 14/086,741, filed Dec. 12, 2013, 77 Pages.
U.S. Appl. No. 14/086,741: Filing Receipt and Notice to File Missing Parts, dated Dec. 12, 2013, 6 Pages.
U.S. Appl. No. 14/086,741: Applicant Response to Pre-Exam Formalities Notice, dated Dec. 12, 2014, 60 Pages.
U.S. Appl. No. 14/086,741: Filing Receipt, Mailed Jun. 17, 2014, 3 Pages.
U.S. Appl. No. 14/086,741: Notice of Publication, dated Sep. 25, 2014, 1 Page.
U.S. Appl. No. 14/086,741: Terminal Disclaimer as Filed on Sep. 29, 2014, 1 Page.
U.S. Appl. No. 14/086,741: Terminal Disclaimer Review Decision, dated Sep. 30, 2014, 1 Page.
U.S. Appl. No. 14/086,741: Notice of Allowance and Fees and Examiner Summary, dated Oct. 3, 2014, 21 pages.
U.S. Appl. No. 14/086,741: Notice of Allowance and Fees Due, Filed Oct. 3, 2014, 22 pages.
U.S. Appl. No. 14/086,741: Amendment after Notice of Allowance, filed Jan. 5, 2015, 14 pages.
U.S. Appl. No. 14/086,741: Issue Fee Payment, filed Jan. 5, 2015, 1 page.
U.S. Appl. No. 14/086,741: Response to Amendment under Rule 312, dated Jan. 22, 2015, 2 pages.
U.S. Appl. No. 14/086,741: Notice of Allowance and Fees and Examiner Search strategy, dated Mar. 16, 2015, 40 pages.
U.S. Appl. No. 14/086,741: Issue Notification, dated Apr. 1, 2015, 1 page.
U.S. Appl. No. 14/596,154, filed Jan. 13, 2015, 60 pages.
U.S. Appl. No. 14/596,154: Filing Receipt, mailed Jan. 27, 2015, 3 pages.
U.S. Appl. No. 14/596,154: Notice to File Missing Parts, dated Jan. 27, 2015, 3 pages.
U.S. Appl. No. 14/596,154: Applicant Response to Pre Exam Formalities Notice with Preliminary Amendments, filed Mar. 27, 2015, 85 pages.

(56) References Cited

OTHER PUBLICATIONS

U.S. Appl. No. 14/596,154: Filing Receipt, mailed Apr. 2, 2015, 3 pages.
U.S. Appl. No. 14/596,154: Notice of Publication, dated Jul. 9, 2015, 1 page.
U.S. Appl. No. 14/596,154: Electronic Terminal Disclaimer Filed and Approved, Nov. 20, 2015, 3 pages.
U.S. Appl. No. 11/361,500, filed Feb. 23, 2006, 72 pages.
U.S. Appl. No. 11/361,500: Notice to file missing parts mailed Mar. 23, 2006, 2 pages.
U.S. Appl. No. 11/361,500: Response to Notice to File Missing Parts mailed Jul. 19, 2006, 27 pages.
U.S. Appl. No. 11/361,500: Notice of Publication dated Nov. 16, 2006, 1 page.
U.S. Appl. No. 11/361,500: Office Action dated May 27, 2009, 18 pages.
U.S. Appl. No. 11/361,500: Response to Office Action dated Aug. 27, 2009, 34 pages.
U.S. Appl. No. 11/361,500: Notice of Allowance dated Dec. 11, 2009, 8 pages.
U.S. Appl. No. 11/361,500: Issue Fee Payment and Rule 312 Amendment mailed Jan. 6, 2010, 28 pages.
U.S. Appl. No. 11/361,500: Response to Rule 312 Amendment Jan. 25, 2010, 4 pages.
U.S. Appl. No. 11/361,500: Issue Notification dated Feb. 24, 2010, 1 page.
U.S. Appl. No. 12/702,243: Continuation Application with Preliminary Amendment filed Feb. 8, 2010, 83 pages.
U.S. Appl. No. 12/702,243: Notice of Missing Parts dated Feb. 25, 2010, 2 pages.
U.S. Appl. No. 12/702,243: Response to Missing Parts filed Apr. 26, 2010, 8 pages.
U.S. Appl. No. 12/702,243: Filing receipt mailed May 4, 2010, 3 pages.
U.S. Appl. No. 12/702,243: Notice of Publication dated Aug. 12, 2010, 1 page.
U.S. Appl. No. 12/702,243: Non-Final rejection, dated Aug. 30, 2012, 8 pages.
U.S. Appl. No. 12/702,243: Amendment, dated Nov. 20, 2012, 14 pages.
U.S. Appl. No. 12/702,243: Terminal Disclaimer, mailed Jan. 2, 2013, 5 pages.
U.S. Appl. No. 12/702,243: Terminal Disclaimer decision, mailed Jan. 4, 2013, 1 page1.
U.S. Appl. No. 12/702,243: Notice of allowance and fees due and examiner interview summary, dated Jan. 10, 2013, pages.
U.S. Appl. No. 12/702,243: Issue notification, dated Apr. 24, 2013, 1 page.
U.S. Appl. No. 13/860,482, filed Apr. 10, 2013, 98 Pages.
U.S. Appl. No. 13/860,482: Notice to File Missing Parts and Filing Receipt, dated May 21, 2013, 5 Pages.
U.S. Appl. No. 13/860,482: Applicant Response to Pre-Exam Formalities Notice, dated Oct. 22, 2013, 3 Pages.
U.S. Appl. No. 13/860,482: Notice of Publication, dated Feb. 6, 2014, 1 Page.
U.S. Appl. No. 13/860,482: Non-Final Office Action, dated Jun. 9, 2014, 11 Pages.
U.S. Appl. No. 13/860,482: Non-Final Office Action Response, dated Sep. 8, 2014, 19 Pages.
U.S. Appl. No. 13/860,482: Terminal Disclaimer Review Decision, Sep. 9, 2014, 1 page.
U.S. Appl. No. 13/860,482: Terminal Disclaimer Filed, Oct. 8, 2014, 1 page.
U.S. Appl. No. 13/860,482: Terminal Disclaimer Review Decision, Oct. 9, 2014, 1 page.
U.S. Appl. No. 13/860,482: Notice of Allowance and Fees Due, dated Nov. 5, 2014, 8 Pages.
U.S. Appl. No. 13/860,482: Issue Fee Payment and Rule 312 Amendments, filed Feb. 4, 2015, 4 pages.
U.S. Appl. No. 13/860,482: Issue Notification, dated Mar. 4, 2015, 1 page.
U.S. Appl. No. 14/614,292, filed Feb. 4, 2015, 76 pages.
U.S. Appl. No. 14/614,292: Notice to File Missing Parts and Filing Receipt, dated Feb. 20, 2015, 5 pages.
U.S. Appl. No. 14/614,292: Applicant Response to Pre-Exam Formalities Notice and Amendments, filed Apr. 17, 2015, 30 pages.
U.S. Appl. No. 14/614,292: Filing Receipt, mailed Apr. 24, 2015, 3 pages.
U.S. Appl. No. 14/614,292: Notice of Publication, dated Aug. 6, 2015, 1 page.
U.S. Appl. No. 14/614,292: Electronic Terminal Disclaimer Filed and Approved, Nov. 20, 2015, 3 pages.
U.S. Appl. No. 11/412,417, filed Apr. 26, 2006, 96 pages.
U.S. Appl. No. 11/412,417: Notice of Missing Parts dated May 19, 2006, 2 pages.
U.S. Appl. No. 11/412,417: Response to Notice of Missing Parts filed Jul. 19, 2006, 14 pages.
U.S. Appl. No. 11/412,417: Non-final Office Action dated Apr. 1, 2008, 53 pages.
U.S. Appl. No. 11/412,417: Amendment filed Aug. 1, 2008, 34 pages.
U.S. Appl. No. 11/412,417: Final Office Action dated Nov. 13, 2008, 40 pages.
U.S. Appl. No. 11/412,417: RCE and Amendment filed May 12, 2009, 36 pages.
U.S. Appl. No. 11/412,417: Non-final Office Action dated Jun. 30, 2009, 141 pages.
U.S. Appl. No. 11/412,417: Examiner Interview Summary dated Oct. 30, 2009, 3 pages.
U.S. Appl. No. 11/412,417: Amendment filed Oct. 30, 2009, 33 pages.
U.S. Appl. No. 11/412,417: RCE With Amendment filed May 4, 2010, 27 pages.
U.S. Appl. No. 11/412,417: Notice of Allowance and bibliographic data sheet dated Jul. 6, 2010, 9 pages.
U.S. Appl. No. 11/412,417: RCE dated Oct. 5, 2010, 4 pages.
U.S. Appl. No. 11/412,417: Notice of Allowance and bibliographic data sheet dated Oct. 26, 2010, 4 pages.
U.S. Appl. No. 11/412,417: Issue Fee Payment and Comments on Reasons for Allowance dated Jan. 26, 2011, 6 pages.
U.S. Appl. No. 11/412,417: Issue Notification dated Feb. 9, 2011, 1 page.
U.S. Appl. No. 13/030,084, filed Feb. 17, 2011, 103 pages.
U.S. Appl. No. 13/030,084: Filing receipt and Notice to File Missing parts mailed Mar. 3, 2011, 6 pages.
U.S. Appl. No. 13/030,084: Response to Notice to File Missing Parts, dated Aug. 3, 2011, 23 pages.
U.S. Appl. No. 13/030,084: Updated filing receipt, mailed Aug. 11, 2011, 3 pages.
U.S. Appl. No. 13/030,084: Non-Final Rejection dated Oct. 26, 2011, 34 pages.
U.S. Appl. No. 13/030,084: Notice of Publication dated Nov. 17, 2011, 1 page.
U.S. Appl. No. 13/030,084: Amendment, dated Jan. 26, 2012, 35 pages.
U.S. Appl. No. 13/030,084: Notice regarding non-compliant amendment, dated Jan. 31, 2012, 4 pages.
U.S. Appl. No. 13/030,084: Amendment, dated Feb. 9, 2012, 35 pages.
U.S. Appl. No. 13/030,084: Final Rejection, dated Mar. 28, 2012, 62 pages.
U.S. Appl. No. 13/030,084: Amendment after final, dated Jun. 14, 2012, 88 pages.
U.S. Appl. No. 13/030,084: Advisory Action, dated Jun. 26, 2012, 4 pages.
U.S. Appl. No. 13/030,084: RCE, dated Jul. 23, 2012, 89 pages.
U.S. Appl. No. 13/030,084: Notice regarding non-compliant amendment, dated Jul. 25, 2012, 2 pages.
U.S. Appl. No. 13/030,084: Amendment, dated Jan. 2, 2013, 40 pages.
U.S. Appl. No. 13/030,084: Refund request, dated Jan. 23, 2013 17 pages.

(56) References Cited

OTHER PUBLICATIONS

U.S. Appl. No. 13/030,084: Non-Final office action, dated Apr. 30, 2013, 39 pages.
U.S. Appl. No. 13/030,084: Response to non-final office action, dated Jul. 30, 2013, 28 pages.
U.S. Appl. No. 13/030,084: Non-final office action, dated Oct. 10, 2013, 44 pages.
U.S. Appl. No. 13/030,084: Response after Non-Final Reject, dated Jan. 2, 2014, 1 Page.
U.S. Appl. No. 13/030,084: Final Rejection, dated Mar. 19, 2014, 41 Pages.
U.S. Appl. No. 13/030,084: Amendment Submitted/Entered with Filing of CPA/RCE, dated May 19, 2014, 38 Pages.
U.S. Appl. No. 13/030,084: Advisory Action (PTOL-303), dated Jun. 6, 2014, 4 Pages.
U.S. Appl. No. 13/030,084: Applicant Initiated Interview Summary (PTOL-413), dated Jul. 1, 2014, 3 Pages.
U.S. Appl. No. 13/030,084: Request for Continued Examination, dated Aug. 15, 2014, 26 Pages.
U.S. Appl. No. 13/030,084: Non-Final Rejection and Examiner's Search, dated Mar. 24, 2015, 24 pages.
U.S. Appl. No. 13/030,084: Amendment/Req. Reconsideration After Non-Final Rejection, filed Jun. 24, 2015, 28 pages.
U.S. Appl. No. 13/030,084: Terminal Disclaimer filed and Approved, Sep. 10, 2015, 3 pages.
U.S. Appl. No. 13/030,084: Notice of Allowance and Fees, dated Sep. 17, 2015, 24 pages.
U.S. Appl. No. 13/030,084: Issue Fee Payment and Amendment, dated Dec. 10, 2015, 4 pages.
U.S. Appl. No. 14/968,429, filed Dec. 14, 2015.
U.S. Appl. No. 14/968,429: Filing Receipt, Jan. 4, 2016, 3 pages.
U.S. Appl. No. 14/968,429: Applicant Response to Pre-Exam Formalities Notice, dated Jan. 14, 2016, 35 pages.
U.S. Appl. No. 11/480,094: Notice to File Corrected Application Papers dated Aug. 2, 2006, 2 pages.
U.S. Appl. No. 11/480,094: Response to Notice to File Corrected Application Papers filed Nov. 2, 2006, 32 pages.
U.S. Appl. No. 11/480,094: Filing Receipt mailed Dec. 7, 2006, 3 pages.
U.S. Appl. No. 11/480,094: Non-final Office Action dated Nov. 7, 2008, 28 pages.
U.S. Appl. No. 11/480,094: Amendment filed May 7, 2009, 37 pages.
U.S. Appl. No. 11/480,094: Final Office Action dated Jul. 28, 2009, 16 pages.
U.S. Appl. No. 11/480,094: RCE with Amendment filed Dec. 28, 2009, 39 pages.
U.S. Appl. No. 11/480,094: Office Action dated Dec. 15, 2010, 15 pages.
U.S. Appl. No. 11/480,094: Office Action response, dated May 16, 2011, 29 pages.
U.S. Appl. No. 11/480,094: Final Office Action, dated Aug. 1, 2011, 13 pages.
U.S. Appl. No. 11/480,094: Amendment after final Nov. 1, 2011, 32 pages.
U.S. Appl. No. 11/480,094: Advisory Action dated Nov. 14, 2011, 3 pages.
U.S. Appl. No. 11/480,094: Notice of Appeal dated Nov. 28, 2011, 1 page.
U.S. Appl. No. 11/480,094: Abandonment, mailed Jul. 31, 2012, 2 pages.
U.S. Appl. No. 16/549,185: Notice of Publication dated Dec. 19, 2019, 1 page, Doc 1011.
U.S. Appl. No. 16/710,577: U.S. Reissue Patent Application filed Dec. 11, 2019, 88 pages, Doc 1017.
U.S. Appl. No. 16/710,577: Filing Receipt dated Dec. 11, 2019, 4 pages, Doc 1018.
U.S. Appl. No. 16/459,930: Notice of Publication dated Dec. 12, 2019, 1 page, Doc 1031.

U.S. Appl. No. 16/513,021: Notice of Publication dated Dec. 19, 2019, 1 page, Doc 1040.
U.S. Appl. No. 15/464,205: Response to Non-final Office Action filed Oct. 22, 2019, 13 pages, Doc 1042.
U.S. Appl. No. 15/464,205: Terminal Disclaimer filed Oct. 22, 2019, 5 pages, Doc 1043.
U.S. Appl. No. 15/464,205: Final Office Action dated Nov. 14, 2019, 11 pages, Doc 1044.
U.S. Appl. No. 16/427,054: Notice of Publication dated Nov. 21, 2019, 1 page, Doc 1054.
U.S. Appl. No. 16/710,731: U.S. Appl. No. 16/710,731, filed Dec. 11, 2019, 89 pages, Doc 1055.
U.S. Appl. No. 16/710,731: Filing Receipt dated Dec. 12, 2019, 4 pages, Doc 1056.
U.S. Appl. No. 16/209,872: Preliminary Amendment filed Feb. 21, 2019, 13 pages, Doc 1000.
U.S. Appl. No. 16/209,872: Updated Filing Receipt dated Feb. 26, 2019, 3 pages, Doc 1002.
U.S. Appl. No. 16/209,872: Notice of Publication dated Jun. 6, 2019, 1 page, Doc 1001.
U.S. Appl. No. 15/043,267: Response to Non-final Office Action filed Jul. 2, 2019, 24 pages, Doc 1003.
U.S. Appl. No. 15/043,267: Final Office Action dated Oct. 18, 2019, 14 pages, Doc 1004.
U.S. Appl. No. 12/573,829: Notice of Allowance and Notice of Allowability dated May 21, 2019, 20 pages, Doc 1005.
U.S. Appl. No. 12/573,829: Terminal Disclaimer filed Aug. 21, 2019, 5 pages, Doc 1006.
U.S. Appl. No. 12/573,829: Issue Fee Payment filed Aug. 21, 2019, 3 pages, Doc 1007.
U.S. Appl. No. 12/573,829: Issue Notification dated Sep. 18, 2019, 1 page, Doc 1008.
U.S. Appl. No. 16/549,185: U.S. Appl. No. 16/549,185, filed Aug. 23, 2019, 73 pages, Doc 1009.
U.S. Appl. No. 16/549,185: Filing Receipt dated Sep. 4, 2019, 4 pages, Doc 1010.
U.S. Appl. No. 16/549,185: Notice to File Missing Parts dated Sep. 4, 2019, 2 pages, Doc 1012.
U.S. Appl. No. 16/549,185: Response to Notice of Missing Parts and Preliminary Amendment filed Sep. 5, 2019, 18 pages, Doc 1013.
U.S. Appl. No. 16/549,185: Updated Filing Receipt dated Sep. 6, 2019, 4 pages, Doc 1014.
U.S. Appl. No. 15/250,118: Issue Notification dated May 29, 2019, 1 page, Doc 1015.
U.S. Appl. No. 16/379,674: Notice of Publication dated Aug. 1, 2019, 1 pages, Doc 1016.
U.S. Appl. No. 15/802,348: Final Office Action dated Jul. 9, 2019, 24 pages, Doc 1019.
U.S. Appl. No. 15/802,348: Response to Final Office Action filed Aug. 20, 2019, 29 pages, Doc 1020.
U.S. Appl. No. 15/802,348: Advisory Action dated Sep. 4, 2019, 3 pages, Doc 1021.
U.S. Appl. No. 15/802,348: RCE and Amendment filed Sep. 16, 2019, 30 pages, Doc 1022.
U.S. Appl. No. 12/830,236: Supplemental Notice of Allowability dated May 21, 2019, 24 pages, Doc 1023.
U.S. Appl. No. 12/830,236: Issue Fee Payment dated Jul. 1, 2019, 3 pages, Doc 1024.
U.S. Appl. No. 12/830,236: Issue Notification dated Jul. 24, 2019, 1 page, Doc 1025.
U.S. Appl. No. 16/459,930: U.S. Appl. No. 16/459,930, filed Jul. 2, 2019, 99 pages, Doc 1026.
U.S. Appl. No. 16/459,930: Filing Receipt dated Jul. 18, 2019, 4 pages, Doc 1027.
U.S. Appl. No. 16/459,930: Notice to File Missing Parts dated Jul. 18, 2019, 2 pages, Doc 1028.
U.S. Appl. No. 16/459,930: Response to Notice to File Missing Parts and Preliminary Amendment dated Sep. 4, 2019, 19 pages, Doc 1029.
U.S. Appl. No. 16/459,930: Updated Filing Receipt dated Sep. 6, 2019, 4 pages, Doc 1030.

(56) References Cited

OTHER PUBLICATIONS

U.S. Appl. No. 14/641,735: Issue Fee Payment and Response under 37 CFR § 1.312 dated Jul. 12, 2019, 8 pages, Doc 1032.
U.S. Appl. No. 14/641,735: Supplemental Notice of Allowability dated Jul. 26, 2019, 7 pages, Doc 1033.
U.S. Appl. No. 14/641,735: Issue Notification dated Aug. 7, 2019, 1 page, Doc 1034.
U.S. Appl. No. 16/513,021: U.S. Appl. No. 16/513,021, filed Jul. 16, 2019, 130 pages, Doc 1035.
U.S. Appl. No. 16/513,021: Filing Receipt dated Jul. 30, 2019, 4 pages, Doc 1036.
U.S. Appl. No. 16/513,021: Notice to File Missing Parts dated Jul. 30, 2019, 2 pages, Doc 1037.
U.S. Appl. No. 16/513,021: Response to Notice to File Missing Parts and Preliminary Amendment dated Sep. 11, 2019, 45 pages, Doc 1038.
U.S. Appl. No. 16/513,021: Updated Filing Receipt dated Sep. 12, 2019, 4 pages, Doc 1039.
U.S. Appl. No. 15/464,205: Non-final Office Action dated Jul. 25, 2019, 64 pages, Doc 1041.
U.S. Appl. No. 15/240,964: Issue Fee Payment and Response Under 37 CFR § 1.312 filed May 16, 2019, 16 pages, Doc 1045.
U.S. Appl. No. 15/240,964: Notice to File Corrected Application Papers dated May 16, 2019, 3 pages, Doc 1046.
U.S. Appl. No. 15/240,964: Response to Notice to File Corrected Application Papers filed Jul. 22, 2019, 9 pages, Doc 1047.
U.S. Appl. No. 15/240,964: Issue Notification dated Aug. 21, 2019, 1 page, Doc 1048.
U.S. Appl. No. 16/427,054: U.S. Appl. No. 16/427,054, filed May 30, 2019, 68 pages, Doc 1049.
U.S. Appl. No. 16/427,054: Filing Receipt dated Jun. 6, 2019, 4 pages, Doc 1050.
U.S. Appl. No. 16/427,054: Notice to File Missing Parts dated Jun. 6, 2019, 2 pages, Doc 1051.
U.S. Appl. No. 16/427,054: Response to Notice to File Missing Parts and Preliminary Amendment filed Aug. 8, 2019, 19 pages, Doc 1052.
U.S. Appl. No. 16/427,054: Updated Filing Receipt dated Aug. 12, 2019, 4 pages, Doc 1053.
U.S. Appl. No. 14/870,744: Response to Amendment under Rule 312, Jan. 9, 2019, 2 pages.
U.S. Appl. No. 14/870,744: Notice of Allowance and Fees Due, dated Mar. 12, 2019, 7 pages.
U.S. Appl. No. 14/870,744: Issue Notification, dated Mar. 20, 2019, 1 page.
U.S. Appl. No. 16/209,872: Applicant Response to Pre-Exam Formalities Notice, Feb. 21, 2019, 17 pages.
U.S. Appl. No. 16/209,872: Filing Receipt, Feb. 26, 2019, 3 pages.
U.S. Appl. No. 15/250,118: Issue Fee Payment, dated Apr. 5, 2019, 20 pages.
U.S. Appl. No. 15/802,348: Non-Final Rejection, dated Feb. 11, 2019, 18 pages.
U.S. Appl. No. 12/830,236: Notice of Allowance and Fees Due, dated Apr. 2, 2019, 15 pages.
U.S. Appl. No. 14/641,735: Amendment/Req. Reconsideration—After Non-Final Reject, dated Feb. 4, 2019, 27 pages.
U.S. Appl. No. 14/641,735: Notice of Allowance and Fees Due, dated Apr. 15, 2019, 47 pages.
U.S. Appl. No. 15/464,205: Preliminary Amendment, dated Feb. 22, 2019, 11 pages.
U.S. Appl. No. 15/240,964: Notice of Allowance and Fees Due, dated Feb. 21, 2019, 26 pages.
U.S. Appl. No. 16/048,113: Notice of Publication, dated Jan. 31, 2019, 1 page.
U.S. Appl. No. 16/164,430: Applicant Response to Pre-Exam Formalities Notice, dated Jan. 18, 2019, 29 pages.
U.S. Appl. No. 16/164,430: Filing Receipt, Jan. 23, 2019, 4 pages.
U.S. Appl. No. 16/048,061: Notice of Publication, Jan. 24, 2019, 1 page.
Jaiswal et al, "Local pattern transformation based feature extraction techniques for classification of epileptic EEG signals", Biomedical Signal Processing and Control, pp. 81-92 (Year: 2017).
Stefanov et al, "Algorithmic Transformation Techniques for Efficient Exploration of Alternative Application Instances", ACM pp. 7-12 (Year: 2002).
Murry et al, "Code Transformation and Instruction Set Extension", ACM pp. 1-31 (Year: 2009).
Rizum, "Code Transformation by Direct Transformation of ASTs", ACM pp. 1-7 (Year: 2015).
Minn et al, "Linear Transformation of Multi-level Signal Set in Multi-Code CDMA", IEEE, pp. 1239-1243 (Year: 2001).
U.S. Appl. No. 16/820,457: U.S. Appl. No. 16/820,457 filed Mar. 16, 2020, 148 pages, Doc 1082.
U.S. Appl. No. 15/802,348: eTerminal Disclaimer filed Mar. 18, 2020, 5 pages, Doc 1088.
U.S. Appl. No. 15/802,348: Notice of Allowance and Allowability dated Mar. 11, 2020, 178 pages, Doc 1089.
U.S. Appl. No. 15/464,205: Response to Final Office Action and After Final Pilot Program Request filed Feb. 12, 2020, 17 pages, Doc 1090.
U.S. Appl. No. 15/464,205: Advisory Action dated Feb. 25, 2020, 5 pages, Doc 1091.
U.S. Appl. No. 15/464,205: Request for Continued Examination and Amendment filed Mar. 5, 2020, 20 pages, Doc 1092.
U.S. App. No. 16/710,731: Request for Corrected Filing Receipt filed Feb. 19, 2020, 16 pages, Doc 1094.
U.S. Appl. No. 16/710,731: Corrected Filing Receipt dated Feb. 24, 2020, 4 pages, Doc 1095.
U.S. Appl. No. 16/164,430: Notice of Publication dated May 2, 2019, 1 page, Doc 1057.
U.S. Appl. No. 16/164,430: Non-final Office Action dated Oct. 18, 2019, 107 pages, Doc 1058.
U.S. Appl. No. 16/164,430: Response to Non-final Office Action filed Jan. 21, 2020, 16 pages, Doc 1096.
U.S. Appl. No. 16/164,430: eTerminal Disclaimer filed Jan. 21, 2020, 5 pages, Doc 1097.
U.S. Appl. No. 16/164,430: Notice of Allowance and Allowability dated Mar. 9, 2020, 104 pages, Doc 1098.
U.S. Appl. No. 16/820,457: Filing Receipt dated Mar. 31, 2020, 4 pages, Doc 1083.
U.S. Appl. No. 15/464,205: Non-final Office Action dated Mar. 27, 2020, 11 pages, Doc 1093.
U.S. Appl. No. 16/164,430: Issue Fee Payment and Response pursuant to 37 CFR 1.312 filed Jun. 8, 2020, 9 pages, Doc 1099.
U.S. Appl. No. 16/164,430: Supplemental Notice of Allowability dated Jun. 16, 2020, 12 pages, Doc 1100.
U.S. Appl. No. 16/898,134: U.S. Appl. No. 16/898,134 filed Jun. 10, 2020, 84 pages, Doc 1101.

\* cited by examiner

| Natural # | BEL Trees |
|---|---|
| 0 |  |
| 1 |  |
| 2 |  |
| 3 |  |
| 4 | 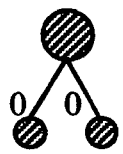 |
| 5 |  |
| 6 | 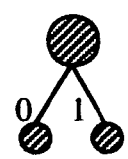 |
Fig. 5
500

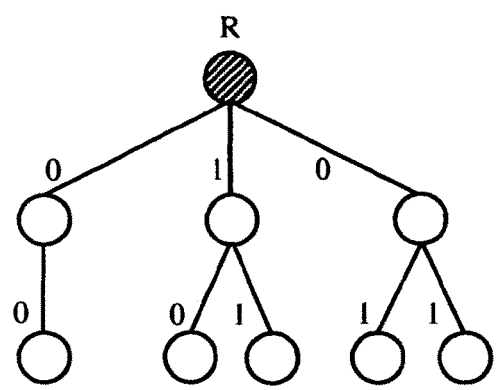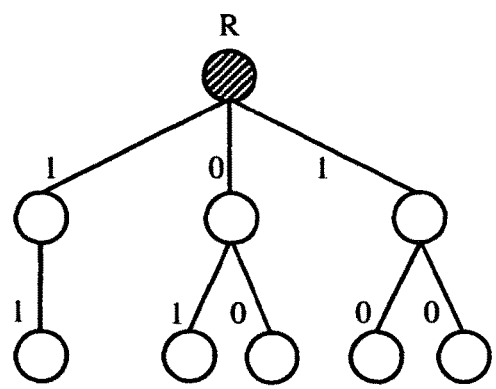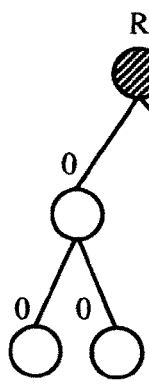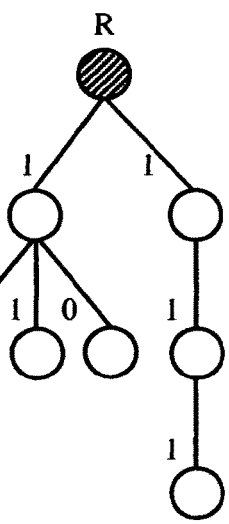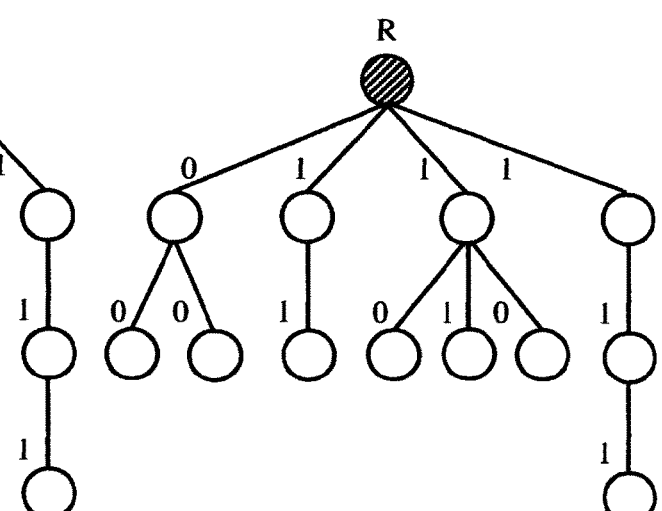
Fig. 8

1105
*Example 1*
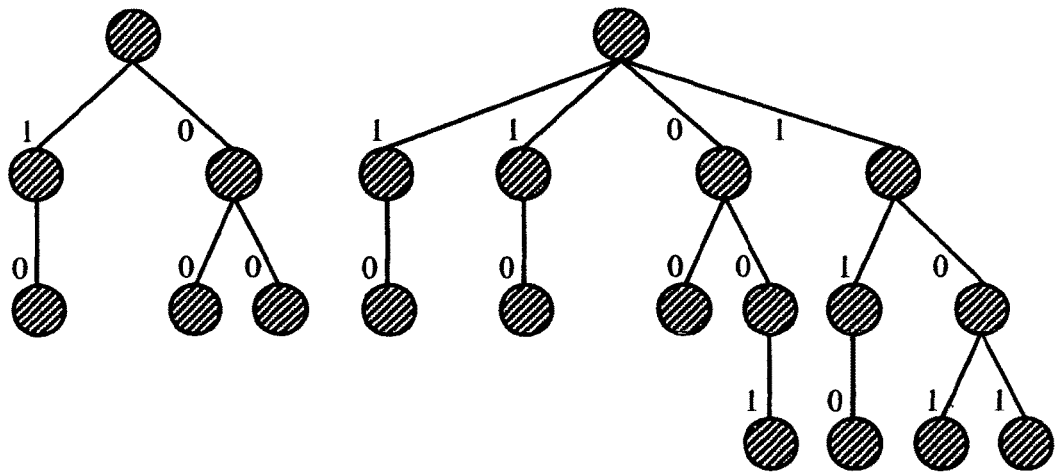
1110
*Example 2*
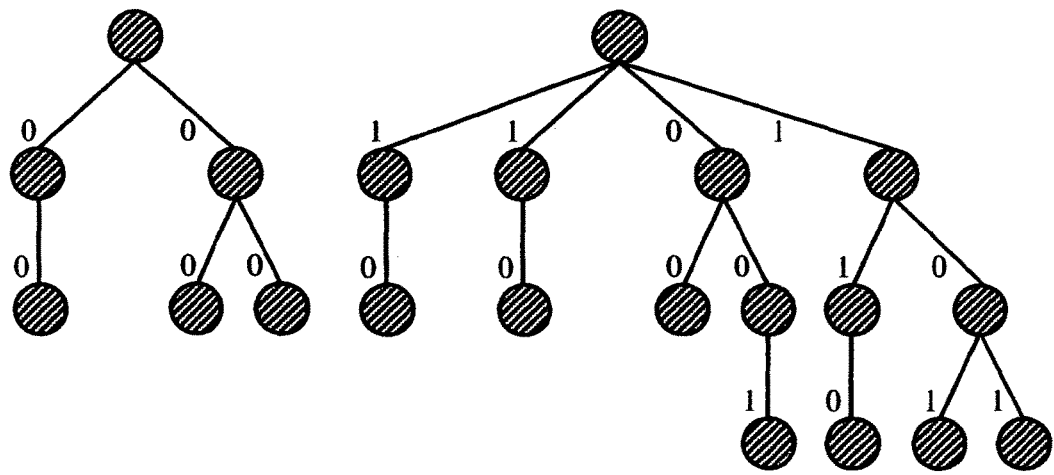
1100
*Fig. 11* x is Chapter 3 if and only if $\exists y\ (\ (y \leq_R T) \wedge (y = S(S(S(c)))') \wedge (S(x) \leq_R y)\ )$, where $i \leq_R j$ means that tree $i$ is a rooted partial subtree of tree $j$.

METHOD AND/OR SYSTEM FOR SIMPLIFYING TREE EXPRESSIONS, SUCH AS FOR PATTERN MATCHING

RELATED APPLICATIONS

The present patent application is a continuation of U.S. nonprovisional patent application Ser. No. 11/007,139, filed on Dec. 7, 2004, titled "METHOD AND/OR SYSTEM FOR SIMPLIFYING TREE EXPRESSIONS, SUCH AS FOR PATTERN MATCHING," by LeTourneau, which is currently pending and which claims priority from U.S. provisional patent application Ser. No. 60/575,784, filed on May 28, 2004, titled "METHOD AND/OR SYSTEM FOR SIMPLIFYING TREE EXPRESSIONS, SUCH AS FOR PATTERN MATCHING," by LeTourneau, all of the foregoing herein incorporated by reference in its entirely, and assigned to the assignee of the currently claimed subject matter.

BACKGROUND

This disclosure is related to simplifying tree expressions, such as for pattern matching.

In a variety of fields, data or a set of data, may be represented in a hierarchical fashion. This form of representation may, for example, convey information, such as particular relationships or patterns between particular pieces of data or groups of data and the like. However, manipulating and/or even recognizing specific data representations or patterns is not straight-forward, particularly where the data is arranged in a complex hierarchy. Without loss of generality, examples may include a database, and further, without limitation, a relational database. Techniques for performing operations on such databases or recognizing specific patterns, for example, are computationally complex, time consuming, and/or otherwise cumbersome. A need, therefore, continues to exist for improved techniques for performing such operations and/or recognizing such patterns.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference of the following detailed description when read with the accompanying drawings in which:

FIG. 5 is a table illustrating an embodiment of an association between natural numerals and unordered BELTs;

FIG. 8 is a schematic diagram illustrating an embodiment of an inversion operation and an embodiment of a merger operation applied to an embodiment of ordered binary edge labeled trees;

FIG. 11 is a schematic diagram illustrating an embodiment of a match and a non-match for an embodiment of an ordered binary edge labeled tree.

DETAILED DESCRIPTION

Figure 1:
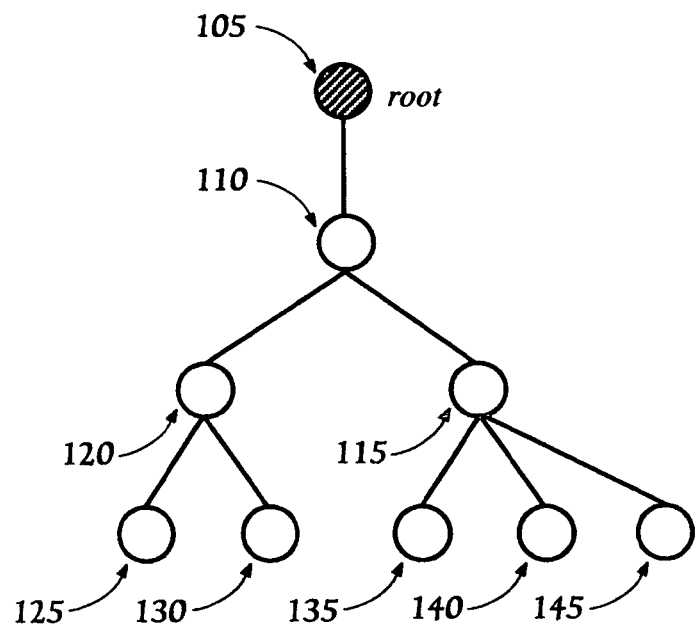
FIG. 1 is a schematic diagram of one embodiment of a tree.

In the following detailed description, numerous specific details are set forth to provide a thorough understanding of the claimed subject matter. However, it will be understood by those skilled in the art that the claimed subject matter may be practiced without these specific details. In other instances, well-known methods, procedures, components and/or circuits have not been described in detail so as not to obscure the claimed subject matter.

Some portions of the detailed description which follow are presented in terms of algorithms and/or symbolic representations of operations on data bits or binary digital signals stored within a computing system, such as within a computer or computing system memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing involve physical manipulations of physical quantities. Typically, although not necessarily, these quantities may take the form of electrical and/or magnetic signals capable of being stored, transferred, combined, compared and/or otherwise manipulated. It has proven convenient, at times, principally for reasons of common usage, to refer to these signals as bits, data, values, elements, symbols, characters, terms, numbers, numerals and/or the like. It should be understood, however, that all of these and similar terms are to be associated with the appropriate physical quantities and are merely convenient labels. Unless specifically stated otherwise, as apparent from the following discussion, it is appreciated that throughout this specification discussions utilizing terms such as "processing", "computing", "calculating", "determining" and/or the like refer to the actions and/or processes of a computing platform, such as a computer or a similar electronic computing device, that manipulates and/or transforms data represented as physical electronic and/or magnetic quantities and/or other physical quantities within the computing platform's processors, memories, registers, and/or other information storage, transmission, and/or display devices.

In a variety of fields, data or a set of data, may be represented in a hierarchical fashion. This form of representation may, for example, convey information, such as particular relationships or patterns between particular pieces of data or groups of data and the like. However, manipulating and/or even recognizing specific data representations or patterns is not straight-forward, particularly where the data is arranged in a complex hierarchy. Without loss of generality, examples may include a database and further, without limitation, a relational database. Techniques for performing operations on such databases or recognizing specific patterns, for example, are computationally complex, time consuming, and/or otherwise cumbersome. A need, therefore, continues to exist for improved techniques for performing such operations and/or recognizing such patterns.

As previously discussed, in a variety of fields, it is convenient and/or desirable to represent data, a set of data and/or other information in a hierarchical fashion. In this context, such a hierarchy of data shall be referred to as a "tree." In a particular embodiment, a tree may comprise a finite, rooted, connected, acyclic graph. Likewise, such trees may be either ordered or unordered. Here, ordered refers to the notion that there is an ordering or precedence among nodes attached to a common node corresponding to the order of the attached nodes shown in a graphical illustration. An ordered tree is illustrated here, for example, in FIG. 1 by embodiment 100. As illustrated, the root of this particular embodiment encompasses node 105. In addition to 105, there are eight other nodes designated 110 to 145, respectively. Likewise, the nodes are connected by branches referred to, in this context, as edges. Thus, the nodes of this tree are connected by eight edges. This embodiment, therefore, illustrates a finite tree that is rooted by node 105. Furthermore, the nodes are connected, meaning, in this context, that a path exists between any two nodes of the tree. The tree is likewise acyclic, meaning here, that no path in the tree forms a complete loop.

As previously suggested, in a variety of contexts, it may be convenient and/or desirable to represent a hierarchy of data and/or other information using a structure, such as the embodiment illustrated in FIG. 1. One particular embodiment, without loss of generality, of a tree may include edges that are labeled with data and/or other values. Likewise, in one particular embodiment, such data and/or values may be limited to binary data, that is, in this example, either a binary one or a binary zero. Here, such an embodiment may be referred to as a binary edge labeled tree (BELT), as shall be discussed in more detail hereinafter. In this embodiment, an ordered binary edge labeled tree is shown. Here, ordered refers to the notion that there is an ordering or precedence among nodes attached to a common node corresponding to the order of the attached nodes shown in a graphical illustration.

Figure 2:
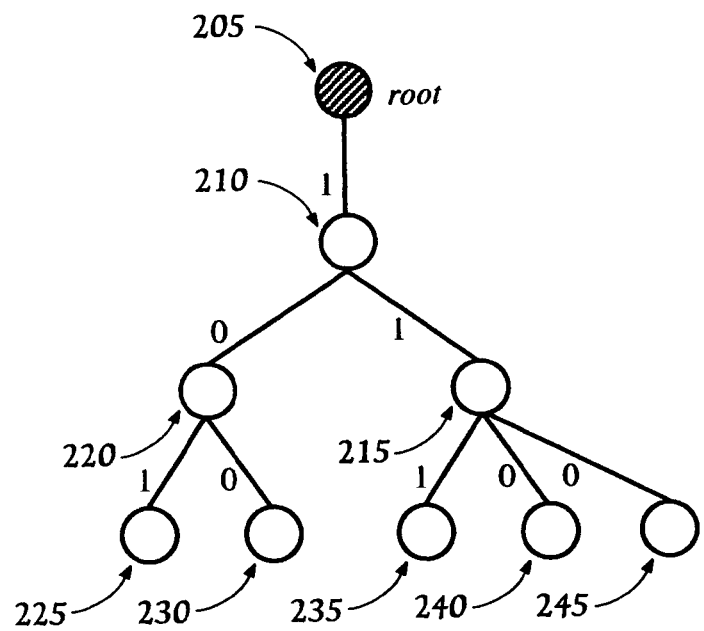
FIG. 2 is a schematic diagram illustrating one embodiment of an ordered binary edge labeled tree.
Figure 3:
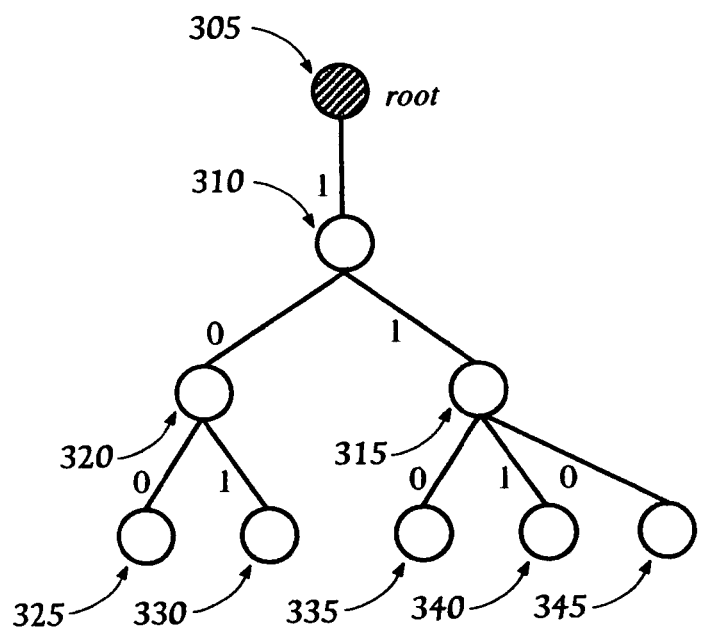
FIG. 3 is a schematic diagram illustrating another embodiment of an ordered binary edge labeled tree.

One example of an ordered BELT is illustrated by embodiment 200 of FIG. 2. Thus, as illustrated, the edges of the BELT shown in FIG. 2 are labeled with either a binary zero or binary one. FIG. 3 illustrates another embodiment 300 of a different ordered binary edge labeled tree. It is noted that this tree is similar or isomorphic in arrangement or structure to the embodiment of FIG. 2, as shall be explained in more detail hereinafter.

Figure 4:
FIG. 4 is a schematic diagram illustrating an embodiment of a binary edge labeled string.

A subset of BELTs may be referred to, in this context, as binary edge labeled strings (BELSs). One embodiment, 400, is illustrated in FIG. 4. Thus, as illustrated by embodiment 400, this particular binary edge labeled string comprises four nodes and three edges, where the edges are labeled, respectively, binary zero, binary one and binary zero. Thus, a binary edge labeled string comprises a binary edge labeled tree in which each node has no more than two edges. To reiterate, in this context, a string comprises a binary edge labeled string and a tree comprises a binary edge labeled tree if each edge of the string or tree respectively stores a single bit. Likewise, in this context, two nodes are employed to support an edge holding a single piece of binary data. At this point, it is worth noting that strings and trees having nodes and edges, such as previously described, may be represented in a computing platform or similar computing device through a data structure or a similar mechanism intended to capture the hierarchical relationship of the data, for example. It is intended that all such embodiments are included within the scope of the claimed subject matter.

As may be apparent by a comparison of FIG. 4 with, for example, FIG. 2 or FIG. 3, typically, a binary edge labeled tree has the ability to be richer and convey more data and/or more information than a binary edge labeled string. This may be observed, by a comparison of FIG. 4 with, for example, FIG. 2 or FIG. 3. Of course, depending on the particular tree and the particular string, there may be contrary examples, such as where the string is particularly large and the tree is particularly small. The aspect of BELTs to be richer in information may be one potential motivation to employ BELTs over BELSs, for example.

Despite the prior observation, as shall be described in more detail hereinafter, an association may be made between any particular binary edge labeled string and a binary edge labeled tree or vice-versa, that is, between any particular binary edge labeled tree and a binary edge labeled string. See, for example, U.S. provisional patent application Ser. No. 60/543,371, filed on Feb. 9, 2004, titled "Manipulating Sets of Hierarchical Data," assigned to the assignee of the presently claimed subject matter. In particular, an association may be constructed between binary edge labeled trees and binary edge labeled strings by enumerating in a consecutive order binary edge labeled strings and binary edge labeled trees, respectively, and associating the respectively enumerated strings and trees with natural numerals. Of course, many embodiments of associations between trees, whether or not BELTs, and strings, whether or not BELS, or between trees, whether or not BELTs, and natural numerals are possible. It is intended that the claimed subject matter include such embodiments, although the claimed subject matter is not limited in scope to the aforementioned provisional patent application or to employing any of the techniques described in the aforementioned provisional patent application.

Binary edge labeled trees may also be listed or enumerated. See, for example, previously cited U.S. provisional patent application Ser. No. 60/543,371. This is illustrated, here, for example, in FIG. 5. It is noted that this particular figure also includes the associated natural numerals. The association of such numerals for this particular embodiment should be clear based at least in part on previously cited U.S. provisional patent application Ser. No. 60/543,371. However, it is, of course, again noted that the claimed subject matter is not limited in scope to employing the approach or approaches described in U.S. provisional patent application Ser. No. 60/543,371. U.S. provisional patent application Ser. No. 60/543,371 is provided simply as an example of listing or enumerating unordered BELTs. Thus, it is noted further that the BELTs described are unordered.

However, for this particular embodiment, although the claimed subject matter is not limited in scope in this respect, a method of enumerating a set of ordered trees may begin with enumeration of an empty binary edge labeled tree and a one node binary edge labeled tree. Thus, the empty tree is associated with the natural numeral zero and has a symbolic representation as illustrated in FIG. 5 (circle). Likewise, the one node tree, which holds no data, is associated with the natural numeral one and has a graphical representation of a single node. For higher positive natural numbers, ordered trees may be generated by a process described, for example, in "The Lexicographic Generation of Ordered Trees," by S.

Zaks, The Journal of Theoretical Computer Science, Vol. 10(1), pp 63-82, 1980, or, "Enumerating Ordered Trees Lexicographically," by M. C. Er, Computation Journal, Vol. 28, Issue 5, pp 538-542, 1985. This may be illustrated, for example in FIG. 5, as described in more detail below.

As illustrated, for this particular embodiment, and as previously described, the empty tree has zero nodes and is associated with the natural numeral zero. Likewise, the one node tree root comprises a single node and is associated with the natural numeral one. Thus, to obtain the tree at position two, a root node is attached and connected to the prior root node by an edge. Likewise, here, by convention, the edge is labeled with a binary zero. If, however, the tree formed by the immediately proceeding approach were present in the prior enumeration of trees, then a similar process embodiment is followed, but, instead, the new edge is labeled with a binary one rather than a binary zero. Thus, for example, to obtain the binary edge labeled tree for position three, a new root node is connected to the root node by an edge and that edge is labeled with a binary one.

Continuing with this example, to obtain the binary edge labeled tree for position four, observe that numeral four is the product of numeral two times numeral two. Thus, a union is formed at the root of two trees, where, here, each of those trees is associated with the positive natural numeral two. Likewise, to obtain the binary edge labeled tree for position five, begin with the binary edge labeled tree for position two and follow the previously articulated approach of adding a root and an edge and labeling it with a binary zero.

Figure 9:
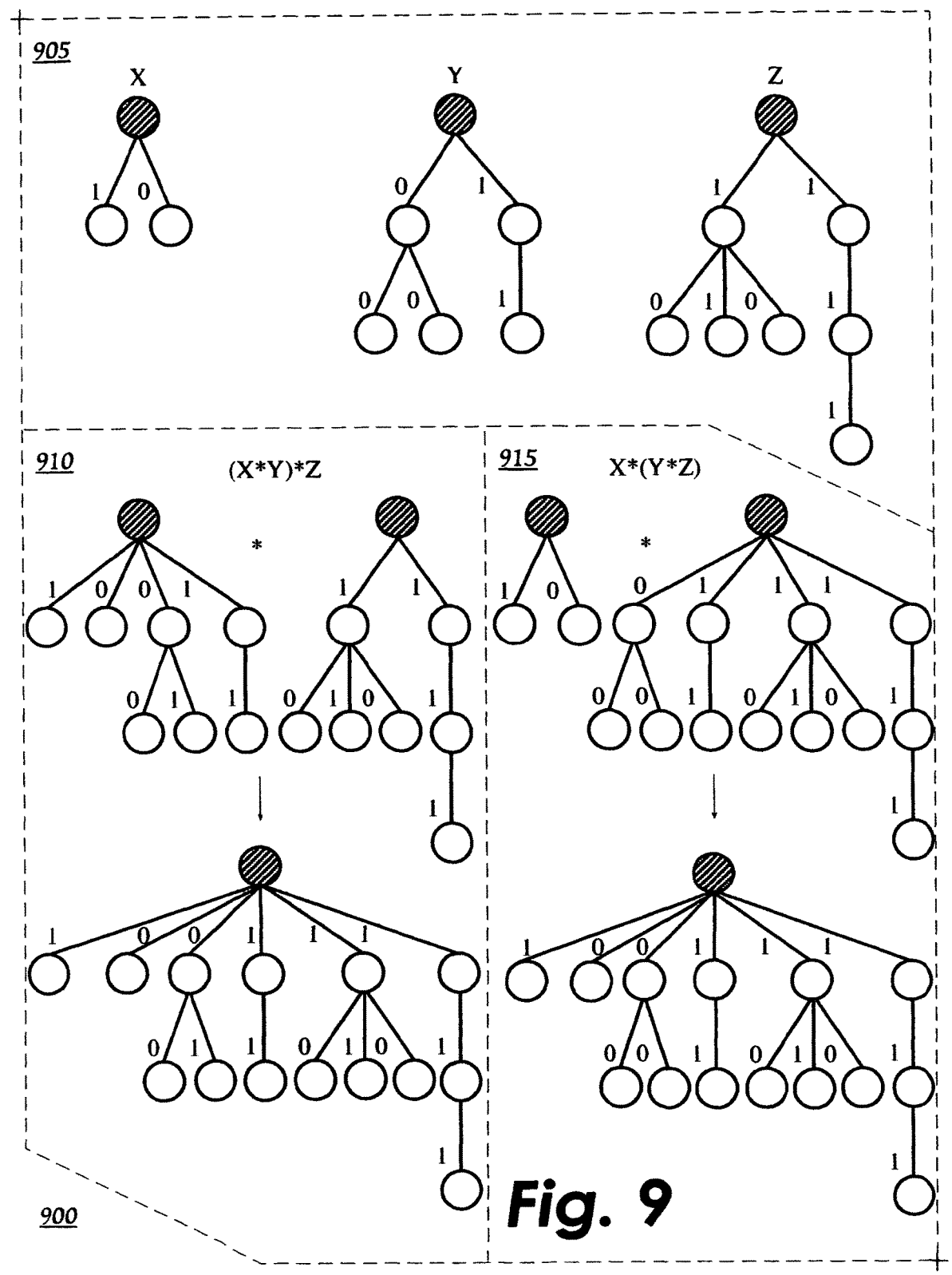
FIG. 9 is a schematic diagram illustrating an embodiment of an associative property applied to an embodiment of a merger operation and an embodiment of ordered binary edge labeled trees.

In this context, adding a root node and an edge and labeling it binary zero is referred to as a "zero-push" operation and adding a root node and an edge and labeling it binary one is referred to as a "one-push" operation. Thus, referring again to FIG. 5, the one-push of the root tree is the tree at position three. This follows from FIG. 9 of previously referenced U.S. provisional patent application Ser. No. 60/543,371, since P(2*1)=P(2)=3. Likewise, the tree at position five is the zero-push of the tree at position 2. Again, this follows from FIG. 9 of the previously referenced U.S. provisional patent application, since P(2*2-1)=P(3)=5.

In the embodiment just described, binary edge labeled trees use binary numerals "0" and "1." However, the claimed subject matter is not limited in scope to binary edge labeled trees. For example, trees may employ any number of numeral combinations as labels, such as triplets, quadruplets, etc. Thus, using a quadruplet example, it is possible to construct trees, such as a zero-push of a particular tree, a one-push of that tree, a two-push of that tree, and a three-push of that tree. Thus, for such trees, edges may be labeled 0, 1, 2 or 3, etc.

The foregoing discussion has begun to characterize an algebra involving trees, in this particular embodiment, an algebra for ordered binary edge labeled trees or ordered BELTs. The foregoing discussion, therefore, defines a value zero, a zero node tree for this particular embodiment, value one, a one node tree for this particular embodiment, and a monadic operation, previously described as zero-push. For this particular embodiment, the push operation shall also be referred to as the successor operation. For this particular embodiment, this shall be denoted as $S(x)$, where x refers to the tree to which the successor operation is applied. Of course, the claimed subject matter is not limited in scope to the successor operation, $S(x)$, being limited to a zero-push. For example, alternatively, a "one-push" may be employed. For this embodiment, this is analogous, for example, to the convention that "0" represent "off" and "1" represent "on." Alternatively and equivalently, "1" may be employed to represent "off," and "0" may be employed to represent "on," without loss of generality.

For this particular embodiment, two additional operations may be characterized, an "inversion" operation and a "merger" operation. For this particular embodiment, the inversion operation, when applied to a binary edge labeled tree, such as an ordered BELT, refers to replacing a "1" with a "0" and replacing a "0" with a "1". Likewise, the merger operation with respect to trees refers to merging two trees at their roots. These two operations are illustrated, for example, in FIG. 8.

As will now be appreciated, the inversion operation comprises a monadic operator while the merger operation comprises a binary operator. Likewise, the constants zero/one, referred to above, may be viewed as an operation having no argument or as a zero argument operator or operation. Thus, this operation, in effect, returns the same value whenever applied. Here, for this particular embodiment, the constant value zero, or zero argument operation that returns "0," is denoted as "c," the merger operator is denoted as "*", the inversion operation is denoted as "'", and the successor operator is denoted as previously described.

It may be shown that ordered binary edge labeled trees satisfy the following nine tree expressions referred to, for this particular embodiment, as the "basis expressions." Specifically, any combination of four operations on a set of objects that satisfy these nine basis expressions generates an isomorph of the ordered binary edge labeled trees under the operations described above.

$$x''=x; \qquad (1)$$

$$((x*y)*z)=(x*(y*z)); \qquad (2)$$

$$(c*x)=c; \qquad (3)$$

$$(x*c)=c; \qquad (4)$$

$$(S(c)*x)=x; \qquad (5)$$

$$(x*S(c))=x; \qquad (6)$$

$$c'=c; \qquad (7)$$

$$S(c)'=S(c); \qquad (8)$$

$$(x*y)'=(x'*y'). \qquad (9)$$

Thus, examining these tree expressions, in turn, should provide insight into the properties of ordered BELTs. The first tree expression above demonstrates that applying the inversion operation successively to an object returns the original object, here an ordered binary edge labeled tree. The second tree expression above is referred to as the associative property. This property with respect to ordered binary edge labeled trees is demonstrated, for example, in FIG. 9.

As previously described, for this particular embodiment, the zero tree is denoted by the constant "c." Thus, as illustrated, in tree expressions (3) and (4), the merger of the zero tree with any other ordered BELT produces the zero tree. Likewise, the successor of the zero tree is the one tree or one node tree, also referred to here also as the unity tree. As illustrated by tree expressions (5) and (6), a merger of the unity tree with any other ordered BELT produces the ordered BELT. Likewise, as demonstrated by these tree expressions, changing the order of the merger does not change the result for either the zero tree or the unity tree.

Tree expressions (7) and (8) demonstrate that the inverse or inversion of the zero tree and the inverse or inversion of the unity tree in each respective case produces the same tree. Likewise, the final tree expression above, (9), demonstrates the distributive property for the inversion operation over the merger operation. Thus, the inverse of the merger of two ordered BELTs provides the same result as the merger of the inverses of the respective ordered BELTs. In this context, any set of tree expressions, such as the nine basis tree expressions, may be thought of a symmetric set of "re-write rules" with the tree expression on the left-hand side of an equality sign being replaced by the tree expression on the right-hand side of the equality sign or vice-versa.

One additional aspect of the foregoing basis relationships that was omitted from this embodiment, but that might be included in alternate embodiments, is the addition of a second monadic operator, denoted here as "T(x)." This particular operator is omitted here without loss of generality at least in part because it may be defined in terms of operators previously described. More particularly, $T(x)=S(x')'$, may be included in alternate embodiments. This approach, though not necessary from an implementation perspective, may add some symmetry and elegance to the above basis relationships. For example, it may be demonstrated that $S(x)'=T(x')$ and $S(x')=T(x)'$. In some respects, this relationship is analogous to the relationship between the logical operations OR and AND in Boolean algebra, where $-(A\ AND\ B)=-A\ OR\ -B$, and $-(A\ OR\ B)=-A\ AND\ -B$. However, as indicated above, this may be omitted without loss of generality and, therefore, for implementation purposes, it may be easier to implement four operators rather than five.

As is well-known and straight-forward, a set of rewrite rules defines an equivalence relationship if and only if the rewrite rules are reflexive, symmetric and transitive. Likewise, as follows from another well-known mathematical theorem concerning such reflexive, symmetric, and transitive relations, see, for example, Theorem 16.3 on page 65 of *An Introduction to Modern Algebra and Matrix Theory*, by Ross A. Beaumant and Richard W. Ball, available from Rhinehart and Co., NY, 1954, such a set of rewrite rules divides the ground terms of the associated algebra, here binary edge labeled trees with no variables, into disjoint equivalence classes that may be viewed as elements of a model of the tree expressions. The operations indicated and/or implied by the tree expressions, therefore, are interpreted as operations applied to one or more equivalence classes to produce an equivalence class. For example, in the case of the binary operation merger, to know the equivalence class of the result of a merger, a representative ordered BELT is selected from a first equivalence class, a representative is selected from a second equivalence class and the representatives are combined. The product of a merger operation, in this embodiment, is the equivalence class associated with the merger of the representatives. A similar approach may be likewise applied to the previously described monadic operations.

As previously suggested, a set of operations that satisfies the nine basis tree expressions previously described is isomorphic to the set of finite, rooted, ordered binary edge labeled trees. Thus, or more particularly, there is a one-to-one relationship between the equivalence classes that satisfy the nine tree expressions and the finite, rooted, ordered binary edge labeled trees. In this particular embodiment, this algebra includes the zero tree, denoted c, the unity tree, denoted S(c), the monadic operator of inversion, denoted ' (apostrophe), the monadic operator of succession, denoted S(x), and the binary operator of merger, denoted * (asterisk).

Figure 10A:
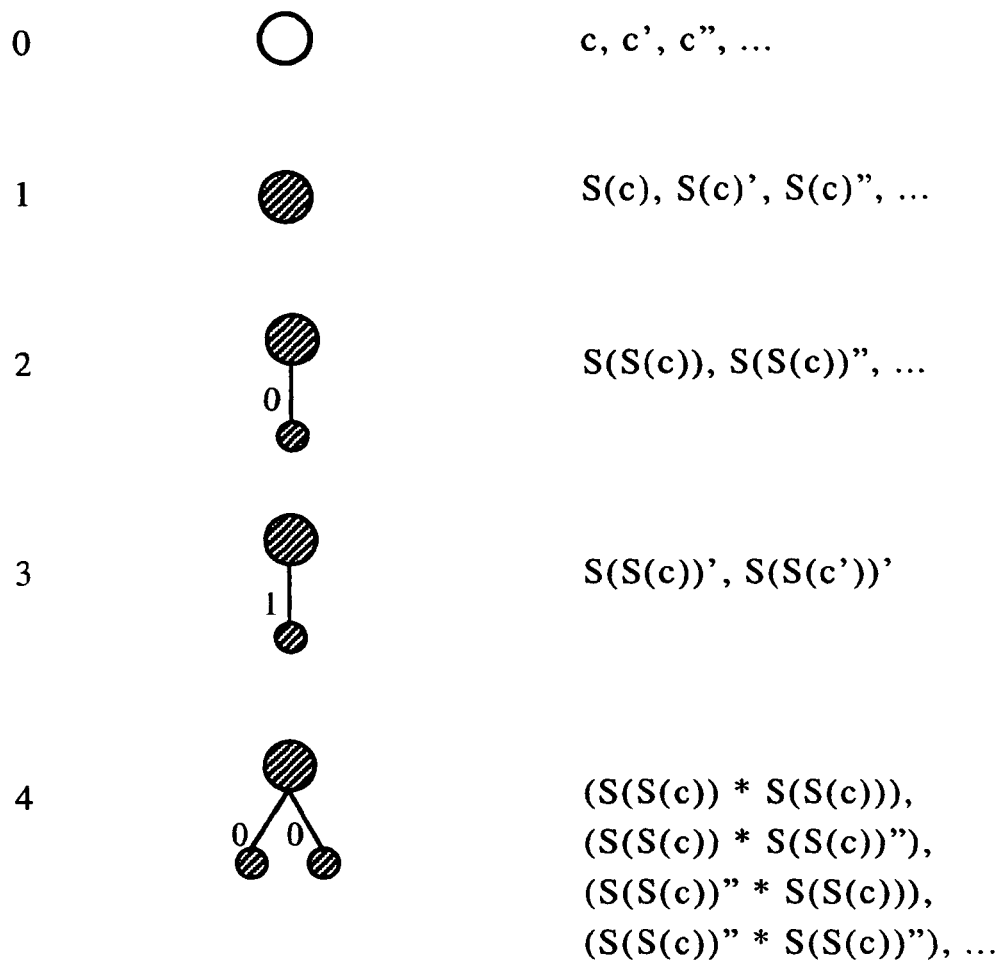
FIGS. 10*a* and 10*b* are schematic diagrams illustrating an embodiment of example elements of the first few equivalence classes for embodiments of ordered binary edge labeled trees.
Figure 10B:
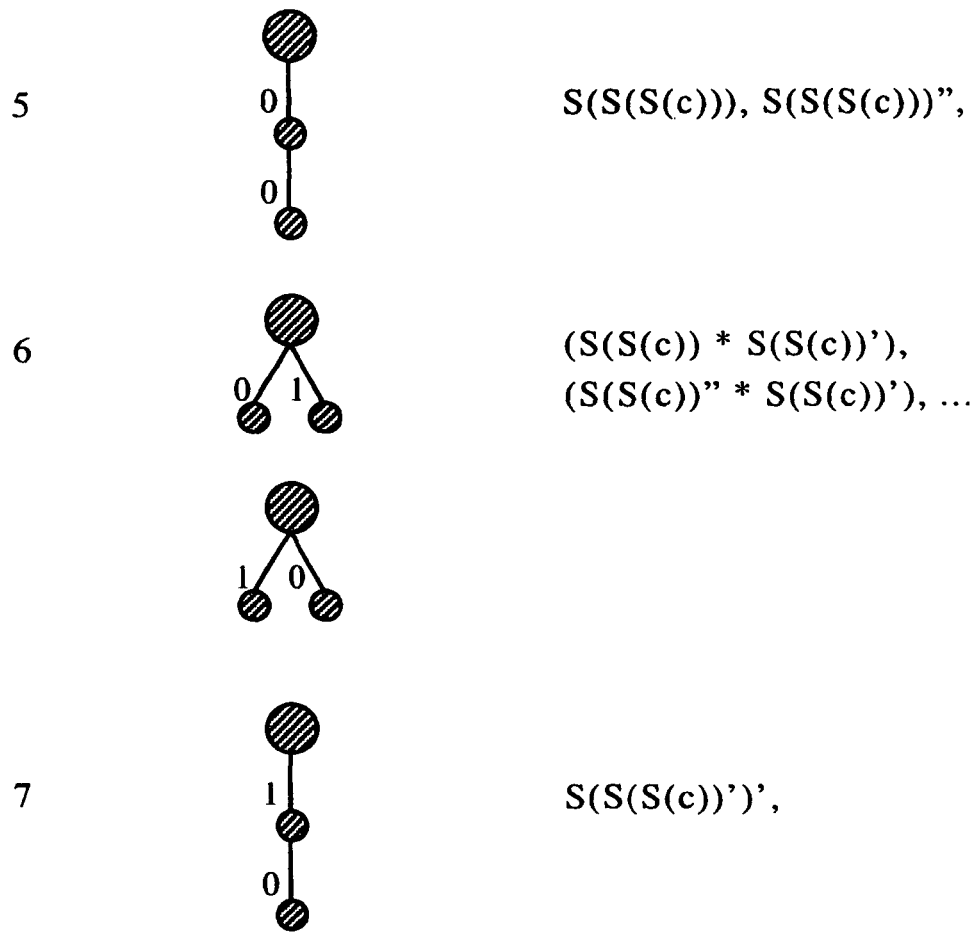

For this particular embodiment, to illustrate the concept of equivalence classes, FIGS. 10a and 10b provide the first few finite, rooted, ordered binary edge labeled trees with a few members of the equivalence class of terms associated with those trees. Thus, for this particular embodiment, in this context, a specific ordered binary edge labeled tree may constitute an equivalence class.

Of course, as previously alluded to, for this particular embodiment, a useful distinction is also made between an ordered binary edge labeled tree and an unordered binary edge labeled tree. In this context, and as previously suggested, the notion of "ordered" refers to the property that the nodes attached to a particular node form an ordered set, the order corresponding to the order in which those nodes are displayed in the graph of the tree. However, it may likewise be observed that two ordered trees are resident in the same equivalence class of unordered BELTs if and only if the two trees are commutative translates of each other. In other the words, the two trees are equivalent and in the same unordered BELT equivalence class where the trees differ only in the order of the attached nodes. This prior observation demonstrates that by adding a tenth tree expression as follows:

$$(x*y)=(y*x). \quad (10a)$$

referred to here as commutativity, the nine basis tree expressions, plus the tree expression above, form a model or algebra that is isomorphic to the unordered binary edge labeled trees. In a similar fashion, if, instead, the tenth tree expression is the following expression:

$$S(x*y)=S(x)*y \quad (10b)$$

referred to here as linearity, alternately, an algebra of objects that satisfies such ten tree expressions is isomorphic to the four operations applied to the set of finite binary edge labeled strings. See, for example, previously referenced U.S. provisional patent application 60/543,371.

The power of the observations made above, as shall become more clear hereinafter, is that by applying the nine basis tree expressions, it shall be possible, through repetitive application of algebraic manipulations, to simplify and, in some cases, solve a tree expression in ordered binary edge labeled. Likewise, in a similar fashion a similar proposition may be made and a similar process may be applied using a set of basis expressions to simplify tree expressions for unordered binary edge labeled trees and/or to simplify string expressions for finite binary edge labeled strings.

As shall be demonstrated below, by employing the nine basis tree expressions, in the case of ordered BELTs, and eight basis tree expressions in the case of unordered BELTs or BELS, it may be possible to derive a mechanism for simplifying any expression in the four previously described operators, regardless of complexity. For this particular embodiment, for example, regarding ordered BELTs, the approach employed is to match all possible single term expressions for ordered trees on the left-hand side of an equality with all possible single term expressions for ordered trees on the right-hand side of the equality. Any tree expression to be simplified comprises a combination of such delineated possible single term tree expressions. Therefore, for this particular embodiment, to simplify or reduce a tree expression, a set of algebraic manipulations may be repetitively applied to reduce or simplify a tree expression into a set of interrelated queries, in this particular embodiment, queries interrelated by Boolean operations, as illustrated below.

Although the claimed subject matter is not limited in scope in this respect, one technique for implementing this approach may be to apply a table look up approach. Therefore, the table may contain the single term tree expressions discussed above and illustrated in more detail below. Thus, when confronted with a tree expression to be simplified or reduced, table look ups may be applied repetitively to reduce a tree expression until it is simplified to a point where it may not be reduced or simplified further by applying such algebraic manipulations. Once this has been accomplished, the set of queries that has resulted may then be applied to one or more tree objects to produce a result that makes the original or initial tree expression true. Likewise, alternatively, this approach may ultimately indicate that no such tree expression is possible.

Techniques for performing table look-ups are well-known and well-understood. Thus, this will not be discussed in detail here. However, it shall be appreciated that any and all of the previously described and/or later described processing, operations, conversions, transformations, manipulations, etc. of strings, trees, numerals, data, etc. may be performed on one or more computing platforms or similar computing devices, such as those that may include a memory to store a table as just described, although, the claimed subject matter is not necessarily limited in scope to this particular approach. Thus, for example, a hierarchy of data, such as a tree as previously described, for example, may be formed. Likewise, operations and/or manipulations, as described, may be performed; however, operations and/or manipulations in addition to those described or instead of those described may also be applied. It is intended that the claimed subject matter cover such embodiments.

The following algebraic manipulation examples, numbered zero through forty-six below, delineate the extent of the possibilities of single term tree expressions and their simplification to accomplish the result described above for this particular embodiment. What follows is a listing of these forty seven expressions to demonstrate a technique for applying algebraic manipulations that take a given tree expression and return a simpler form. Of course, for some embodiments, such as a table look-up, it may be desirable to omit from such a table look up those expressions that are "always" and/or "never" true, such as $c=c$ and/or $c=S(c)$, respectively, for example. It is, of course, understood here that terms such as "always," "never," "if and only if" (iff) and the like, are limited in context to the particular embodiment.

Example 0

$c=c$
This is a logical truth.

Example 1

$c=x$
This is true iff $x=c$.

Example 2

$c=S(x)$
This is true nowhere because c is never equal to $S(x)$, for any x, in this embodiment.

Example 3

$c=x'$
This is true iff $c=x$. This may be shown by the following argument:
$c=x'$ iff $c'=''$ iff $c'=x$ iff $c=x$.

Example 4

$c=(x*y)$
This is true iff $x=c$ or $y=c$.
The examples above have c on the left-hand side with all other syntactic variations on the right-hand side. Next are cases where the left-hand side is x. In these cases, the right hand side is assumed to be something other than c because this case was addressed above.

Example 5

$x=x$
This is a logical validity and true everywhere.

Example 6

$x=y$
This is true iff $x=y$.

Example 7

$x=S(x)$.
This is never true.

Example 8

$x=S(y)$
This is true iff $x=S(y)$.

Example 9

$x=x'$
This is true iff $x=c$ or $x=S(c)$.

Example 10

$x=y'$
This is true iff $x=y'$ or $y=x'$.
Next are the cases where the term on the right is a merger, *, of two simpler terms.

Example 11

$x=(x*x)$
This is true iff $x=c$ or $x=S(c)$.

Example 12

$x=(x*y)$
This is true iff $x=c$ or $y=S(c)$.

Example 13

$x=(y*x)$
This is true iff $x=c$ or $y=S(c)$.

Example 14

$x=(y*z)$
This is true iff x can be decomposed into two parts connected by the * operation where y is the first part of the decomposition and z is the remainder. The number of possible terms that y might be for this to be true is found by seeing x as an ordered multiple product and letting y be the initial product of any number of these terms. Thus, this statement is true iff the disjunction that lists all possible ways of assigning y to an initial product of the parts and assigning z to the remaining parts is true. The last term in this disjunction assigns y to x and S(c) to z.

Next are cases where the left-hand side is S(x) or S(x').

Example 15

$S(x)=S(x)$
This is always true.

Example 16

$S(x)=S(y)$
This is true iff $x=y$.
Here, by way of illustration, a more complex equation is reduced to a simpler equation. In general, as previously suggested, for this particular embodiment, reducing a complex expression to a possible Boolean combination of simpler expressions provides a mechanism to determine conditions that make the tree expression true.

Example 17

$S(x)=x'$
This is never true.

Example 18

$S(x)=y'$
This is true iff (x=c and y=S(c)) or y=S(x)'.

Example 19

$S(x)=(x*x)$
This is never true.

Example 20

$S(x)=(x*y)$
This equation is true iff x=S(c) and y=S(S(c)).

Example 21

$S(x)=(y*x)$
This is solvable iff x=S(c) and y=S(S(c)).

Example 22

$S(x)=(y*z)$
This equation is solvable iff either (a) (y=S(c) and z=S(x)) or
   (b) (z=S(c) and y=S(x)).

Example 23

$S(x')=(x*x)$
This equation is never true.

Example 24

$S(x')=(y*y)$
This equation is true iff x=c and y=S(c).

Example 25

$S(x')=(x*y)$
This is true iff x=S(c) and y=S(S(c)).

Example 26

$S(x')=(y*x)$
This is true iff x=S(c) and y=S(S(c)).

Example 27

$S(x')=(y*z)$
This is solvable iff
((x=c and y=S(c)) and z=S(c)) or
(x=S(c) and ((y=S(c) and z=S(S(c))) or (z=S(c) and y=S(S(c))))).

Next are the cases where the left-hand side is x'.

Example 28

$x'=x'$
This is always true.

Example 29

$x'=y'$
This is true iff $x=y$.

Example 30

$x'=(x*x)$
This is true iff x=c or x=S(c).

Example 31

$x'=(x*y)$
This is true iff x=c or (x=S(c) and y=S(c)).

Example 32

$x'=(y*z)$
This is true iff x=c or (x=S(c) and y=S(c)).

Example 33

$x'=(y*z)$
This is solvable iff x=(y'*z') which is solvable iff
[y=c and x=c] or
[y=S(c) and z=x'] or
[z=c and x=c] or
[z=S(c) and y=x'] or
x can be decomposed into (y'*z').

Example 34

$S(x)'=(x*x)$
This equation is never true.

Example 35

$S(x)'=(y*y)$
This equation is true iff x=c and y=S(c).

Example 36

$S(x)'=(x*y)$
This is true iff x=S(c) and y=S(S(c))'.

Example 37

$S(x)'=(y*z)$
This is true iff $x=S(c)$ and $y=S(S(c))'$.

Example 38

$S(x)'=(y*z)$
This is solvable iff $S(x)=(y'*z')$ which is solvable iff
[$y=S(c)$ and $z=S(x)$] or
[$z=S(c)$ and $y=S(x)$].
The remaining cases are where the left-hand side is a merger operation.

Example 39

$(x*x)=(x*x)$
This is always true.

Example 40

$(x*x)=(y*y)$
True iff $x=y$.

Example 41

$(x*x)=(x*y)$
True iff $x=y$.

Example 42

$(x*x)=(y*x)$
True iff $x=u$.

Example 43

$(x*x)=(u*v)$
This is solvable iff
  (a) ($x=c$ and $u=c$ or $v=c$)); or
  (b) ($x=S(c)$ and ($u=(S(c)$ and $v=S(c))$; or
  (c) there exists terms $x_1, x_2, v_1, v_2$ such that $x=(x_1*x_2)$, $v=(v_1*v_2)$ and $x_1=u$ and $x=v_2$; or
  (d) there exists terms $u_1, u_2, x_1, x_2$ such that $u=(u_1*u_2)$, $x=(x_1*x_2)$, $x=u_1$ and $x_2=v$; or
  (e) $x=u$ and $y=v$.

Example 44

$(x*y)=(x*v)$
True iff $x=c$ or ($y=c$ and $v=c$) or $y=v$.

Example 45

$(x*y)=(u*x)$
True iff $x=c$ or ($y=c$ and $u=c$) or $y=u$.

Example 46

$(x*y)=(u*v)$
This is solvable iff
  (a) ($x=c$ and ($u=c$ or $v=c$)); or
  (b) ($x=S(c)$ and ($u=S(c)$ and $v=S(c))$; or
  (c) there exists terms $x_1, x_2, v_1, v_2$ such that $x=(x_1*x_2)$, $v=(v_1*v_2)$ and $x_1=u$ and $x=v_2$; or
  (d) there exists terms $u_1, u_2, x_1, x_2$ such that $u=(u_1*u_2)$, $x=(x_1*x_2)$, $x=u_1$ and $x_2=v$; or
  (e) $x=u$ and $y=v$.

Previously described is an embodiment of a method or technique for reducing or simplifying a tree expression to obtain a result that provides the condition(s) under which the tree expression is true. For example, if the left-hand side is a tree expression in x and the right-hand side is a tree expression in ground terms, this may reduce to another tree expression that makes the overall initial tree expression true. Of course, the claimed subject matter is not limited in scope to only this particular embodiment.

Another embodiment of a method or technique for reducing or simplifying a tree expression may involve segregating simplification with the basis relationships from simplifying using the 47 expressions provided above. For example, from an implementation perspective, it may simplify results to apply the basis expressions before applying the 47 derived expressions. In one particular embodiment, although, of course, the claimed subject matter is not limited in scope in this respect, the basis expressions may be applied in the following specific order to simplify the given tree expression:

$$x''=x; \tag{1}$$

$$(x*y)'=(x'*y'); \tag{9}$$

$$x''=x; \tag{1}$$

$$c'=c; \tag{7}$$

$$(c*x)=c; \tag{3}$$

$$(x*c)=c; \tag{4}$$

$$S(c)'=S(c); \tag{8}$$

$$(S(c)*x)=x; \tag{5}$$

$$(x*S(c))=x; \tag{6}$$

$$((x*y)*z)=(x'(y*z)). \tag{2}$$

Once the tree expression has been simplified using these basis expressions, the 47 derived expressions may be applied to further reduce or simplify the tree expression. Of course, again, this is merely one possible approach and the claimed subject matter is not limited in scope to this particular embodiment.

Embodiments of a method of reducing or simplifying tree expressions have a variety of potentially useful applications. As described previously, trees provide a technique for structuring and/or depicting hierarchical data. Thus, for example, trees may be employed to represent language sentence structures, computer programs, algebraic formulae, molecular structures, family relationships and more. For example, one potential application of such a tree reduction technique is in the area of pattern matching. Thus, in pattern matching, substructures, in the form of a tree, for example, may be located within a larger structure, also in the form of a tree, referred to in this context as the target. This may be accomplished by comparing the structures; however, typically, such a comparison is complex, cumbersome, and/or time consuming. Although the claimed subject matter is not limited in scope to pattern matching or to any of the other potential applications described above, it may be instructive to work through at least one particular example of applying the previously described tree reduction approach to a pattern matching problem to demonstrate the power and/or versatility of this particular embodiment.

Within this particular context and for this particular embodiment, there are a number of potential pattern matching inquiries that may be made. Although these are simply examples and the claimed subject matter is not limited in scope to only these particular inquiries, one such inquiry, for example, may be whether a first tree, such as an ordered binary edge labeled tree, is equal to a second binary edge labeled tree? To phrase this differently, it may be useful to determine whether the trees match exactly. Likewise, another such query, or active verb, may be referred to in this context as a rooted partial sub tree (RPS) query or inquiry. This particular type of query or inquiry is demonstrated with reference to FIG. 11.

Thus, in Examples 1 and 2 of FIG. 11, the right-hand sides depict a binary edge labeled tree for the numeral 60543371. See, for example, the previously referenced U.S. provisional patent application 60/543,371. Here, in Example 1, the left-hand side of FIG. 11 provides a rooted partial subtree of the right-hand side. In this context, the term rooted refers to a comparison in which the roots of the left-hand side and the right-hand side are matched or compared. The notion of a partial subtree is to be distinguished from the notion of a full subtree. In this context, therefore, a rooted full subtree refers to the equality described above. Likewise, then, a rooted partial subtree refers to a match with another tree, but only to the extent of the nodes and edges present for the rooted partial subtree. Thus, the target may contain additional nodes, edges, and/or labels that are omitted from the rooted partial subtree. By way of contrast, Example 2 demonstrates on the left-hand side a tree that is not a rooted partial subtree of the right-hand side tree, although the left-hand side tree has the same arrangement of nodes and edges as a rooted partial subtree of the right-hand side. Thus, another type of match may occur where the arrangement of the nodes and edges match, but the labels do not match, as in Example 2.

One query or question to be posed, for the purposes of pattern matching, is whether the tree on the left-hand side, such as in example one, is a rooted partial subtree of the tree on the right-hand side. In addition to that, several other potential questions may be posed and potentially answered. For example, if the tree on the left-hand side is a rooted partial subtree of the tree on the right-hand side, it may be useful to know how many times this rooted partial subtree is present in the right-hand side tree. Likewise, assume that a rooted partial subtree is present more than once. It may be useful to have a mechanism to identify one of the several rooted partial subtrees to a machine, for example, for further processing.

It also may be desirable, in other circumstances, to determine whether there is a match between a rooted tree and a subtree that is not rooted. In this context this may be referred to, for example, as a "projected match". In this context, this refers to projecting one tree into another tree without matching corresponding roots and having the form and labels of the projected tree still be preserved in the tree in which it is projected.

Likewise, with reference to Example 2, in which the tree on the left-hand side does not match the tree on the right-hand side, an alternative query or question may relate to a measurement of the similarities and/or differences, as an embodiment of a measurement of the matching. For example, particular branches of the tree on the left-hand side may match with particular branches of the tree on the right-hand side, although overall, the entire tree on the left-hand side may not match to a subportion of the tree on the right-hand side, in this particular example. Thus, it may be appropriate, for example, to weight the matching in some form. Such an approach, for example, might be employed in data analysis, as simply one example. In one embodiment, for example, it may be desirable to identify a partial match that results in the maximum number of matching nodes and edges; likewise, in a different embodiment, it may be desirable to identify a partial match such that the match is closest to or most remote from the root. Again, any one of a number of other approaches is possible and such approaches included within the scope of the claimed subject matter. Thus, it may be desirable, assuming there is no identical match, to identify the closest match where "closest" or "most remote" is defined with respect to a particular weighted criterion designed to achieve a particular objective, such as the examples previously described.

For this particular embodiment, as previously suggested, a method of performing pattern matching may include constructing a tree expression. A tree expression may be constructed in a manner so as to match a first pattern, represented as a first tree, with or against a second pattern, represented as a second tree. After such a tree expression has been formulated or constructed, the conditions under which the tree expression is true may be determined. This may be accomplished, for example, by applying the previously described techniques for simplifying or reducing tree expressions. Likewise, as previously suggested, alternatively, such an approach may determine the conditions under which the formulated or constructed tree expression is false rather than true.

Figure 12:
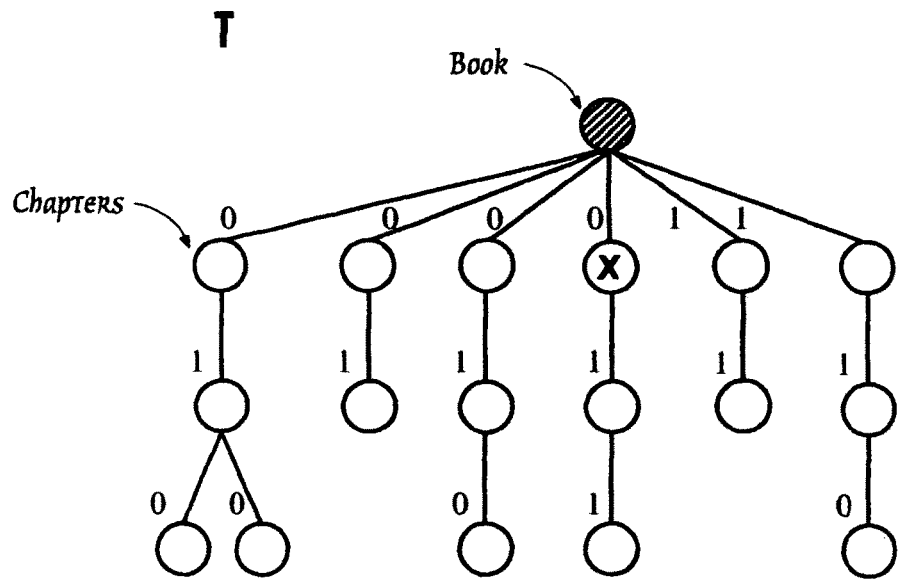
FIG. 12 is a schematic diagram illustrating an embodiment of a sample pattern matching problem using embodiments of ordered binary edge labeled trees.

In order to appreciate the power and/or versatility of this particular application, a simple example is desirable. Therefore, FIG. 12 is a schematic diagram illustrating one example embodiment 1200 of an ordered binary edge labeled tree. This particular tree has a root that is designated as "book." This tree, designated as T in FIG. 12, might, for example, comprise a partial subtree of a larger tree referred to as "library," where library is a forest of trees representing various books.

Continuing with this example, emanating from the root node "book" are five edges, three of them labeled with a "0" and two of them labeled with a "1". For this particular embodiment, a "0" designates chapters of the book, whereas a "1" designates appendices of the book. Each edge includes another node other than the root node to support the edge that is labeled as just described. Likewise, as illustrated in FIG. 12, each of the chapters and appendices has attached to that node, one or more additional edges and nodes. These additional edges and nodes, in this particular embodiment, designate the particular numerical designation of the particular chapter or appendix. Thus, in FIG. 12, chapters one, two and three and appendices one and two are illustrated. For example, in a database, this tree may operate as a pointer to designate the location in memory of these particular chapters and appendices. It may, thus, be desirable, for example, to retrieve a particular chapter of "book" from storage.

FIGS. 10a and 10b provide a short list of ordered binary edge labeled trees corresponding to several natural numerals. Thus, by way of comparison between FIGS. 10a and 10b, and FIG. 12, it should be clear which nodes and edges designate chapters one to three and appendices one and two. The tree expression also shown in FIG. 12, therefore, is intended to demonstrate the application of algebraic manipulations to perform tree expression simplification in order to accomplish pattern matching, such as previously described.

The simplification may be accomplished as follows. The tree expression, $S(x) <= (R) \, y$, where "$<=$" denotes "partial rooted subtree of," indicates that the successor of tree x is a rooted partial subtree of the tree, T, in which book is a root node. The second half of the tree expression above comprises a tree equation in x. Thus, the expression $(S(x) <= (R) y)$ may be reduced by simplifying the expression $S(x)$ in the manner previously described above, for example. Likewise, simplifying the expression $(y=S(S(S(c))'))$ involves several successive simplification operations involving the inverse operation and applying the successor operation. Again, as previously discussed, this may be accomplished through application of a table look up technique. As previously explained, a complex tree expression may therefore be reduced into simpler tree expressions that are interrelated by Boolean logic. This is demonstrated, for example, through the simplification of tree expressions as illustrated in Examples 0 to 46 above for ordered trees. Thus, in this example, these simplified tree expressions comprise queries interrelated by Boolean operations.

Furthermore, to apply such queries such as, for example, determining whether a first tree is a rooted partial subtree of another tree, as indicated by the tree expression above, involves the application of known programming techniques. See, for example, Chapter 4, "Tree Isomorphism," of *Algorithms on Trees and Graphs*, by Gabriel Valiente, published by Springer, 2002. Such well-known and well-understood programming techniques will not be discussed here in any detail.

Much of the prior discussion was provided in the context of ordered binary edge labeled trees. However, a similar approach may be applied to unordered binary edge labeled trees, for example. In general, it is understood that performing such simplifications or reductions to unordered BELTs presents more of a processing challenge. See, for example, "Tree Matching Problems with Applications to Structured Text Databases," by Pekka Kilpelainen, Ph.D dissertation, Department of Computer Science, University of Helsinki, Finland, November, 1992. A potential reason may be that a greater number of possibilities are present combinatorially in those situations in which nodes may be unordered rather than ordered. Nonetheless, to address such unordered trees, as previously for ordered trees, we begin with the basis expressions. More specifically, a set of basis expressions may be isomorphic to applying the four previously described operations, to unordered BELTs. Here, there are eight basis expressions rather than nine.

$$x''=x; \quad (1)$$

$$((x*y)*z)=(x*(y*z)); \quad (2)$$

$$(c*x)=c; \quad (3)$$

$$(S(c)*x)=x; \quad (4)$$

$$c'=c; \quad (5)$$

$$S(c)'=S(c); \quad (6)$$

$$(x*y)'=(x'*y'); \quad (7)$$

$$(x*y)=(y*x). \quad (8)$$

It is worth observing that expressions (4) and (6) from the previous set of expressions have been omitted here. Such expressions are redundant in light of expression (8) above, which has been added. As previously, then, these expressions may be employed to solve single term expression that may be employed through a table look-up process, for example, to simplify more complex tree expressions. As previously, the tree expressions are provided below. Again, "never," "always," "iff" and the like are limited Example 0

$c=c$
This is a logical truth.

Example 1

$c=x$
This is true iff $x=c$.

Example 2

$c=S(x)$
This is true nowhere because c is never equal to $S(x)$, for any x, in this embodiment.

Example 3

$c=x'$
This is true iff $c=x$. This may be shown by the following argument:
$c=x'$ iff $c'=x''$ iff $c'=x$ iff $c=x$.

Example 4

$c=(x*y)$
This is true iff $x=c$ or $y=c$.

Example 5

$x=x$
This is a logical validity and true everywhere.

Example 6

$x=y$
This is true iff $x=y$.

Example 7

$x=S(x)$.
This is never true.

Example 8

$x=S(y)$
This is true iff $x=S(y)$.

Example 9

$x=x'$
This is true iff $x=c$ or $x=S(c)$.

Example 10

$x=y'$
This is true iff $x=y'$ or $y=x'$.

Example 11

$x=(x*x)$
This is true iff $x=c$ or $x=S(c)$.

Example 12

$x=(x*y)$
This is true iff $x=c$ or $y=S(c)$.

Example 13

$x=(y*x)$
This is true iff $x=c$ or $y=S(c)$.

Example 14

$x=(y*z)$
This is true iff x can be decomposed into two parts connected by the * operation where y is the first part of the decomposition and z is the remainder. The number of possible terms that y might be for this to be true is found by seeing x as an unordered multiple product and letting y be the initial product of any number of these terms. Thus, this statement is true iff the disjunction that lists all possible ways of assigning y to an initial product of the parts and assigning z to the remaining parts is true. The last term in this discussion assigns y to x and $S(c)$ to z.
Next are cases were the left-hand side is $S(x)$ or $S(x')$.

Example 15

$S(x)=S(x)$
This is always true.

Example 16

$S(x)=S(y)$
This is true iff $x=y$.
Here, by way of illustration, a more complex equation is reduced to a simpler equation. In general, as previously suggested, for this particular embodiment, reducing a complex expression to a possible Boolean combination of simpler expressions provides a mechanism to determine conditions that make the tree expression true.

Example 17

$S(x)=x'$
This is never true.

Example 18

$S(x)=y'$
This is true iff $(x=c$ and $y=S(c))$ or $y=S(x)'$.

Example 19

$S(x)=(x*x)$
This is never true.

Example 20

$S(x)=(x*y)$
This equation is true iff $x=S(c)$ and $y=S(S(c))$.

Example 21

$S(x)=(y*x)$
This is solvable iff $x=S(c)$ and $y=S(S(c))$.

Example 22

$S(x)=(y*z)$
This equation is solvable iff either (a) $(y=S(c)$ and $z=S(x))$ or
(c) $(z=S(c)$ and $y=S(x))$.

Example 23

$S(x')=(x*x)$
This equation is never true.

Example 24

$S(x')=(y*y)$
This equation is true iff $x=c$ and $y=S(c)$.

Example 25

$S(x')=(x*y)$
This is true iff $x=S(c)$ and $y=S(S(c))$.

Example 26

$S(x')=(y*x)$
This is true iff $x=S(c)$ and $y=S(S(c))$.

Example 27

$S(x')=(y*z)$
This is solvable iff
$((x=c$ and $y=S(c))$ and $z=S(c))$ or
$(x=S(c)$ and $((y=S(c)$ and $z=S(S(c)))$ or $(z=S(c)$ and $y=S(S(c))))$.
Next are the cases were the left-hand side is x'.

Example 27

$x'=x'$
This is always true.

Example 29

$x'=y'$
This is true iff $x=y$.

Example 30

$x'=(x*x)$
This is true iff $x=c$ or $x=S(c)$.

Example 31

$x'=(x*y)$
This is true iff $x=c$ or $(x=S(c)$ and $y=S(c))$.

Example 32

$x'=(y*z)$
This is true iff $x=c$ or $(x=S(c)$ and $y=S(c))$.

Example 33

$x'=(y*z)$
This is solvable iff either
$(x=c$ and $(y=c$ or $z=c))$; or
$(x=S(c)$ and $y=S(c)$ and $z=S(c))$; or
$(x=(y'*z'))$; or
$(x=(z'*y'))$

Example 34

$S(x)'=(x*x)$
This equation is never true.

Example 35

$S(x)'=(y*y)$
This equation is true iff $x=c$ and $y=S(c)$.

Example 36

$S(x)'=(x*y)$
This is true iff $x=S(c)$ and $y=S(S(c))'$.

Example 37

$S(x)'=(y*z)$
This is true iff $x=S(c)$ and $y=S(S(c))'$.

Example 38

$S(x)'=(y*z)$
This is solvable iff $S(x)=(y'*z')$ which is solvable if
[$y=S(c)$ and $z=S(x)$] or
[$z=S(c)$ and $y=S(x)$].

Example 39

$(x*x)=(x*x)$
This is always true.

Example 40

$(x*x)=(y*y)$
True iff $x=y$.

Example 41

$(x*x)=(x*y)$
True iff $x=v$.

Example 42

$(x*x)=(y*x)$
True iff $x=u$.

Example 43

$(x*x)=(u*v)$
This is solvable iff
(d) ($x=c$ and ($u=c$ or $v=c$)); or
(e) ($x=S(c)$ and ($u=S(c)$ and $v=S(c)$)); or
(f) there exists terms $x_1, x_2, v_1, v_2$ such that $x=(x_1*x_2)$, $v=(v_1*v_2)$ and $x_1=u$ and $x=v_2$; or
(f) there exists terms $u_1, u_2, x_1, x_2$ such that $u=(u_1*u_2)$, $x=(x_1*x_2)$, $x=u_1$ and $x_2=v$; or
(g) $x=u$ and $y=v$.

Example 44

$(x*y)=(x*v)$
True iff $y=v$.

Example 45

$(x*y)=(u*x)$
True iff $x=u$.

Example 46

$(x*y)=(u*v)$
This is solvable iff
(g) ($x=c$ and ($u=c$ or $v=c$)); or
(h) ($y=c$ and ($u=c$ or $v=c$)); or
(i) ($x=S(c)$ and $y=(u*v)$); or
(j) ($y=S(c)$ and $x=(u*v)$); or
(k) there exists terms $x_1, x_2, v_1, v_2$ such that $x=(x_1*x_2)$, $v=(v_1*v_2)$ and $x_1=u$ and $y=v_2$; or
(f) there exists terms $u_1, u_2, y_1, y_2$ such that $u=(u_1*u_2)$, $y=(y_1*y_2)$, $x=u_1$ and $y_2=v$; or
(g) $x=u$ and $y=v$.

Thus, a similar process as previously described for ordered trees may be applied for unordered trees using the 47 expressions above.

Figure 6:
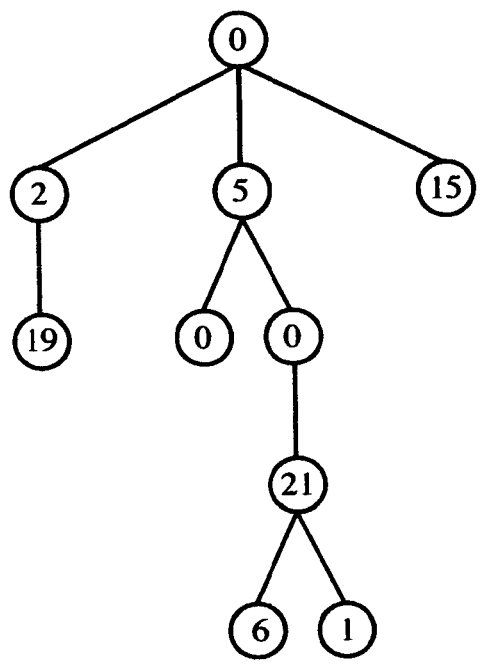
FIG. 6 is a schematic diagram of an embodiment of a binary node labeled tree.

Of course, the claimed subject matter is not limited to ordered or unordered binary edge labeled trees. For example, as described in previously cited U.S. provisional patent application 60/543,371, binary edge labeled trees and binary node labeled trees may be employed nearly interchangeably to represent substantially the same hierarchy of data. In particular, a binary node labeled tree may be associated with a binary edge labeled tree where the nodes of the binary node labeled tree take the same values as the edges of the binary edge labeled tree, except that the root node of the binary node labeled tree may comprise a node having a zero value or a null value. This is illustrated, for example, in FIG. 6. Thus, rather than employing binary edge labeled trees, the previously described embodiments may alternatively be performed using binary node labeled trees. As one example embodiment, operations and/or manipulations may be employed using binary edge labeled trees and the resulting binary edge labeled tree may be converted to a binary node labeled tree. However, in another embodiment, operations and/or manipulations may be performed directly using binary node labeled trees where a different association embodiment is employed.

In accordance with the claimed subject matter, therefore, any tree, regardless of whether it is binary edge labeled, binary node labeled, non-binary, a feature tree, or otherwise, may be manipulated and/or operated upon in a manner similar to the approach of the previously described embodiments. Typically, different association embodiments shall be employed, depending at least in part, for example, upon the particular type of tree and/or string, as described, for example in the previously referenced U.S. provisional patent application 60/543,371. For example, as described in the previously referenced US provisional patent application, a node labeled tree in which the nodes are labeled with natural numerals or data values may be converted to a binary edge labeled tree. Furthermore, this may be accomplished with approximately the same amount of storage. For example, for this particular embodiment, this may involve substantially the same amount of node and/or edge data label values. However, for convenience, without intending to limit the scope of the claimed subject matter in any way, here, operations and/or manipulations and the like have been described primarily in the context of BELTs.

Figure 7:
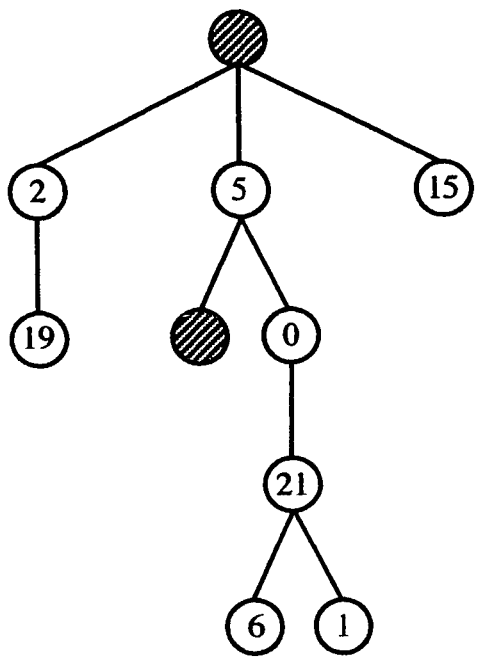
FIG. 7 is a schematic diagram illustrating another embodiment of a binary node labeled tree.

In another embodiment, however, a particular tree may include null types or, more particularly, some node values denoted by the empty set. This is illustrated, for example, by the tree in FIG. 7, although, of course, this is simply one example. Likewise, this example is an example of a binary node labeled tree with nulls, although, the claimed subject matter is not limited in scope in this respect. An advantage of employing null types includes the ability to address a broader array of hierarchical data sets. For example, without loss of generality and not intending to limit the scope of the claimed subject matter in any way, a null type permits representing in a database or a relational database, as two examples, situations where a particular attribute does not exist. As may be appreciated, this is different from a situation, for example, where a particular attribute may take on a numeral value of zero. Again, as described in the previously referenced U.S. provisional patent application 60/543,371, a tree with nulls, as described above, may be converted to a tree without nulls; however, the claimed subject matter is not limited in scope in this respect, of course. Thus, it may be desirable to be able to address both situations when representing, operating upon, manipulating and/or searching for patterns regarding hierarchical sets of data.

Likewise, in an alternative embodiment, a node labeled tree, for example, may comprise fixed length tuples of numerals. For such an embodiment, such multiple numerals may be combined into a single numeral, such as by employing Cantor pairing operations, for example. See, for example, *Logical Number Theory, An Introduction*, by Craig Smorynski, pp, 14-23, available from Springer-Verlag, 1991. This approach should produce a tree to which the previously described embodiments may then be applied. Furthermore, for one embodiment, a tree in which nodes are labeled with numerals or numerical data, rather than binary data, may be converted to a binary edge labeled tree and/or binary node labeled tree, and, for another embodiment, a tree in which edges are labeled with numerals or numerical data, rather than binary data, may be converted to a binary edge labeled tree and/or binary node labeled tree. See previously referenced U.S. provisional patent application Ser. No. 60/543,371.

Furthermore, a tree in which both the nodes and the edges are labeled may be referred to in this context as a feature tree and may be converted to a binary edge labeled tree and/or binary node labeled tree. For example, without intending to limit the scope of the claimed subject matter, in one approach, a feature tree may be converted by converting any labeled node with its labeled outgoing edge to an ordered pair of labels for the particular node. Using the embodiment described, for example in the previously referenced US provisional patent application, this tree may then be converted to a binary edge labeled tree.

In yet another embodiment, for trees in which data labels do not comprise simply natural numerals, such as, as one example, trees that include negative numerals, such data labels may be converted to an ordered pair of numerals. For example, the first numeral may represent a data type. Examples include a data type such as negative, dollars, etc. As described above, such trees may also be converted to binary edge labeled trees, such as by applying the embodiment of the previously referenced US provisional patent application, for example. However, again, this is provided for purposes of explanation and illustration. The claimed subject matter is not limited in scope to employing the approach of the previously referenced provisional patent application.

It will, of course, be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although the claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with the claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive. For example, a display may be employed to display one or more queries, such as those that may be interrelated, and or one or more tree expressions, although, again, the claimed subject matter is not limited in scope to this example.

In the preceding description, various aspects of the claimed subject matter have been described. For purposes of explanation, specific numbers, systems and/or configurations were set forth to provide a thorough understanding of the claimed subject matter. However, it should be apparent to one skilled in the art having the benefit of this disclosure that the claimed subject matter may be practiced without the specific details. In other instances, well-known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of the claimed subject matter.

The invention claimed is:

1. A method for manipulating a complex two-dimensional graphical hierarchy for electronic processing and/or storage, the complex two-dimensional graphical hierarchy being in the form of a tree hierarchy, the method comprising:
   accessing instructions from one or more memory devices for execution by one or more processors;
   executing instructions accessed from the one or more physical memory devices by the one or more processors;
   storing, in at least one of the one or more physical memory devices, signal values resulting from having executed the instructions on the one or more processors;
   wherein the accessed instructions comprise instructions for manipulating the tree hierarchy; and
   wherein executing the accessed tree hierarchy manipulation instructions further comprise:
   reducing a tree expression comprising at least one variable representing the tree hierarchy using one or more algebraic operations on the variable tree expression to yield a reduced variable tree expression, wherein the reduced variable tree expression indicates one or more conditions under which the reduced variable tree expression is true and is simplified as compared to the tree expression;
   performing one or more operations on the reduced variable tree expression to yield an updated variable tree expression; and
   storing the updated variable tree expression in a memory device of the one or more physical memory devices.

2. The method of claim 1, wherein the updated variable tree expression comprises an updated tree hierarchy or a representation thereof.

3. The method of claim 1, wherein the variable tree expression comprises a single term tree expression.

4. The method of claim 3, wherein the performing the one or more operations on the reduced variable tree expression comprises finding a correspondence for the single term tree expression on a left-hand side of an equality with at least one single term tree expression on a right-hand side of an equality.

5. The method of claim 4, wherein the correspondence for the single term tree expression with the at least one single term tree expression on the right-hand side of the equality includes matching the single term tree expression with the at least one single term tree expression.

6. The method of claim 1, wherein the one or more algebraic operations performed on the reduced variable tree expression comprise at least one of an inversion operation or a merger operation.

7. The method of claim 1, wherein the one or more algebraic operations performed on the reduced variable tree expression comprise at least one of a zero-push operation or a one-push operation.

8. The method of claim 7, wherein the zero-push operation comprises, at least in part, adding a child node and an edge to a parent node and labeling the added edge with a binary zero.

9. The method of claim 7, wherein the one-push operation comprises, at least in part, adding a child node and an edge to a parent node and labeling the added edge with a binary one.

10. The method of claim 1, wherein executing the accessed tree hierarchy manipulation instructions further comprising responsive to a query, comparing the reduced variable tree expression with the query to identify at least one partial match, at least one match, or a combination thereof.

11. The method of claim 10, wherein executing the accessed tree hierarchy manipulation instructions further comprising generating a Boolean true or false responsive to an identification of a match or a partial match between the query and the reduced variable tree expression.

12. The method of claim 1, wherein the reducing the tree expression comprises repetitive application of the one or more algebraic operations on the variable tree expression to yield the reduced variable tree expression.

13. An article comprising:
a non-transitory storage medium comprising instructions stored thereon, wherein the instructions being accessible from the non-transitory storage medium to store as physical memory states on one or more physical memory devices, the one or more physical memory devices coupled to one or more processors able to execute the instructions stored as physical memory states, the one or more physical memory devices also able to store binary digital signals quantities, if any, as physical memory states, that are to result from execution of the instructions on the one or more processors,
wherein the executable instructions to manipulate a complex two-dimensional tree hierarchy; and
wherein executing the complex two-dimensional graphical tree hierarchy manipulation instructions further to:
reduce a tree expression to comprise at least one variable to represent the complex two-dimensional graphical tree hierarchy using one or more algebraic operations on the variable tree expression to yield a reduced variable tree expression, the reduced variable tree expression to indicate one or more conditions under which the reduced variable tree expression is to be true and to be simplified as compared to the tree expression;
perform one or more operations on the reduced variable tree expression to yield an updated variable tree expression; and
store the updated variable tree expression in a physical memory device of the one or more physical memory devices.

14. The article of claim 13, wherein the reduced variable tree expression to comprise one or more queries.

15. The article of claim 14, wherein the one or more queries are to be interrelated by one or more Boolean operations.

16. The article of claim 13, wherein the one or more algebraic operations to comprise one or more basis expressions.

17. An apparatus to manipulate a complex two-dimensional graphical hierarchy for electronic processing and/or storage, the complex two-dimensional graphical hierarchy being in the form of a tree hierarchy, the apparatus comprising:
means for accessing instructions from one or more physical memory devices for execution by one or more processors;
means for executing instructions accessed from the one or more physical memory devices by the one or more processors;
means for storing, in the at least one of the one or more physical memory devices, signal values resulting from having executed the instructions on the one or more processors;
wherein the accessed instructions comprise instructions for manipulating the tree hierarchy; and
wherein the means for executing the accessed tree hierarchy manipulation instructions comprises:
means for reducing a tree expression comprising at least one variable representing a tree hierarchy using one or more algebraic operations on the variable tree expression to yield a reduced variable tree expression, wherein the reduced variable tree expression indicates one or more conditions under which the reduced variable tree expression is true and is simplified as compared to the tree expression;
means for performing one or more operations on the reduced variable tree expression to yield an updated variable tree expression; and
means for storing the updated variable tree expression in a memory.

18. The apparatus of claim 17, further comprising means for comparing the reduced variable tree expression with a query to identify at least one partial match, at least one match, or a combination thereof.

19. The apparatus of claim 18, further comprising means for generating one or more matching expressions from the reduced variable tree expressions.

20. The apparatus of claim 18, further comprising means for generating a Boolean true or false responsive to an identification of a match or a partial match between the query and the reduced variable tree expression.

21. The apparatus of claim 17, wherein the means for reducing the tree expression further comprises means for using, at least in part, one or more algebraic expressions on at least a portion of the reduced variable tree expression to manipulate the tree hierarchy.

22. An apparatus comprising:
one or more processors coupled to one or more physical memory device to store executable instructions and to store binary digital signal quantities as physical memory states, wherein the executable instructions being accessible from the physical memory devices for execution by one or more processors; and
the one or more processors able to store in at least one of the physical memory devices, binary signal quantities, if any, that are to result from execution of the instructions on one or more processors, wherein the accessed executable instructions comprise instructions for manipulating a tree hierarchy; and
wherein executing the accessed tree hierarchy manipulation instructions further to:
reduce a tree expression to comprise at least one variable to represent the tree hierarchy using one or more algebraic operations on the variable tree expression to yield a reduced variable tree expression, the reduced variable tree expression to indicate one or more conditions under which the reduced variable tree expression is to be true and is simplified as compared to the tree expression;
perform one or more operations on the reduced variable tree expression to yield an updated variable tree expression; and
store the updated variable tree expression in a physical memory device of the one or more physical memory devices.

23. The apparatus of claim 22, wherein the accessed tree hierarchy manipulation instructions further to: use, at least in part, one or more algebraic operations on at least a portion of the reduced variable tree expression to manipulate the complex tree hierarchy.

24. The apparatus of claim 23, wherein the accessed tree hierarchy manipulation instructions further to merge the at least the portion of the reduced variable tree expression with a portion of a second graphical hierarchical tree.

* * * * *